(12) United States Patent
Miller et al.

(10) Patent No.: US 12,429,067 B1
(45) Date of Patent: Sep. 30, 2025

(54) GAS TURBINE ENGINE WITH ACOUSTIC SPACING OF THE FAN BLADES AND OUTLET GUIDE VANES

(71) Applicant: General Electric Company, Evendale, OH (US)

(72) Inventors: Brandon Wayne Miller, Evendale, OH (US); Egbert Geertsema, Evendale, OH (US); Arthur W. Sibbach, Boxford, MA (US); Andrew Hudecki, Evendale, OH (US); Timothy Richard DePuy, Evendale, OH (US); John C. Schilling, Evendale, OH (US); Frank Worthoff, Evendale, OH (US); Tsuguji Nakano, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/190,507

(22) Filed: Apr. 25, 2025

Related U.S. Application Data

(63) Continuation-in-part of application No. 18/744,069, filed on Jun. 14, 2024, now Pat. No. 12,292,017.

(51) Int. Cl.
  *F04D 29/66* (2006.01)
  *F02K 3/06* (2006.01)

(52) U.S. Cl.
  CPC .............. *F04D 29/666* (2013.01); *F02K 3/06* (2013.01); *F05D 2200/13* (2013.01); *F05D 2200/14* (2013.01); *F05D 2200/221* (2013.01); *F05D 2200/262* (2013.01); *F05D 2220/36* (2013.01); *F05D 2260/961* (2013.01)

(58) Field of Classification Search
  CPC .... F02K 3/06; F02C 7/045; F02C 7/24; F04D 29/666; F05D 2220/36; F05D 2240/12; F05D 2260/96; F05D 2300/603
  See application file for complete search history.

(56) References Cited

U.S. PATENT DOCUMENTS

| | | | |
|---|---|---|---|
| 3,505,819 A | 4/1970 | Wilde | |
| 3,534,556 A | 10/1970 | Wilde | |
| 5,169,288 A | 12/1992 | Gliebe et al. | |
| 5,299,914 A | 4/1994 | Schilling | |
| 6,195,983 B1 | 3/2001 | Wadia et al. | |

(Continued)

FOREIGN PATENT DOCUMENTS

| | | |
|---|---|---|
| EP | 3 085 897 B1 | 9/2021 |
| FR | 3127024 B1 | 3/2024 |
| FR | 3127025 B1 | 3/2024 |

OTHER PUBLICATIONS

Gliebe et al., *Ultra-High Bypass Engine Aeroacoustic Study*, No. NASA/CR-2003-212525, 2003.

(Continued)

*Primary Examiner* — Brian Christopher Delrue
(74) *Attorney, Agent, or Firm* — Klarquist Sparkman, LLP

(57) ABSTRACT

A gas turbine engine comprises a fan, a core turbine engine coupled to the fan, a fan case housing the fan and the core turbine engine, a plurality of outlet guide vanes extending between the core turbine engine and the fan case, and an acoustic spacing. Relationships between acoustic spacing and a high-speed shaft rating allow for a gas turbine engine that reduces noise emissions while maintaining high performance.

20 Claims, 22 Drawing Sheets

(56) References Cited

U.S. PATENT DOCUMENTS

| | | | |
|---|---|---|---|
| 7,118,331 B2 | 10/2006 | Shahpar | |
| 7,374,403 B2 | 5/2008 | Decker et al. | |
| 7,374,404 B2 | 5/2008 | Schilling et al. | |
| 9,540,938 B2 | 1/2017 | Topol et al. | |
| 9,885,242 B2 | 2/2018 | Atkins et al. | |
| 10,107,191 B2 | 10/2018 | Gilson et al. | |
| 10,247,018 B2 | 4/2019 | Topol et al. | |
| 10,458,426 B2 | 10/2019 | Wilkin, II | |
| 10,584,632 B1 | 3/2020 | Kannangara et al. | |
| 10,677,264 B2* | 6/2020 | Moniz | F04D 29/324 |
| 10,711,797 B2 | 7/2020 | Kroger et al. | |
| 10,815,886 B2 | 10/2020 | Kroger et al. | |
| 11,199,196 B2 | 12/2021 | Breen | |
| 11,377,958 B2 | 7/2022 | Lemarchand et al. | |
| 11,603,801 B2 | 3/2023 | Payyoor et al. | |
| 11,724,813 B2 | 8/2023 | Payyoor et al. | |
| 12,012,898 B2* | 6/2024 | Miller | F02K 3/06 |
| 12,292,017 B1* | 5/2025 | Miller | F02C 7/24 |
| 2006/0228206 A1 | 10/2006 | Decker et al. | |
| 2008/0113211 A1 | 5/2008 | Bruce et al. | |
| 2008/0283676 A1 | 11/2008 | Jain et al. | |
| 2009/0082976 A1 | 3/2009 | Anuzis et al. | |
| 2015/0044028 A1 | 2/2015 | Lord et al. | |
| 2016/0319670 A1 | 11/2016 | Atkins et al. | |
| 2016/0363137 A1 | 12/2016 | Topol et al. | |
| 2017/0022820 A1 | 1/2017 | Joseph et al. | |
| 2017/0184053 A1 | 6/2017 | Harvey et al. | |
| 2017/0298954 A1* | 10/2017 | Qiu | F04D 29/547 |
| 2017/0314562 A1 | 11/2017 | Rose | |
| 2018/0030926 A1 | 2/2018 | Eckett et al. | |
| 2018/0106274 A1 | 4/2018 | Moniz et al. | |
| 2019/0128123 A1 | 5/2019 | Paruchuri et al. | |
| 2019/0376529 A1 | 12/2019 | Joseph et al. | |
| 2020/0347785 A1 | 11/2020 | Morin et al. | |
| 2020/0400069 A1 | 12/2020 | Aguilera et al. | |
| 2022/0042461 A1* | 2/2022 | Molesini | F02C 7/06 |
| 2022/0049621 A1 | 2/2022 | Sawyers-Abbott et al. | |
| 2022/0049656 A1 | 2/2022 | Sawyers-Abbott et al. | |
| 2023/0136238 A1 | 5/2023 | Payyoor et al. | |
| 2023/0151777 A1 | 5/2023 | Bifulco et al. | |
| 2024/0151185 A1* | 5/2024 | Miller | F02K 3/06 |
| 2024/0218828 A1 | 7/2024 | Niergarth et al. | |
| 2024/0318614 A1* | 9/2024 | Mondal | F02C 3/06 |

OTHER PUBLICATIONS

Gray D. E. et al.,: "Energy Efficient Engine Program Technology Benefit/ Cost Study, vol. 2", NASA Contractor Report, NASA, Washington, DC, US vol. 2 Oct. 1, 1983 (Oct. 1, 1983), pp. 1-118, XP009502192, ISSN: 0565-7059 Retrieved from the Internet: URL: https://ntrs.nasa.gov/search.jsp?R=19900019249.

TCDS No. E17NE retrieved from drs.faa.gov/search, 2014.

* cited by examiner

| Engine | As (193) | c (210) chord length | rr radius ratio | S span | Nb | Nv/Nb | γ stagger angle | BEAL | ASR | FBD |
|---|---|---|---|---|---|---|---|---|---|---|
| #1 | 20.0 | 27 | 0.350 | 25.0 | 16 | 2.6 | 33 | 4.70 | 1.62 | 76.9(#1) |
| #2 | 3.0 | 10 | 0.350 | 24.0 | 20 | 3.0 | 30 | 0.56 | 1.80 | 73.8(#1) |
| #3 | 9.0 | 26 | 0.300 | 30.0 | 24 | 2.1 | 31 | 2.30 | 1.88 | 85.7(#2) |
| #4 | 11.0 | 20 | 0.250 | 26.0 | 22 | 3.0 | 35 | 1.53 | 2.40 | 69.3(#1) |
| #5 | 2.0 | 8 | 0.200 | 28.0 | 22 | 3.0 | 30 | 0.22 | 2.96 | 70.0(#1) |
| #6 | 6.0 | 16 | 0.250 | 30.0 | 20 | 2.5 | 45 | 0.80 | 2.98 | 80.0(#2) |
| #7 | 10.0 | 31 | 0.300 | 28.0 | 26 | 2.0 | 34 | 3.13 | 1.60 | 80.0(#2) |
| #8 | 20.0 | 20 | 0.330 | 30.0 | 14 | 2.9 | 30 | 2.46 | 2.84 | 89.6(#2) |
| #9 | 10.0 | 18 | 0.340 | 32.0 | 22 | 3.0 | 31 | 1.20 | 2.79 | 97.0(#2) |
| #10 | 10.0 | 20 | 0.330 | 35.0 | 16 | 2.8 | 55 | 1.22 | 2.91 | 104.5(#3) |
| #11 | 21.0 | 29 | 0.210 | 38.0 | 16 | 2.5 | 31 | 3.00 | 2.80 | 96.2(#3) |
| #12 | 18.0 | 35 | 0.290 | 40.0 | 20 | 3.0 | 36 | 3.49 | 1.72 | 112.7(#3) |
| #13 | 13.1 | 12.8 | 0.275 | 31.9 | 22 | 2.2 | 43.0 | 0.47 | 12.75 | 88.0(#2) |
| #14 | 13.9 | 12.8 | 0.275 | 31.9 | 22 | 2.2 | 43.0 | 0.47 | 13.53 | 88.0(#2) |
| #15 | 19.5 | 13.5 | 0.210 | 28.0 | 14 | 2.9 | 55.0 | 0.68 | 10.11 | 80.0(#2) |
| #16 | 16.5 | 18.5 | 0.270 | 37.2 | 16 | 2.3 | 53.0 | 0.95 | 7.73 | 101.9(#3) |
| #17 | 16.5 | 18.5 | 0.270 | 32.0 | 16 | 2.3 | 53.0 | 1.10 | 6.65 | 87.7(#2) |
| #18 | 14.5 | 12.8 | 0.280 | 31.4 | 20 | 3.0 | 43.0 | 0.53 | 9.12 | 87.2(#2) |
| #19 | 10.3 | 12.8 | 0.275 | 28.0 | 22 | 2.2 | 43.0 | 0.54 | 8.80 | 77.2(#1) |
| #20 | 5.5 | 14.0 | 0.275 | 29.0 | 22 | 2.2 | 43.0 | 0.62 | 4.07 | 80.0(#2) |
| #21 | 3.8 | 11.0 | 0.275 | 33.0 | 22 | 2.2 | 43.0 | 0.34 | 5.18 | 91.0(#2) |
| #22 | 14.0 | 12.0 | 0.275 | 32.0 | 22 | 2.2 | 43.0 | 0.41 | 15.55 | 88.3(#2) |

GAS TURBINE ENGINE WITH ACOUSTIC SPACING OF THE FAN BLADES AND OUTLET GUIDE VANES

CROSS-REFERENCE TO RELATED APPLICATION

This application is a continuation-in-part of U.S. application Ser. No. 18/744,069, filed Jun. 14, 2024. The prior application is incorporated herein by reference in its entirety.

FIELD

This application generally relates to gas turbine engines for aircraft and, more particularly, to geared gas turbine engines with reduced acoustic noise and high performance characteristics of the high-speed shaft.

BACKGROUND

A gas turbine engine for an aircraft typically includes a fan, a compressor, a combustion section, a turbine section, and a nozzle section. The fan propels air entering the gas turbine engine into the compressor. The compressor increases the pressure of the air as the air is routed into the combustion section. The combustion section combusts the pressurized air with fuel to produce combustion gases. The combustion gases are routed through the turbine section and exit the gas turbine engine via the nozzle section, thereby producing thrust.

BRIEF DESCRIPTION OF THE DRAWINGS

FIG. 4 shows exemplary acoustic spacing ratios for exemplary gas turbine engines.

FIG. 12 depicts a ratio of the length of the engine core to the diameter of the engine core ($L_{CORE}/D_{CORE}$) as a function of a first high-speed shaft operating parameter ($HSP_X$) given by relationship (8) detailed below.

FIG. 13 depicts $L_{CORE}/D_{CORE}$ as a function of $HSP_X$, according to another embodiment.

FIG. 14 depicts $L_{CORE}/D_{CORE}$ as a function of $HSP_X$, according to another embodiment.

DETAILED DESCRIPTION

Figure 1:
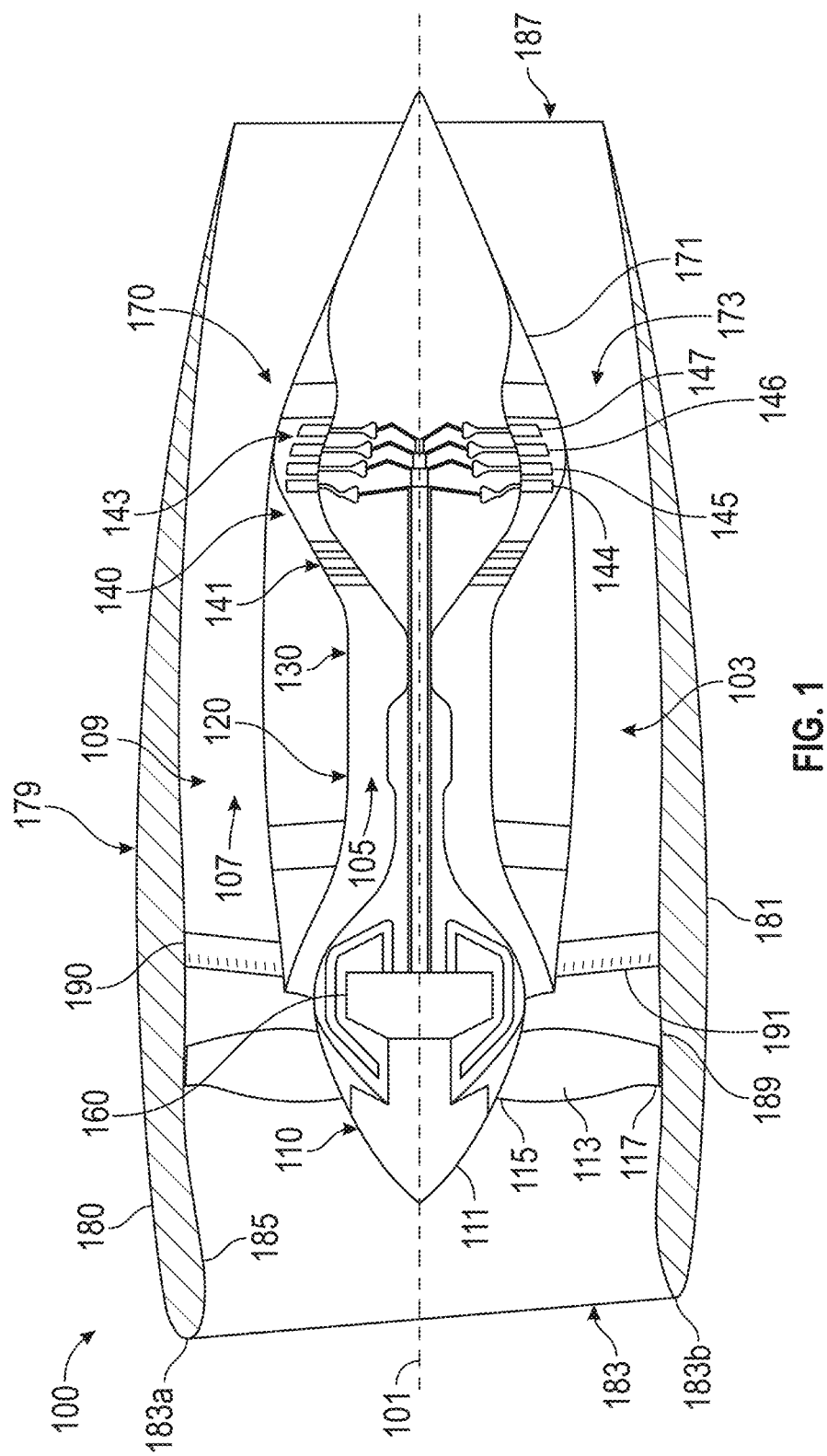
FIG. 1 shows a schematic view of an exemplary gas turbine engine, according to one example.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features and characteristics described in conjunction with a particular aspect, embodiment or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are relatively discernable by one of ordinary skill in the art.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C." As used herein, the term "coupled" generally means physically, chemically, electrically, magnetically, or otherwise coupled or linked and does not exclude the presence of intermediate elements between the coupled items absent specific contrary language.

As used herein in this application and in the claims, the terms "forward" and "fore" refer to an upstream direction oriented towards an inlet of the gas turbine engine.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low" and "high," or their respective comparative degrees (e.g., "lower" and "higher," where applicable), when used with the compressor, turbine, shaft, or spool components, each refers to relative pressures and/or relative speeds within an engine unless otherwise specified. For example, a "low-speed" component defines a component configured to operate at a rotational speed, such as a maximum allowable rotational speed, which is lower than that of a "high-speed" component of the engine. Alternatively, unless otherwise specified, the aforementioned terms may be understood in their superlative degree. For example, a "low-pressure turbine" may refer to the lowest maximum pressure within a turbine section, and a "high-pressure turbine" may refer to the highest maximum pressure within the turbine section. The terms "low" or "high" in such aforementioned regards may additionally, or alternatively, be understood as relative to minimum allowable speeds and/or pressures, or minimum or maximum allowable speeds and/or pressures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein in this application and in the claims, the terms "aft" or "behind" refer to a downstream direction oriented towards an outlet of the gas turbine engine.

As used herein in this application and in the claims, the term "axial" refers to a dimension extending along a central longitudinal axis of the gas turbine engine from a forward portion of the gas turbine engine to an aft portion of the gas turbine engine. As used herein in this application and in the claims, the term "radial" refers to a dimension extending radially outwards from the central longitudinal axis. In addition, as used herein, the terms "circumferential" and "circumferentially" refers to directions and orientations that extend arcuately about the longitudinal centerline of the turbine engine.

As used herein in this application and in the claims, the term "OGV" refers to an outlet guide vane of the gas turbine engine.

As used herein, "overall pressure ratio (OPR)" of a compressor is a ratio of the pressure at the exit of the compressor to the pressure at the inlet of the compressor.

As used herein, "redline speed" means the maximum expected rotational speed of a shaft during normal operation of an engine. The redline speed may be expressed in terms of rotations per second in Hertz (Hz), rotations per minute (RPM), or as a linear velocity of the outer diameter of the shaft in terms of feet per second. For a gas turbine engine that has a high-speed shaft and a low-speed shaft, both the high-speed shaft and the low-speed shaft have redline speeds, The redline speeds of the shafts are typically reported in an engine Type Certificate Data Sheet (TCDS). Alternatively, redline speeds can be referred to as maximum permissible shaft speed at take-off flight conditions (e.g., over a 5 minute duration).

As used herein, "critical speed" means a rotational speed of the shaft that is about the same as the fundamental, or natural frequency of a first-order bending mode of the shaft (e.g., the shaft rotates at eighty Hz and the first-order modal frequency is eighty Hertz). When the shaft rotates at the critical speed, the shaft is expected to have a maximum amount of deflection, hence, instability, due to excitation of the first-order bending mode of the shaft. The critical speed may be expressed in terms of rotations per second in Hertz (Hz), rotations per minute (RPM), or as a linear velocity of the outer diameter of the shaft in terms of feet per second.

As used herein, "critical frequency" and "fundamental frequency" are referred to interchangeably and refer to the fundamental, or natural frequency, of the first-order bending mode of the shaft.

The term "subcritical speed" refers to a shaft redline speed that is less than the fundamental, or natural frequency of the first-order bending mode of the shaft (e.g., the shaft rotates at a redline speed of 70 Hz while the first-order modal frequency is about 80 Hertz). When the rotational speed is subcritical, the shaft is more stable than when rotating at a critical speed. A "subcritical shaft" is a shaft that has a redline speed below the critical speed of the shaft.

The term "supercritical speed" refers to a shaft rotational speed that is above the fundamental, or natural frequency of the first-order bending mode of the shaft (e.g., the shaft rotates at eighty Hz while the first-order modal frequency is about seventy Hertz). A supercritical shaft is less stable than a subcritical shaft because the shaft speed can pass through the critical speed since the fundamental mode of the shaft is below the redline speed. A "supercritical shaft" is a shaft that has a redline speed above the critical speed of the shaft.

As used herein, "bypass ratio" is a ratio between the mass flow rate of air drawn through the fan that goes around the core engine (e.g., the turbomachine) to the mass flow rate of the air that enters the core engine. In other words, the bypass ratio is the ratio of air that bypasses the core engine to the air that passes into the core engine.

As used herein, the term "ceramic matrix composite" ("CMC") refers to a subgroup of composite materials and a subgroup of ceramics. The terms "CMC" and "CMC material" are used interchangeably herein. When the engine component (e.g., the higher pressure turbine module, nozzle, or blades thereof) comprises or includes "CMC" or "CMC material," the engine component may include one of, or combinations of one or more of the ceramic matrix composite materials described herein. Such engine component may also include non-ceramic matrix composite materials, such as a metal alloy (e.g., a CMC material for an airfoil and a separate disk with a dovetail slot made from a metal alloy). Reference to a "first" or a "second" or a "third" CMC material does not preclude the materials from including multiple CMC materials, different CMC materials, or the same CMC materials.

More specifically, CMC refers to a class of materials that includes a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide (Al2O3), silicon dioxide (SiO2), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide (Al2O3), silicon dioxide (SiO2), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide (Al2O3), silicon dioxide (SiO2), aluminosilicates, and mixtures thereof. Aluminosilicates can include crystalline materials such as mullite (3Al2O3·2SiO2), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration ("MI") with silicon, or a cure or pyrolysis to yield a silicon carbide matrix in the preform, and subsequent chemical vapor infiltration ("CVI") with silicon carbide. Additional steps may be taken to improve densification of the preform, either before or after chemical vapor infiltration, by injecting the preform with a liquid resin or polymer followed by a thermal processing step to fill the voids with silicon carbide. CMC material as used herein may be formed using any known methods or hereafter developed including but not limited to melt infiltration, chemical vapor infiltration, polymer impregnation pyrolysis (PIP) and any combination thereof.

Such materials, along with certain monolithic ceramics (i.e., ceramic materials without a reinforcing material), are particularly suitable for higher temperature applications. Additionally, these ceramic materials are lightweight compared to metal alloys (e.g., superalloys), yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine described herein below may be manufactured or formed using any suitable process, such as an additive manufacturing process, such as a three-dimensional (3D) printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of shafts having unique features, configurations, thicknesses, materials, densities, passageways, headers, and mounting structures that may not have been possible or practical using prior manufacturing methods. Some of these features are described herein.

This disclosure and various embodiments relate to a turbomachinery engine, also referred to as a turbine engine, a gas turbine engine, or a turbomachine. In some instances, a turbomachinery engine is configured as a direct drive engine. In other instances, a turbomachinery engine can be configured as an indirect drive engine with a gearbox.

A turbofan engine, or turbomachinery engine, includes a core engine and a power turbine that drives a bypass fan. The bypass fan generates the majority of the thrust of the turbofan engine. The generated thrust can be used to move a payload (e.g., an aircraft). A turbomachine shaft coupled to the power turbine and fan (either directly or through a gearbox) can experience vibrations during operation of the engine. For example, when the shaft rotates at the critical speed of the shaft, the shaft will vibrate excessively. The excessive vibration is due primarily to excitation of a first-order beam bending mode of the shaft. Thus, the shaft may be characterized by a first-order beam bending mode of the shaft, the fundamental resonance frequency (fundamental frequency) of this mode, and the critical speed of rotation of the shaft. If the first-order bending mode may be excited by a low-speed shaft rate occurring during a standard operating range of the engine, undetected vibration, as well as an increased risk of whirl instability, may result.

Gas turbine engines generate significant noise during operation and it is desirable to reduce the amount of noise generated. The degree of noise generated is a function of, among other things, the relative positioning of components of the engine. Modifications to the engine's architecture, such as the relative position of a vane downstream of a rotating part and the airfoil characteristics of the vane, can have a significant impact on the noise generated. However, changes made to reduce noise can also negatively impact performance in terms of weight, drag, etc. One cannot simply change relative positions or airfoil characteristics without imposing significant penalties on the engine drag, weight, etc. Thus, there are difficult trade-offs to be made between, on the one hand, reducing the noise envelope to satisfy more stringent community noise requirements and, on the other hand, not negating performance improvements (weight, drag, specific fuel consumption, etc.) for the sake of reducing the noise generated at take-off. Conventional methods of reducing gas turbine engine noise, such as varying fan pressure ratio ("FPR"), can be insufficient to meet increasingly stringent community noise requirements.

The inventors of the present disclosure have found that a quieter gas turbine engine can be achieved by providing a specific range of acoustic spacing between the fan blades and OGVs in combination with specific ranges of certain other features of the engine architecture. Such a configuration of the fan blades and OGVs may maintain a desired overall propulsive efficiency for the turbofan engine while desirably reducing the noise generated by the engine. As part of the process of determining this acoustic spacing, the inventors discovered that a relationship between a ratio of the acoustic spacing and a blade effective acoustic length, which is determined based on particular features of fan (eg., chord length, span, stagger angle, radius ratio, number of blades), can provide desirable improvements in noise reductions for the gas turbine engine.

FIG. 1 is a schematic cross-section view of a gas turbine engine 100 configured to produce thrust or power for an aircraft. In some examples, the gas turbine engine 100 can be an aircraft engine configured to produce at least 17,500 horsepower of thrust. In other examples, the gas turbine engine 100 can be an aircraft engine configured to produce between 1 and 17,500 horsepower of thrust.

The gas turbine engine 100 defines a central longitudinal axis 101 extending between a forward portion and a rear portion of the gas turbine engine 100. The gas turbine engine 100 includes a core turbine engine 103 centered about the central longitudinal axis 101, a fan 110 disposed forward of the core turbine engine 103, a nacelle 179 which includes a fan case 180 encasing or housing the fan 110, and outlet guide vanes ("OGVs") 190 disposed aft of the fan 110 and extending radially between the core turbine engine 103 and the fan case 180. FIG. 1 illustrates a fan case 180 generally extending to the aft end of the gas turbine engine; however, in other examples, the length and/or relative position of the fan case to the gas turbine engine (forward and/or aft) may vary.

The fan 110 is configured to propel air through the gas turbine engine 100. During the operation of the gas turbine engine 100, the fan 110 draws a first portion of the air 105 into the core turbine engine 103. The fan 110 draws a second portion of the air 107 into a bypass stream 109 disposed outside the core turbine engine 103. The fan 110 comprises a fan disk 111 and a plurality of fan blades 113 that radially extend from the fan disk 111. However, other examples of the fan 110 can comprise additional or alternative components.

The fan disk 111 is centered about and is configured to rotate about the central longitudinal axis 101. The fan disk 111 comprises a front hub that can be aerodynamically contoured to promote airflow through the fan 110.

The plurality of fan blades 113 are coupled to and uniformly spaced around the circumference of the fan disk 111. Each of the plurality of fan blades 113 comprises a fan blade root 115, at which the fan blade 113 is coupled to the fan disk 111, and a fan blade tip 117 disposed opposite the fan blade root 115. The fan blade root 115 is oriented radially inwards towards the central longitudinal axis 101, while the fan blade tip 117 is oriented radially outward away from the central longitudinal axis 101. The distance between the fan blade root 115 and the fan blade tip 117 defines a span or a length of the fan blade 113.

In some examples, the number (Np) of fan blades 113 can desirably be between 14 and 26 fan blades. In other examples, the plurality of fan blades 113 can number between 20 and 24 fan blades, 20 and 22 fan blades, or 22 fan blades.

Characteristics of the fan 110 include the fan pressure ratio ("FPR"). FPR is defined as the ratio of the pressure of the air entering fan 110 from an upstream direction to the pressure of the air exiting the fan 110 in a downstream direction. In some examples, the FPR of the gas turbine engine 100 can be greater than or equal to 1.25 and less than or equal to 1.45. In other examples, the FPR can be greater than 1.30 or 1.35, and less than 1.40.

During operation, the core turbine engine 103 generates mechanical energy for rotating the fan 110. The core turbine engine 103, disposed aft of the fan 110, includes a compressor section 120, a combustion section 130, a turbine section 140, a drive shaft system 150, a gearbox assembly 160, and a nozzle section 170. However, other examples of the gas turbine engine 100 can comprise additional or alternative components.

During operation, the compressor section 120 compresses or increases the pressure of the air 105 propelled into the core turbine engine 103 by the fan 110. The compressor section 120 is typically the forward-most component of the core turbine engine 103 and thus can be disposed directly aft of the fan 110. In some examples, the compressor section 120 comprises one or more stages of a low-pressure compressor and one or more stages of a high-pressure compressor.

The combustion section 130, which is disposed aft of the compressor section 120, combusts the air pressurized by the compressor section 120 with fuel to produce combustion gases.

During operation, the turbine section 140 generates power by extracting thermal and kinetic energy from the combustion gases produced by the combustion section 130. The turbine section 140 produces power in any suitable range sufficient to power the fan 110. The turbine section 140 comprises a high pressure turbine 141 and a low pressure turbine 143. The high pressure turbine 141, disposed aft of the combustion section 130, extracts energy from the combustion gases leaving the combustion section 130. The low pressure turbine 143 is disposed aft of the high pressure turbine 141 and extracts energy from combustion gases leaving the high pressure turbine 141.

In some examples, the low pressure turbine 143 can comprise a plurality of low pressure turbine stages 144, 145, 146, 147. In the illustrated example, the low pressure turbine 143 can be a four-stage low pressure turbine comprising, from fore to aft, a first low pressure turbine stage 144, a second low pressure turbine stage 145, a third low pressure turbine stage 146, and a fourth low pressure turbine stage 147. In some examples, the low pressure turbine comprises three or more stages, such as three stages, four stages, or five stages. Including additional low pressure turbine stages can desirably increase the amount of work extracted from the combustion gases and in some examples, the low pressure turbine comprises four or more stages, such as four stages or five stages.

The drive shaft system 150 can include a high pressure shaft system that couples the high pressure turbine 141 to the compressor section 120 and a low pressure shaft system connecting the low pressure turbine 143 to the fan 110, thereby allowing the turbine section 140 to power the fan 110 and the compressor section 120. In some examples, the drive shaft system 150 can couple the high pressure turbine 141 to the high pressure compressor (not pictured) and can couple the low pressure turbine 143 to the low pressure compressor (not pictured) and the fan 110. In some examples, the drive shaft system 150 can comprise a plurality of concentric shafts configured to rotate about and extending along the central longitudinal axis 101 (also referred to herein as the engine centerline).

The gearbox assembly 160 couples the turbine section 140 to the fan 110. In some examples, the gearbox assembly 160 can be configured to receive power from a plurality of sources. In some examples, the gearbox assembly 160 can be configured to receive power from each of the low pressure turbine stages 144, 145, 146, 147. The gearbox assembly 160 can be configured to drive or output the power to the fan 110, thereby allowing the low pressure turbine 143 and the fan 110 to rotate at their respective desired rotational speeds without affecting the operation of the other components. In some of these examples, the gearbox assembly 160 can comprise one or more epicyclic gearboxes or any other suitable gear train configured to couple the turbine section 140 to the fan 110.

The gearbox assembly 160 reduces the rotational speed of the output (to the fan) relative to the input (from the low pressure turbine). In some examples, a gear ratio of the gearbox assembly 160 can be 2-4. For example, the gear ratio can be 2-2.9, 3.2-4, or 3.25-3.75. In some examples, a gear ratio of the gearbox assembly can be greater than 4, such as 4.1-6.0 or 4.1-5.0.

Once the combustion gases have exited the turbine section 140, the combustion gases pass through the nozzle section 170 and exit the gas turbine engine 100. In some examples, the nozzle section can comprise two co-annular nozzles: a combustion nozzle 171 and a fan nozzle 173. The combustion nozzle 171 is the centermost co-annular nozzle configured to allow combustion gases to exit the core turbine engine 103. The fan nozzle 173 is the outermost co-annular nozzle configured to allow air to exit the bypass stream 109.

The fan case 180 houses or encloses the fan 110. The fan case 180 comprises a hollow shell 181, an inlet 183, a lip 185, an outlet 187, and an acoustic treatment 189. However, other examples of the fan case 180 can include additional or alternative components.

The hollow shell 181 protects and/or insulates the fan 110. The hollow shell 181 extends along the central longitudinal axis 101 from the inlet 183 to the outlet 187. The hollow shell 181 is sized to encompass the core turbine engine 103 fully (as shown), or partially such that the inlet 183 is disposed forward of the fan 110 and the outlet 187 is disposed aft of the OGVs 190. The hollow shell 181 features a streamlined shape to improve aerodynamic performance. In some examples, the hollow shell 181 can be streamlined or tapered such that the inlet 183 or a forward end portion of the hollow shell 181 has a wider diameter than the outlet 187 or an aft end portion of the hollow shell 181.

During operation, the inlet 183 allows the passage of air into the gas turbine engine 100. The inlet 183 comprises a circular, forward-facing opening in the hollow shell 181 centered about the central longitudinal axis 101. In some examples, the inlet 183 can be angled relative to the central longitudinal axis 101 such that a top portion 183a of the inlet 183, i.e., a portion of the inlet 183 at a twelve o'clock position when the gas turbine engine 100 is mounted to an aircraft, extends forward of a bottom portion 183b of the inlet 183 at a six o'clock position, as shown.

The inlet 183 and the hollow shell 181 define a lip 185 extending along the circumference of the inlet 183 at the forward-most edge portion of the hollow shell 181. The lip 185 is contoured or curved to improve aerodynamic performance and/or reduce flow separation. For example, the lip 185 can be contoured such that the hollow shell 181 forms an hourglass shape (in cross-section) forward of the fan 110.

During operation, the outlet 187 allows air and combustion gases to exit the fan case 180. The outlet 187 comprises a circular, aft-facing opening in the hollow shell 181. The outlet 187 can be centered about and orthogonal to the central longitudinal axis 101 of the gas turbine engine 100.

The acoustic treatment 189 can be provided to acoustically insulate the fan case 180 during operation, thereby desirably reducing the amount of noise emitted by the gas turbine engine 100. The acoustic treatment 189 can comprise a multi-layered liner disposed on a circumferential interior surface of the hollow shell 181. When disposed on the circumferential interior surface of the hollow shell 181, the multi-layered liner can comprise a radially innermost porous layer, an intermediate partitioned layer, and a radially outermost impervious layer. In some examples, the acoustic treatment 189 is disposed on the portion of the interior surface of the hollow shell 181 extending between the fan 110 and the OGVs 190.

The OGVs 190 couple the fan case 180 to the core turbine engine 103 and steer the air 107 in the bypass stream 109 towards the fan nozzle 173 and the outlet 187. The OGVs 190 extend radially outwards to the circumferential interior surface of the hollow shell 181 of the fan case 180, and can be disposed in a radially uniform fashion around the circumference of the core turbine engine 103. In some examples, the OGVs 190 can be swept such that a tip or a radially outward end portion of each of the OGVs 190 is angled towards the aft end of the gas turbine engine 100.

In some examples, each of the OGVs comprises a serrated leading edge 191. The serrated leading edge 191 can comprise a waveform or a serration extending radially along the edge of each of the OGVs 190. The waves or serrations are configured to reduce the noise generated by the air in the bypass stream 109 passing over the OGVs 190.

The example gas turbine engine 100 depicted in FIG. 1 should not be construed to preclude other suitable configurations of gas turbine engines. It should also be appreciated that aspects of the present disclosure can be incorporated into other suitable gas turbine engines used in aircraft.

Figure 2:
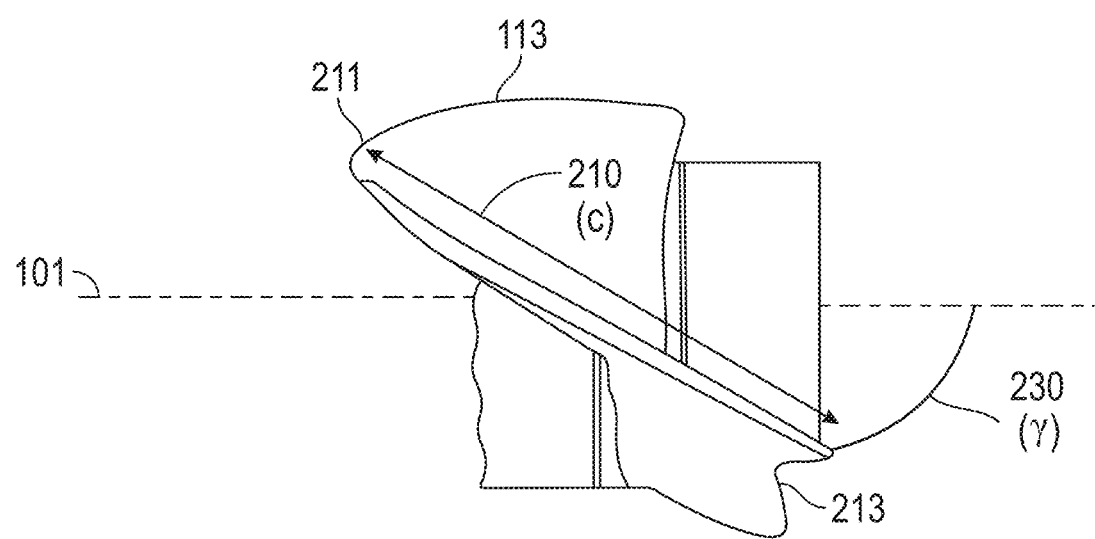
FIG. 2 shows a top view of a fan blade for a gas turbine engine, according to one example.
Figure 3:
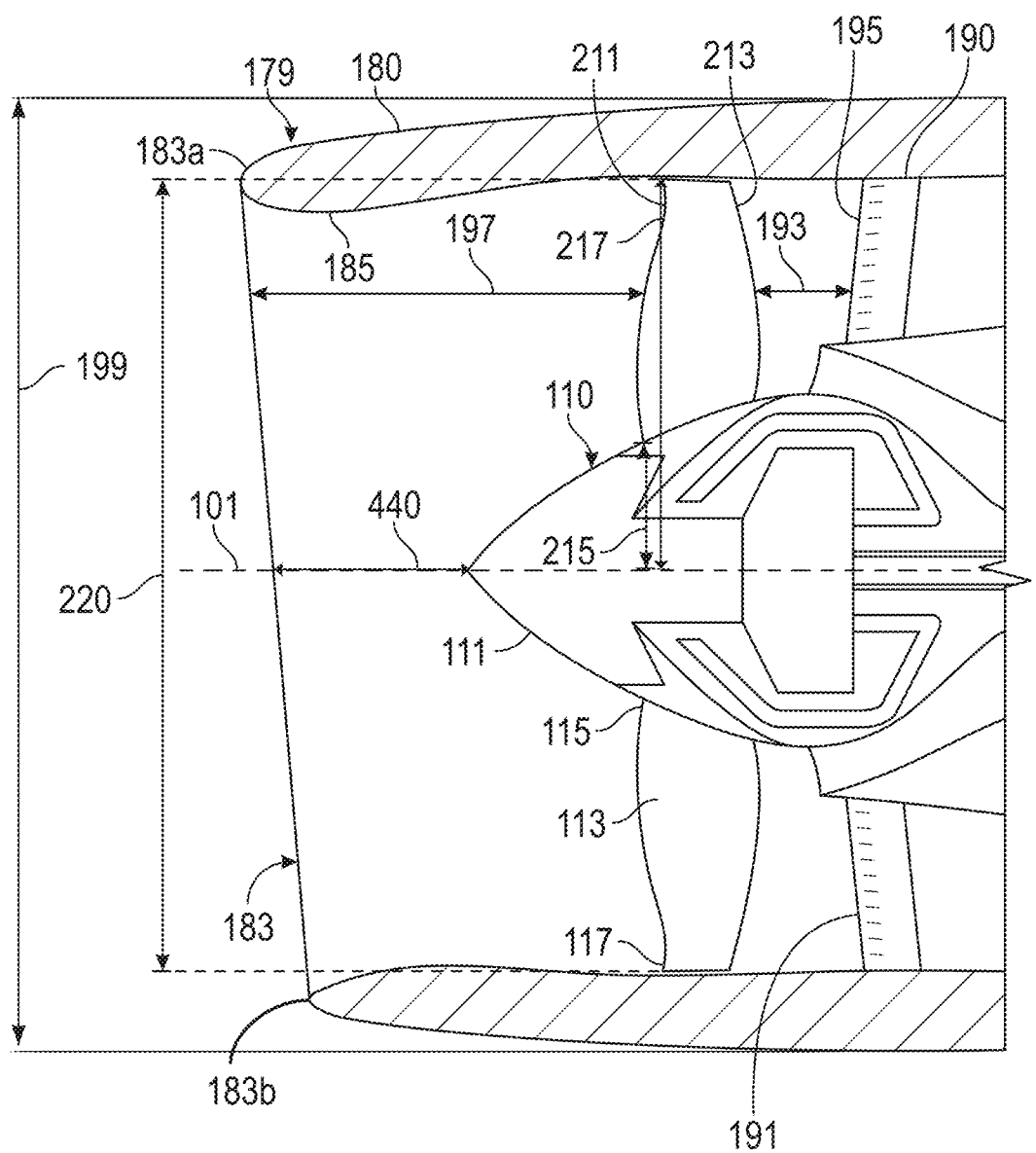
FIG. 3 is a partial view of a gas turbine engine with an acoustic spacing, according to one example.

FIG. 2 shows a top view of a fan blade 113 and FIG. 3 shows a view of the fan 110. Each of the fan blades 113 have a blade solidity (c/s). Each fan blade has a radial span extending from a root at a 0% span position to a tip at a 100% span position. The span S of a blade is the difference in the radius of a leading edge at the tip 217 and the radius of the leading edge of the root at the hub 215.

Blade solidity is defined as the ratio of chord length (c) 210 to the circumferential spacing (s) between the fan blade 113 and a nearest adjacent fan blade 113, measured at a 75% span position of the fan blade 113. As shown in FIG. 2, the chord length 210 is a straight-line distance between a leading edge 211 and a trailing edge 213 of the fan blade. The spacing (s) between adjacent fan blades is calculated by multiplying a fan diameter (e.g. fan diameter 220 shown in FIG. 3) by x and dividing the product by the number ($N_b$) of fan blades.

In a first set of examples, enhanced performance can be observed when the blade solidity of the gas turbine engine is greater than or equal to 0.8 and less than or equal to 2. In a second set of examples, enhanced performance can be observed when the blade solidity is greater than or equal to 0.8 and less than or equal to 1.5. In a third set of examples, enhanced performance can be observed when the blade solidity is greater than or equal to 1 and less than or equal to 2. In a fourth set of examples, enhanced performance can be observed when the blade solidity is greater than or equal to 1.25 and less than or equal to 1.75.

In addition, the fan preferably has a low radius ratio (rr), which is a ratio of the radius of the leading edge of the root at the hub 215 to the radius 217 of a blade tip or 100% span position of a blade, both measured from the central longitudinal axis 101 at the leading edge 211 of fan blades as shown in FIG. 3. In some examples, the radius ratio (rr) is 0.2 to 0.35, in other examples, the radius ratio (rr) is 0.25 to 0.3.

Each of the plurality of fan blades 113 defines a stagger angle ($\gamma$) 230. The stagger angle 230 is an angle between the central longitudinal axis 101 and a chord line (along which the chord length is measured) as measured at the 75% span position of the respective fan blade. In some examples, the stagger angle 230 can range from 30 degrees to 75 degrees. In other examples, the stagger angle 230 can range from 30 degrees to 60 degrees.

As discussed above, the inventors, during the course of engine design, sought to improve engine performance characteristics including thrust efficiency, installation, engine length from inlet to nozzle, fan case and core size (affecting installed drag) and staying within a maximum weight budget. In one example, the OGVs were mounted to a fan frame, along with the fan and the gearbox assembly. This meant that the OGVs would be located relatively close to the fan so that a more compact engine and efficient (strength/weight) load bearing fan frame could be realized. But the resulting proximity of the fan to the OGVs was found to generate more noise than desired. From an acoustics standpoint, one instead wants to space the fan and the OGVs further apart from each other, generally speaking. But this change can impact the placement of other subsystems and adversely affect overall performance, e.g., gearbox assembly placement and resulting load balances associated with the fan frame, fan frame length, overturning moments, and overall weight of a nacelle, either the fan case type illustrated in FIG. 1 or an engine with a short fan case, such as the engines illustrated in FIGS. 3 and 4, and described in paragraphs [0083]-[0092] of U.S. Patent Application Publication No. 2022/0042461, which have a fan nozzle terminating well upstream of the core nozzle located downstream of the low pressure turbine. As each change impacts other systems, there is a need to understand what combination, or extent of modifications, provide improved acoustic performance without unacceptably negatively impacting other aspects of the engine architecture, as mentioned. Thus, it was exceedingly more challenging to determine how to implement changes without affecting other aspects of the architecture upon which increased performance was dependent upon, than simply making modifications to reduce the noise generated.

Taking these things in mind, the inventors unexpectedly discovered that gas turbine engines, such as the gas turbine engine 100 of FIG. 1, embodying the below-described characteristics have improved acoustic characteristics, but without imposing severe and unacceptable penalties on other aspects of the architecture or engine aero-performance. For example, the inventors found that gas turbine engines with desirable placement of OGVs, such as the OGVs 190 of FIG. 1, may result in the maintaining of or improving upon a desired propulsive efficiency, while improving the turbofan engine's acoustic properties.

FIG. 3 is a schematic, partial cross-sectional view of a gas turbine engine in accordance with the disclosure. For gas turbine engines that have a blade solidity greater than or equal to 0.8 and less than or equal to 2, it has been found that such engines are characterized by a blade effective acoustic length (BEAL) that can be used, as explained below, to determine a range of modifications and/or adjustments that provide improved acoustic performance. The BEAL is determined from (a) below:

$$\text{BEAL} = 2c^2/S(1-rr)N_b \cos(\gamma) \tag{a}$$

where c is the chord length at 75% span, rr is the radius ratio of the fan, S is the full span of the fan blade (i.e, as measured at a 100% span position at the blade leading edge), $\gamma$ is the stagger angle, and $N_b$ is the number of fan blades.

Exemplary ranges for the elements of the gas turbine engines described herein are provided below in TABLE A. As shown in TABLE A, for some variables, the exemplary ranges vary depending on a corresponding range of fan blade diameter. For example, the fan blade diameter (FBD) for three different ranges, FB D #1, FB D #2, and FBD #3 are shown below.

65 ≤ FBD #1 < 80 inches
80 ≤ FBD #2 < 95 inches
95 ≤ FBD #3 < 115 inches

TABLE A

| Symbol | Description | Exemplary Ranges for Use with BEAL |
|---|---|---|
| C | Chord length at 75% span position (ranges based on FBD) | 5" to 28" (for FBD#1) 6" to 33" (for FBD#2) 7" to 35" (for FBD#3) |
| S | Span of fan blade at 100% span position (ranges based on FBD) | 24" to 30" (for FBD#1) 28" to 36" (for FBD#2) 32" to 40" (for FBD#3) |
| rr | Radius ratio (range) | 0.2 to 0.35 |
| Nv | Number of OGVs (ranges) | 1.5 Nb to 3 Nb, 1.8 Nb to 2.4 Nb, 2.0 Nb to 2.5 Nb, or 2.2 Nb to 2.6 Nb |
| $\gamma$ | Stagger angle (ranges) | 30°-75° or 30°-60° |
| $N_b$ | Number of fan blades (ranges) | 14-26, 20-24, 20-22, or 22 |

As shown in FIG. 3, an acoustic spacing 193 (As) is a length, measured parallel to the central longitudinal axis 101, that extends from the trailing edge 213 of the fan blade 113 to the leading edge 195 of a corresponding one of the OGVs 190. An inlet length 197 is an axial distance between the leading edge 211 of a fan blade 113 and the inlet 183. The acoustic spacing 193, chord length 210 (FIG. 2), and inlet length 197 are measured at the 75% span position of the fan blade 113.

An acoustic spacing ratio (ASR) can be determined using the BEAL, ratio of Nv/Nb, and the acoustic spacing (As) as shown below in (b):

$$ASR = \frac{1}{\left(\frac{Nv}{Nb}\right)} \cdot \frac{As}{BEAL} \qquad (b)$$

Nv is the number of vanes of the OGVs. In some examples, the number of OGVs (NV) are at least twice the number of fan blades (Nb). In some examples, a ratio of the number of OGVs to the number of fan blades (Nv/Nb) is 2.0 to 2.5, or 2.2 to 2.6. In other examples, the ratio of the number of OGVs to the number of fan blades (Nv/Nb) is 1.5 to 3.0 or 1.8 to 2.4.

Varying the acoustic spacing ratio can impact engine performance in the following ways. For example, gas turbine engines with higher acoustic spacing ratios can emit less noise. And gas turbine engines with lower acoustic spacing ratios can reduce the size of the gas turbine engines, thereby beneficially reducing fuel consumption and emissions generated by the gas turbine engines.

Gas turbine engines with the acoustic spacing ratios described herein exhibited the sought-after balance (discussed above) between noise emissions and engine size, thereby featuring enhanced performance over conventional gas turbine engines. For example, enhanced results can be achieved with acoustic spacing ratios from 1.5 to 16, including the lower ratios such as 1.5 to 3.1 or 1.6 to 3, 1.6 to 2.4 or 2.0 to 3, and higher ratios such as 4 to 14 or 6.6 to 13.5, depending on a desired acoustic spacing and fan blade design.

As shown in FIGS. 1 and 3, the axial extent of the inlet 183 can vary, e.g., between a twelve o'clock position and a six o'clock position. For this type of fan case 180, the inlet length 197 is the average the axial distance between the leading edge 211 of the fan blade 113 and the top portion 183a of the inlet 183, and the axial distance between the leading edge 211 the fan blades 113 and the bottom portion 183b of the inlet 183, i.e., the inlet length 197 is distance from the leading edge 211 of the fan blade 113 and the inlet 183, as measured at the 75% span position of the fan blade 113.

In one set of examples, the fan diameter 220 ranges from 52 in. to 120 in. In another set of examples, the fan diameter 220 ranges from 75 in. to 105 in. In additional sets of examples, the fan diameter 220 ranges from 70 in. to 80 in, 80 in. to 95 in., or 95 in. to 105 in. An inlet length ratio is the ratio of the inlet length 197 to the fan diameter 220. Enhanced performance of gas turbine engines 100 can be achieved with inlet length ratios from 0.15 to 0.5. Gas turbine engines 100 with inlet length ratios less than or equal to 0.5 can desirably feature enhanced performance compared to conventional gas turbine engines 100 due to reduced fan case length, reduced drag, and reduced fan distortion. In another set of examples, enhanced performance can unexpectedly be achieved with inlet length ratios from 0.15 to 0.4. In further examples, enhanced performance can be achieved with inlet length ratios from 0.15 to 0.3.

In another set of examples, an inlet-to-nacelle (ITN) ratio is defined as a ratio of the inlet length 197 to a nacelle outer diameter 199, which is the largest diameter of the nacelle 179. Enhanced performance of gas turbine engines 100 can be achieved with ITN ratios from 0.23 to 0.35. Gas turbine engines 100 with ITN ratios can desirably feature enhanced performance compared to conventional gas turbine engines 100 due to reduced fan case length, reduced drag, and reduced fan distortion. In another set of examples, enhanced performance can unexpectedly be achieved with ITN ratios from 0.27 to 0.35, and from 0.30 to 0.33.

FIG. 3 illustrates a disk spacing length 440, which is the distance between a forwardmost end of the fan disk 111 and the intersection of the inlet taken along the engine centerline (i.e., central longitudinal axis 101). A disk-to-blade diametric (DBD) ratio is the ratio of the disk spacing length 440 to the fan diameter 220. The inventors of the present disclosure have found that enhanced performance of gas turbine engines 100 can be achieved with disk-to-blade diametric ratios that are less than or equal to 0.6, and in some examples with disk-to-blade diametric ratios that range from 0.09 to 0.59, 0.15 to 0.35, and 0.19 to 0.27. Gas turbine engines 100 with disk-to-blade diametric ratios in these ranges can desirably feature enhanced performance compared to conventional gas turbine engines 100 due to reduced drag and reduced fan distortion. Further benefits have been identified when a gas turbine engine is configured to have a DBD ratio in the ranges disclosed above, in combination with an ITN ratio in the ranges disclosed above. For example, a gas turbine engine can have a DBD ratio of 0.22 and an ITN ratio of 0.27, both of which meet at least one of the stated desirable ranges for the DBD and ITN ratios. It should be noted that a gas turbine engine can be configured to meet any combination of the disclosed DBD ratios and the disclosed ITN ratios.

In another set of examples, enhanced performance can unexpectedly be achieved with disk-to-nacelle ratios below 0.47. A disk-to-nacelle diametric (DND) ratio is the ratio of the disk spacing length 440 to the nacelle diameter 199. The inventors of the present disclosure have found that enhanced performance of gas turbine engines 100 can be achieved with disk-to-nacelle diametric ratios that range from 0.07 to 0.47, 0.15 to 0.35, and 0.19 to 0.27. Gas turbine engines 100 with disk-to-nacelle diametric ratios in these ranges can desirably feature enhanced performance compared to conventional gas turbine engines 100 due to reduced drag and reduced fan distortion. Further benefits have been identified when a gas turbine engine is configured to have a DND ratio in the ranges disclosed above, in combination with an ITN ratio in the ranges disclosed above. For example, a gas turbine engine can have a DND ratio of 0.21 and an ITN ratio of 0.27, both of which meet at least one of the stated desirable ranges for the DND and ITN ratios. It should be noted that a gas turbine engine can be configured to meet any combination of the disclosed DND ratios and the disclosed ITN ratios.

In another set of examples, enhanced performance can unexpectedly be achieved with disk-to-inlet length (DIL) ratios within the range 0.30 to 0.80. A disk-to-inlet ratio is the ratio of the disk spacing length 440 to the inlet length 197. The inventors of the present disclosure have found that enhanced performance of gas turbine engines 100 can be also be achieved with disk-to-inlet ratios that range from 0.4 to 0.8, 0.4 to 0.7, and 0.45 to 0.67. Gas turbine engines 100 with disk-to-inlet ratios in these ranges can desirably feature enhanced performance compared to conventional gas turbine engines 100 due to reduced drag and reduced fan distortion. Further benefits have been identified when a gas turbine engine is configured to have a DIL ratio in the ranges disclosed above, in combination with an ITN ratio in the ranges disclosed above. For example, a gas turbine engine can have a DIL ratio of 0.49 and an ITN ratio of 0.27, both of which meet at least one of the stated desirable ranges for the DIL and ITN ratios. It should be noted that a gas turbine engine can be configured to meet any combination of the disclosed DIL ratios and the disclosed ITN ratios.

Table 2 below illustrates exemplary engines with the disk-to-blade diametric (DBD) ratios, disk-to-nacelle diametric (DND) ratios, and disk-to-inlet (DIL) ratios in the ranges disclosed herein. For each exemplary gas turbine engine disclosed in TABLE B, the gas turbine engine has an ITN ratio that is 0.23 to 0.35.

TABLE B

| Engine | fan-disk spacing length (in) 440 | fan diameter (in) 220 | nacelle diameter (in) 199 | inlet length (in) 197 | DBD Ratio | DND Ratio | DIL Ratio |
|---|---|---|---|---|---|---|---|
| 1 | 24 | 46 | 64 | 36 | 0.52 | 0.38 | 0.67 |
| 2 | 26 | 53 | 75 | 37 | 0.49 | 0.35 | 0.70 |
| 3 | 35 | 61 | 87 | 48 | 0.57 | 0.40 | 0.73 |
| 4 | 24 | 69 | 96 | 37 | 0.35 | 0.25 | 0.65 |
| 5 | 21 | 78 | 102 | 37 | 0.27 | 0.21 | 0.57 |
| 6 | 22 | 78 | 104 | 39 | 0.28 | 0.21 | 0.56 |
| 7 | 48 | 93 | 115 | 63 | 0.52 | 0.42 | 0.76 |
| 8 | 17 | 88 | 116 | 35 | 0.19 | 0.15 | 0.49 |
| 9 | 21 | 80 | 107 | 32 | 0.26 | 0.20 | 0.66 |
| 10 | 10 | 115 | 135 | 33 | 0.09 | 0.07 | 0.30 |
| 11 | 36 | 61 | 77 | 45 | 0.59 | 0.47 | 0.80 |

FIG. 4 discloses acoustic spacing ratios for exemplary gas turbine engines as described herein. Engines #1, 2, 4, 5, and 19 illustrate exemplary engines with fan blades having fan diameters in the FB D #1 range, Engines #3, 6, 7, 8, 13, 14, 15, 17, 18, 20, 21, and 22 illustrate exemplary engines with fan blades having fan diameters in the FB D #2 range, and Engines #9, 10, 11, 12, and 16 illustrate exemplary engines with fan blades having fan diameters in the FBD #3 range. In each of the exemplary engines, the ASR is in the range of 1.5 to 16.0.

As noted above, the ASR can be in the range of 1.5 to 16.0, or as shown in FIG. 4, in ranges from 1.5 to 4.1, 1.5 to 3.1, 1.6 to 3, 1.6 to 2.4 or 2.0 to 3, and, depending on the desired fan blade selection, higher ratios such as 4 to 14, 6.6 to 13.5, or 6.5-10.2.

In some embodiments, it was additionally found that the acoustic performance can be further improved without negatively affecting other aspects of performance by using composite fan blades to enable a higher bypass ratio. A higher bypass ratio can reduce noise generation, thereby improving acoustic performance, by reducing the fan pressure ratio of the fan (eg., from 1.5 to 1.4, or 1.35), and operating within the defined ranges for BEAL and ASR, as discussed above. Some embodiments include turbomachines with bypass ratios of 10:1 to 17:1, or, in other examples from 12:1 to 15:1, where bypass ratio is defined as the ratio of air passing through the fan case that bypasses the inlet to the engine core, to the air that enters the engine core, at a takeoff condition. For the higher bypass ratios in this range, it was found that composite blades, operating in the defined BEAL and ASR ranges, provide improved acoustic performance while also providing improved blade toughness when encountering flutter or foreign object impact that can result in blade loss.

In some embodiments, the fan blades comprise composite materials. For example, the fan blade can comprise fiber-reinforced composite materials that include a matrix and one or more plies with fibers. The fiber-reinforced composite material can be formed from a continuous wrap ply or from multiple individual plies. In some examples, the fiber-reinforced composite material can be formed with a plurality of fiber plies (or bands) interwoven in an in-plane and out-of-plane orientation by interleaving each of the plurality of fiber bands with one or more of the plurality of fiber bands previously laid down and not in a common plane to fill the one or more gaps and define a uniformly covered multi-layered assembly. The plurality of fiber bands can also be interwoven in three or more different orientation angles, as described in U.S. Pat. No. 9,249,530, which is incorporated by reference in its entirety herein. In some examples, the fibers can be woven in three dimensions as described in U.S. Pat. No. 7,101,154, which is incorporated by reference in its entirety herein.

The fiber types may be mixed within a given layer, ply or different plies may be formed using different fiber types. In one example, harder, shear resistant fibers may be incorporated at an impact surface, while the fiber near a back surface may be selected for enhanced energy absorption. Non-limiting examples of harder shear resistant fibers include metallic or ceramic fibers. Non-limiting examples of fibers with relatively high energy absorption include S-glass, aramid fibers (eg., Kevlar® and Twaron®), as well as oriented polyethylene fibers, such as Spectra® and Dyneem®. Kevlar® is sold by E. I. du Pont de Nemours and Company, Richmond Va. Twaron® aramid fibers are sold by Tejin Twaron, the Netherlands. Spectra® fiber is sold by Honeywell Specialty Materials, Morris N.J. Dyneema® fiber is sold by Dutch State Mines (DSM), the Netherlands.

As discussed above, a turbofan engine, or turbomachinery engine, includes a core engine and a power turbine that drives a bypass fan. The bypass fan generates the majority of the thrust of the turbofan engine. The generated thrust can be used to move a payload (e.g., an aircraft). A turbomachine shaft coupled to the power turbine and fan (either directly or through a gearbox) can experience vibrations during operation of the engine. For example, when the shaft rotates at the critical speed of the shaft, the shaft will vibrate excessively. The excessive vibration is due primarily to excitation of a first-order beam bending mode of the shaft. Thus, the shaft may be characterized by a first-order beam bending mode of the shaft, the fundamental resonance frequency (fundamental frequency) of this mode, and the critical speed of rotation of the shaft. If the first-order bending mode may be excited by a low-speed shaft rate occurring during a standard operating range of the engine, undetected vibration, as well as an increased risk of whirl instability, may result.

Newer engine architectures may be characterized by higher bypass ratio (e.g., greater than 8.0, greater than 10.0, or greater than 12.0) engine designs to improve overall efficiency of the engine in converting kinetic energy to mechanical energy in the form of propulsion. For example, the bypass ratio is greater than 8.0 for engine thrust class of less than 20,000 lbf, greater than 10.0 for engine thrust class of about 20,000 lbf, and greater than 12.0 for engine thrust class of greater than 30,000 lbf. Typically, the fan size is increased to achieve the higher bypass ratios and the low-pressure (LP) shaft that couples the LP turbine and the LP compressor is also increased to accommodate the larger fan sizes. The increase in the LP shaft, however, results in lower shaft speeds and lower overall power through the LP shaft to the fan. Additionally, the engine core (e.g., the high-pressure compressor, the combustor, and the high-pressure turbine) needs to fit within a smaller space as the bypass ratios are increased. These trends can result in reductions in stiffness-to-weight ratio for the shaft and structure that influences dynamics of the HP shaft. For example, with the higher bypass ratio engines, the flow size (e.g., mass flow rate) to the engine core decreases. Typically, the size (e.g., length and diameter) of the HP shaft is scaled down to accommodate the decreased flow size in order to decrease the overall size of the engine core (e.g., smaller engine core).

However, components of the engine core (e.g., the blades, the vanes or the nozzles, the axial gaps between the blades and the vanes or the nozzles and/or the combustor) are unable to be scaled down to achieve the smaller engine core while maintaining the desired thrust for a particular engine thrust class.

The length of the engine core and the diameter of the engine core each affect the dynamics of the HP shaft. For example, the HP shaft dynamics is dependent on the engine core length to diameter ratio ($L_{CORE}/D_{CORE}$). Higher $L_{CORE}/D_{CORE}$ values result in reduced margins for Alford stability (e.g., a fundamental/first bending mode that is an excitation due to clearance changes around the periphery of the HP rotor) and for the third mode (e.g., an S-shaped bending mode that occurs at redline speeds) of the HP shaft. In particular, as the $L_{CORE}/D_{CORE}$ value increases, the Alford margin and the third mode margin decreases, thereby, lowering the maximum allowable redline speeds at which the HP shaft may rotate before experiencing instability due to Alford forces and/or excessive excitation of the third mode.

Typically, the decreased Alford margin and the third mode margin are mitigated by increasing the radius ratio (e.g., a ratio of the hub radius to the tip radius) of the HP compressor (e.g., increasing diameter of the HP compressor) and reducing the HP compressor stage count (e.g., resulting in a reduced engine core length). However, this results in poorer aerodynamic performance of the HP compressor and/or of the HP turbine (e.g., higher tip clearance to blade height ratios), increased weight of the engine core (e.g., and of the overall engine), and a reduced overall pressure ratio (OPR) due to lower pressure ratio from the HP compressor. To enable higher OPRs, the pressure ratio is transferred to a booster (e.g., low-pressure compressor), resulting in increased HP compressor inlet temperatures (e.g., also referred to as T25). This causes higher HP shaft redline speeds (e.g., for similar inlet corrected flow conditions), thereby decreasing the Alford margin and the third mode margin. Increasing the HP shaft length also increases the LP shaft length to accommodate the longer HP shaft. Further, the higher HP shaft redline speed and the smaller engine core diameter restricts the LP shaft diameter (e.g., reduced core bearing diameters due to DN limits (e.g., DN is the product of diameter (D) in mm and speed (N) in RPM and is used to determine the correct lubricant viscosity for a particular bearing), reduced HP disk bore diameters, etc.), thereby limiting the design space for subcritical shaft designs or a feasible diameter for the LP shaft to support the required torque. For example, as the shaft speeds increase, the bearings that support the HP shaft have to be decreased in diameter to accommodate the faster shaft speeds and smaller core size. This puts a constraint on the diameter of the LP shaft, thereby affecting the dynamics of the LP shaft.

Thus, a balance is ultimately struck (penalties vs. benefits) to maintain or to enhance engine performance (e.g., by increasing the bypass ratio), while also enabling an increase in the redline speed of the HP shaft, or not lowering the critical speed, e.g., add one or two additional stages to a compressor to increase efficiency, to allow for smaller engine cores and higher bypass ratio engines without operating at instabilities due to Alford forces or the third bending mode of the HP shaft.

The high-speed shaft rating (HSR) and related relationships described herein further constrain the acoustic spacing and engine length. The HSR accounts for the interplay between the length and diameter of the central engine components, the high-pressure compressor stage count, and the operating parameters of the shaft. These factors influence the dynamics and stability margins of the engine, particularly for high bypass ratio designs. For example, increasing the acoustic spacing may necessitate repositioning the low-pressure turbine or other downstream components, which could affect the shaft dynamics and stability. The HSR relationships ensure that changes in acoustic spacing do not compromise the engine's ability to operate within stable margins.

Increasing the acoustic spacing to reduce noise emissions without the constraints provided by HSR and other relationships described herein can also lead to a cascading effect on the engine's architecture. For instance, repositioning the OGVs further aft may require adjustments to the placement of the gearbox assembly, fan frame, and low-pressure turbine. These changes can impact the load distribution, structural integrity, and overall weight of the engine.

The inventors have found that the disclosed system enables engines with improved stability margins and enhanced performance by carefully balancing acoustic spacing with the ASR, BEAL, and HSR relationships. For example, the ASR and BEAL relationships allow for the improvements of fan blade design parameters, such as chord length, span, stagger angle, and radius ratio, to achieve the desired acoustic spacing within the constraints of the engine length. Similarly, the HSR relationships ensure that the engine operates within stable margins, even as the acoustic spacing is adjusted. In this manner, the disclosed system provides a framework for improvements in acoustic spacing in gas turbine engines while accounting for the constraints imposed by engine length, shaft dynamics, and architectural trade-offs. By carefully balancing these factors, the inventors have achieved a quieter engine design that maintains propulsive efficiency and stability.

Different approaches for engine types, midshaft geometry, bearing support, and material compositions are needed for next-generation turbomachine engines, to permit high-speed operation without resulting in an unstable bending mode and Alford stability, and, therefore, vibrations during regular operation. The various embodiments, as described herein include turbomachine shafts that employ one or more of the above-mentioned techniques to increase the maximum allowable redline speed of the HP shaft and/or to maintain a design speed for improved efficiency while mitigating or avoiding instability due to Alford forces and/or excessive excitation of the HP shaft third mode.

Figure 5:
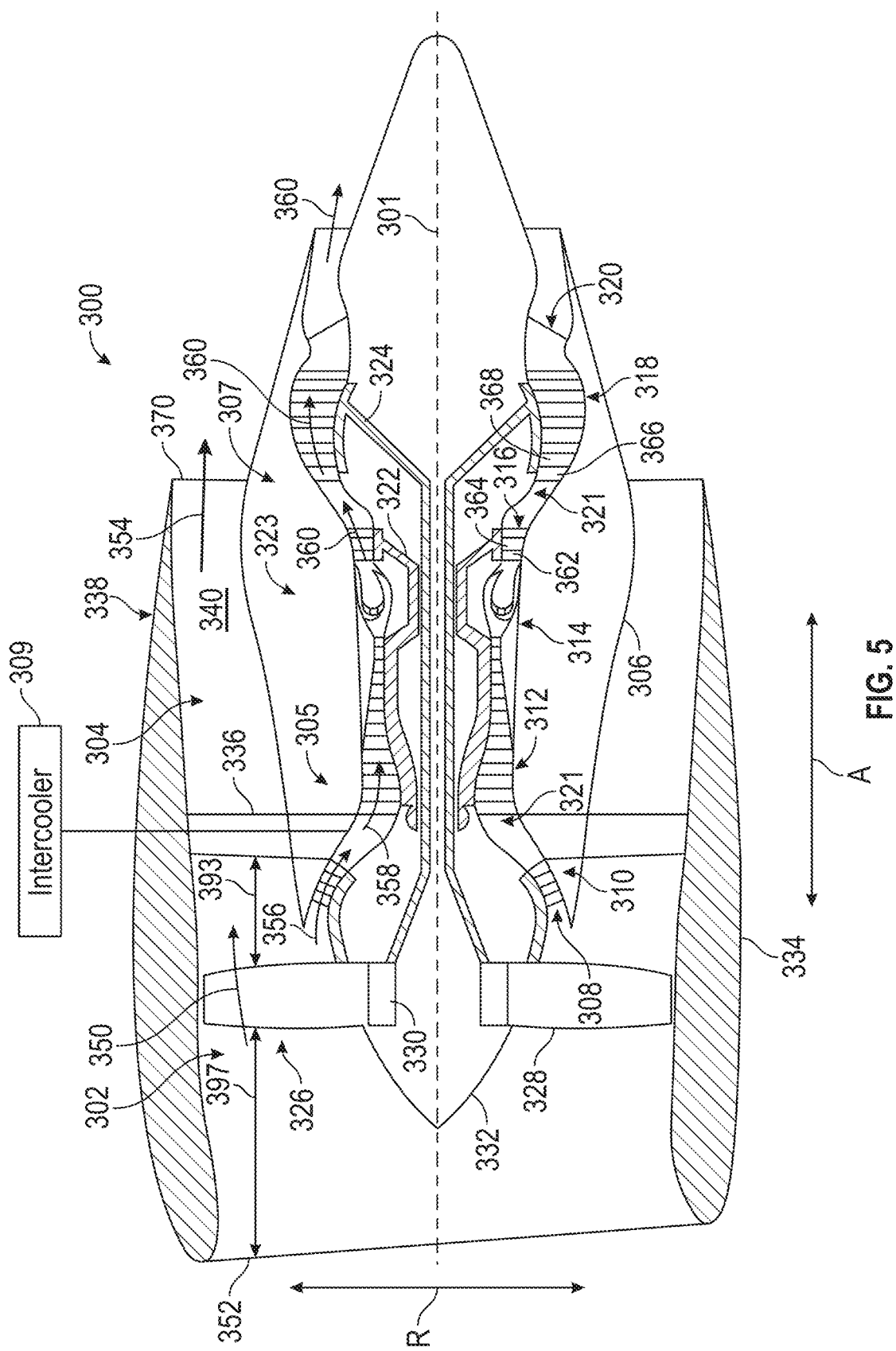
FIG. 5 is a schematic, cross-sectional diagram of a turbine engine, taken along a longitudinal centerline axis of the turbine engine, according to the present disclosure.

Referring now to the drawings, FIG. 5 is a schematic cross-sectional diagram of a turbine engine 300, taken along a longitudinal centerline axis 301 of the turbine engine 300, according to an embodiment of the present disclosure. For the embodiment depicted in FIG. 5, the turbine engine 300 is a high bypass ratio turbofan engine. The turbine engine 300 has an axial direction A (extending parallel to the longitudinal centerline axis 301 provided for reference) and a radial direction R that is normal to the axial direction A. In general, the turbine engine 300 includes a fan section 302 and a turbomachine 304 disposed downstream from the fan section 302. The terms "gas turbine engine," "turbomachine engine," "turbomachinery engine," and "turbine engine" are used interchangeably herein.

The turbomachine 304 depicted generally includes an outer casing 306 that is substantially tubular and defines an inlet 308. In this embodiment, the inlet 308 is annular. As schematically shown in FIG. 5, the outer casing 306 encases, in serial flow relationship, a compressor section 305 including a booster or a low-pressure (LP) compressor 310 followed downstream by a high-pressure (HP) compressor 312, a combustion section 314, a turbine section 307 including a high-pressure (HP) turbine 316 followed downstream by a low-pressure (LP) turbine 318, and a jet exhaust nozzle section 320. The LP turbine 318 is also referred to as a power turbine. The compressor section 305, the combustion section 314, the turbine section 307, and the jet exhaust nozzle section 320 together define a core air flowpath 321. A high-pressure (HP) shaft 322 (also referred to as a high-speed shaft) drivingly connects the HP turbine 316 to the HP compressor 312 to rotate the HP turbine 316 and the HP compressor 312 in unison. Together, the HP compressor 312, the combustion section 314, and the HP turbine 316 define an engine core 323 of the turbine engine 300. A low-pressure (LP) shaft 324 (also referred to as a low-speed shaft) drivingly connects the LP turbine 318 to the LP compressor 310 to rotate the LP turbine 318 and the LP compressor 310 in unison. In this way, the turbine engine 300 is a two-spool gas turbine engine.

In some embodiments, the turbine engine 300 includes an intercooler 309, which cools the air in the engine flow path downstream of the LP compressor 310 before it enters the HP compressor 312 during flight conditions like takeoff or maximum thrust. The intercooler 309 can be of any type, such as a heat exchanger in the inter-compressor frame or casing (e.g., in the outer casing 306), where cooling fluid absorbs heat from the flow path air. This cooling fluid can be a thermal bus or fuel, with the thermal bus absorbing heat from the core air and rejecting it into a heat sink, such as fuel and/or bypass air. In some embodiments, the intercooler 309 includes a heat exchanger between the core air and the bypass air, or water or steam injected into the core flow path at the inter-compressor frame. Although the intercooler 309 is described in relation to FIG. 5, any of the turbine engines detailed here can include an intercooler 309.

For the embodiment depicted in FIG. 5, the fan section 302 includes a fan 326 having a plurality of fan blades 328 coupled to a disk 330 in a spaced apart manner. As depicted in FIG. 5, the fan blades 328 extend outwardly from the disk 330 generally along the radial direction R. In some embodiments, each fan blade 328 is rotatable relative to the disk 330 about a pitch axis such that the pitch of the plurality of fan blades 328 can be collectively varied in unison. The plurality of fan blades 328 and the disk 330 are together rotatable about the longitudinal centerline axis 301 by the LP shaft 324. In this way, the turbine engine 300 is considered a direct drive turbine engine. The disk 330 is covered by a rotatable fan hub 332 aerodynamically contoured to promote an airflow through the plurality of fan blades 328. In addition, the fan section 302 includes an annular fan casing or a nacelle 334 that circumferentially surrounds the fan 326 and/or at least a portion of the turbomachine 304. The nacelle 334 is supported relative to the turbomachine 304 by a plurality of circumferentially spaced outlet guide vanes 336. Moreover, a downstream section 338 of the nacelle 334 extends over an outer portion of the turbomachine 304 to define a bypass airflow passage 340 therebetween.

During operation of the turbine engine 300, a volume of air 350 enters the turbine engine 300 through an inlet 352 of the nacelle 334 and/or the fan section 302. As the volume of air 350 passes across the plurality of fan blades 328, a first portion of air 354 is directed or routed into the bypass airflow passage 340, and a second portion of air 356 is directed or is routed into the upstream section of the core air flowpath 321, or, more specifically, into the inlet 308 of the LP compressor 310. The ratio between the first portion of air 354 and the second portion of air 356 is commonly known as a bypass ratio. The turbine engine 300 has a high bypass ratio (e.g., greater than 8.0, greater than 10.0, or greater than 12.0), as detailed further below. The pressure of the second portion of air 356 is then increased, forming compressed air 358, and the compressed air 358 is routed through the HP compressor 312 and into the combustion section 314, where the compressed air 358 is mixed with fuel and burned to provide combustion gases 360.

The combustion gases 360 are routed into the HP turbine 316 and expanded through the HP turbine 316 where a portion of thermal and/or of kinetic energy from the combustion gases 360 is extracted via sequential stages of HP turbine stator vanes 362 that are coupled to the outer casing 306 and HP turbine rotor blades 364 that are coupled to the HP shaft 322, thus, causing the HP shaft 322 to rotate, thereby supporting operation of the HP compressor 312. The combustion gases 360 are then routed into the LP turbine 318 and expanded through the LP turbine 318. Here, a second portion of thermal and kinetic energy is extracted from the combustion gases 360 via sequential stages of LP turbine stator vanes 366 that are coupled to the outer casing 306 and LP turbine rotor blades 368 that are coupled to the LP shaft 324, thus, causing the LP shaft 324 to rotate, thereby supporting operation of the LP compressor 310 and rotation of the fan 326 via LP shaft 324.

The combustion gases 360 are subsequently routed through the jet exhaust nozzle section 320 of the turbomachine 304 to provide propulsive thrust. Simultaneously, the pressure of the first portion of air 354 is substantially increased as the first portion of air 354 is routed through the bypass airflow passage 340 before being exhausted from a fan nozzle exhaust section 370 of the turbine engine 300, also providing propulsive thrust.

Figure 6:
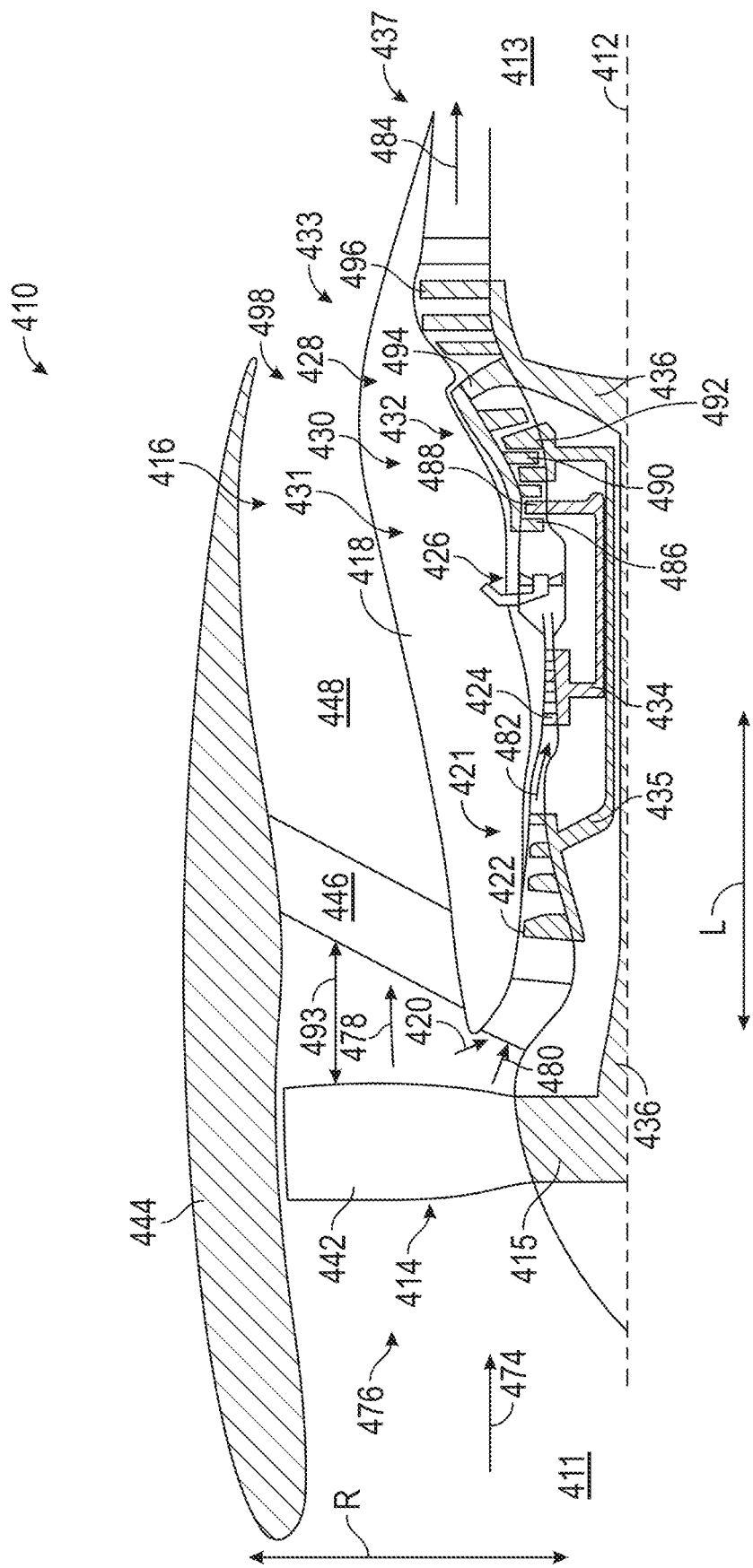
FIG. 6 is a schematic, cross-sectional diagram of a turbine engine, taken along a longitudinal centerline axis of the turbine engine, according to another embodiment of the present disclosure.

FIG. 6 is a schematic cross-sectional diagram of a turbine engine 410, taken along a longitudinal centerline axis 412 of the turbine engine 410, according to an embodiment of the present disclosure. The turbine engine 410 is similar in some respects to the turbine engine 100 discussed above with respect to FIG. 5. The turbine engine 410, however, is a three-spool turbine engine, as detailed further below. For the embodiment depicted in FIG. 6, the turbine engine 410 is a high bypass ratio turbofan engine. The turbine engine 410 has an axial direction A (extending parallel to the longitudinal centerline axis 412 provided for reference) and a radial direction R that is normal to the axial direction A. The turbine engine 410 extends from a forward end 411 to an aft end 413 along the axial direction A. The forward end 411 is upstream of the aft end 413. In general, the turbine engine 410 includes a fan section 414 and a turbomachine 416 disposed downstream from the fan section 414.

The turbine engine 410 include a substantially tubular, outer casing 418 that defines an inlet 420. The inlet 420 is annular. The outer casing 418 encases, in serial flow arrangement, a compressor section 421 including an intermediate-pressure (IP) compressor 422 followed downstream by a high-pressure (HP) compressor 424, a combustion section 426, and a turbine section 428 including a high-pressure (HP) turbine 430 followed downstream by an intermediate-pressure (IP) turbine 432, a low-pressure (LP) turbine 433, and a jet exhaust nozzle section 437. The LP turbine 433 is also referred to as a power turbine. A high-pressure (HP) shaft 434 (also referred to as a high-speed shaft) drivingly connects the HP turbine 430 to the HP compressor 424 to rotate the HP turbine 430 and the HP compressor 424 in unison. Together, the HP compressor 424, the combustion section 426, and the HP turbine 430 define an engine core 431 of the turbine engine 410. An intermediate-pressure (IP) shaft 435 (also referred to as an intermediate-speed shaft)

drivingly connects the IP turbine 432 to the IP compressor 422 to rotate the IP turbine 432 and the IP compressor 422 in unison. A low-pressure (LP) shaft 436 (also referred to as a low-speed shaft) drivingly connects the LP turbine 433 to the fan section 414 to rotate the LP turbine 433 and the plurality of fan blades 442 in unison. In this way, the turbine engine 410 is a three-spool turbine engine.

The fan section 414 includes one or more stages of multiple fan blades 442, which are attached to and extend outwardly from a fan shaft 415 and/or the LP shaft 436 in the radial direction R. These fan blades 442 rotate around the longitudinal centerline axis 412, driven by the LP shaft 436, making the turbine engine 410 a direct drive turbine engine. An annular fan casing or nacelle 444 surrounds at least part of the fan section 414 and/or the outer casing 418. The nacelle 444 is supported by several outlet guide vanes 446, which are spaced around the outer casing 418. Part of the nacelle 444 extends over the outer portion of the outer casing 418, creating a bypass airflow passage 448 between them.

The turbine engine 410 of FIG. 6 operates in a similar manner as the turbine engine 100 of FIG. 5. During operation of the turbine engine 410, a volume of air 474 enters the turbine engine 410 through an inlet 476 of the nacelle 444 and/or the fan section 414. As the volume of air 474 passes across the plurality of fan blades 442, a first portion of air 478 is directed or routed into the bypass airflow passage 448, and a second portion of air 480 is directed or is routed into the upstream section of the turbomachine 416, or, more specifically, into the inlet 420. The ratio between the first portion of air 478 and the second portion of air 480 is commonly known as a bypass ratio. The turbine engine 410 has a high bypass ratio (e.g., greater than 8.0, greater than 10.0, or greater than 12.0), as detailed further below. The pressure of the second portion of air 480 is then increased through the IP compressor 422, forming compressed air 482, and the compressed air 482 is routed through the HP compressor 424 and into the combustion section 426, where the compressed air 482 is mixed with fuel and burned to provide combustion gases 484.

The combustion gases 484 are routed into the HP turbine 430 and expanded through the HP turbine 430 where a portion of thermal and/or of kinetic energy from the combustion gases 484 is extracted via sequential stages of HP turbine stator vanes 486 that are coupled to the outer casing 418 and HP turbine rotor blades 488 that are coupled to the HP shaft 434, thus, causing the HP shaft 434 to rotate, thereby supporting operation of the HP compressor 424. The combustion gases 484 are then routed into the IP turbine 432 and expanded through the IP turbine 432. Here, a second portion of thermal and kinetic energy is extracted from the combustion gases 484 via sequential stages of IP turbine stator vanes 490 that are coupled to the outer casing 418 and IP turbine rotor blades 492 that are coupled to the IP shaft 435, thus, causing the IP shaft 435 to rotate, thereby supporting operation of the IP compressor 422. The combustion gases 484 are then routed into the LP turbine 433 and expanded further through the LP turbine 433. Here, a third portion of thermal and kinetic energy is extracted from the combustion gases 484 via sequential stages of LP turbine stator vanes 494 that are coupled to the outer casing 418 and LP turbine rotor blades 496 that are coupled to the LP shaft 436, thus, causing the LP shaft 436 to rotate, thereby supporting operation and rotation of the fan section 414 via the LP shaft 436.

The combustion gases 484 are subsequently routed through the jet exhaust nozzle section 437 of the turbomachine 416 to provide propulsive thrust. Simultaneously, the pressure of the first portion of air 478 is substantially increased as the first portion of air 478 is routed through the bypass airflow passage 448 before being exhausted from a fan nozzle exhaust section 498 of the turbine engine 410, also providing propulsive thrust.

The turbine engine 410 depicted in FIG. 6 is by way of example only. In other exemplary embodiments, the turbine engine 410 may have any other suitable configuration, as detailed above with respect to FIG. 5.

Figure 7:
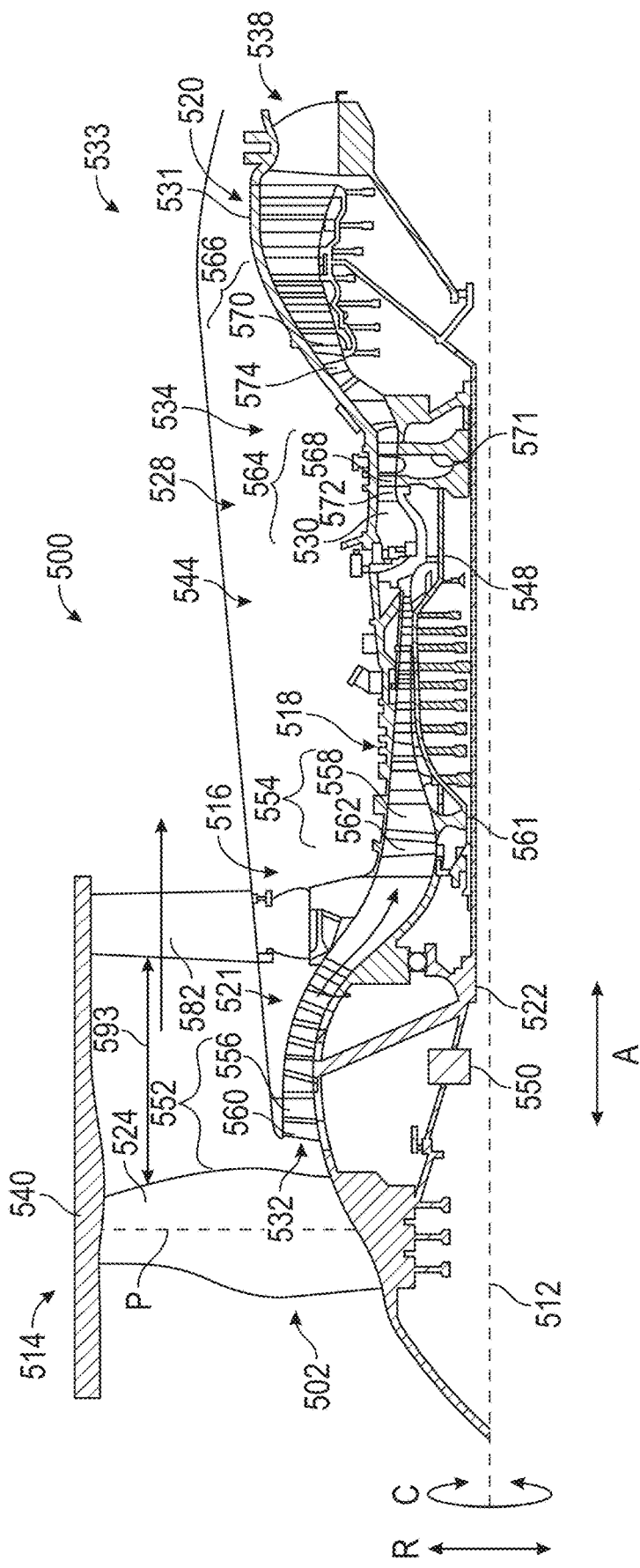
FIG. 7 is a schematic, cross-sectional view of a ducted, indirect-drive, turbine engine, taken along a longitudinal centerline axis of the turbine engine, according to an embodiment of the present disclosure.

FIG. 7 shows a schematic, cross-sectional view of a ducted, indirect-drive, turbine engine 500, taken along a longitudinal centerline axis 512 of the turbine engine 500, according to an embodiment of the present disclosure. The turbine engine 500 is similar in some respects to the turbine engine 100 discussed above with respect to FIG. 5.

As shown in FIG. 7, the turbine engine 500 includes, in downstream serial flow relationship, a fan section 514 including a fan 502, a compressor section 516 including a booster or a low-pressure (LP) compressor 521 and a high-pressure (HP) compressor 518, a combustion section 528 including a combustor 530, a turbine section 533 including an HP turbine 534 and an LP turbine 520, and an exhaust nozzle 538.

The fan section 514 includes a fan casing or a nacelle 540 surrounding the fan 502. The fan 502 includes a plurality of fan blades 524 disposed radially about the longitudinal centerline axis 512. The HP compressor 518, the combustor 530, and the HP turbine 534 form an engine core 544 of the turbine engine 500, which generates combustion gases. The engine core 544 is surrounded by a core casing 531, which is coupled to the nacelle 540. The nacelle 540 is supported relative to the turbomachine by a plurality of outlet guide vanes 582 that are circumferentially spaced about the core casing 531.

A high-speed shaft 548 is positioned coaxially along the longitudinal centerline axis 512 of the turbine engine 500, connecting the HP turbine 534 to the HP compressor 518. The low-speed shaft 522, also known as the low-pressure shaft, is coaxially positioned within the larger diameter annular high-speed shaft 548 and connects the LP turbine 520 to the LP compressor 521. Additionally, the low-speed shaft 522 connects the LP turbine 520 to the fan 502 through a gearbox assembly 550, making the turbine engine 500 an indirect drive turbine engine. Both the high-speed shaft 548 and the low-speed shaft 522 rotate around the longitudinal centerline axis 512.

The LP compressor 521 and HP compressor 518 each have multiple compressor stages 552, 554, with sets of compressor blades 556, 558 rotating relative to sets of compressor vanes 560, 562 to compress gas entering through an inlet 532. Focusing on the HP compressor 518, a single stage 554 includes multiple compressor blades 558 on a rotor disk 561 (or integrated as a blisk). A compressor blade extends radially outward from a blade platform to a blade tip. Compressor vanes 562 are positioned upstream or downstream of the rotating compressor blades 558. The rotor disk 561 for a stage of compressor blades 558 is mounted to the high-speed shaft 548. A stage of the HP compressor 518 can refer to either a single disk of rotor blades or both the rotor blades and adjacent stator vanes.

The HP turbine 534 has one or two stages 564. In a single turbine stage 564, turbine blades 568 are provided on a rotor disk 571. A turbine blade extends radially outwardly relative to the longitudinal centerline axis 512, from a blade platform to a blade tip. The HP turbine 534 can also include a stator vane 572. The HP turbine 534 may have both an upstream nozzle adjacent the combustor exit and an exit nozzle aft of the rotor, or a nozzle upstream of rotor blades or downstream of the rotor blades.

Air exiting the HP turbine 534 enters the LP turbine 520 (also referred to as a power turbine), which has a plurality of stages of rotating blades 570. The LP turbine 520 can have three, four, five, or six stages. In a single LP turbine stage 566 (containing a plurality of blades coupled to the low-speed shaft 522) a turbine blade is provided on a rotor disk (connected to the low-speed shaft 522) and extends radially outwardly relative to the longitudinal centerline axis 512, from a blade platform to a blade tip. The LP turbine 520 can also include a stator vane 574. The LP turbine 520 may have both an upstream nozzle and an exit nozzle aft of a stage, followed by the exhaust nozzle 538 of the engine.

The turbine engine 500 of FIG. 7 operates in a similar manner as the engine of FIG. 5. Airflow exiting the fan section 514 is split such that a portion of the airflow is channeled into the inlet 532 to the LP compressor 521, which then supplies pressurized airflow to the HP compressor 518, which further pressurizes the air. The pressurized airflow from the HP compressor 518 is mixed with fuel in the combustor 530 and ignited, thereby generating combustion gases. Some work is extracted from the combustion gases by the HP turbine 534, which drives the HP compressor 518 to produce a self-sustaining combustion. The combustion gases discharged from the HP turbine enter the LP turbine 520, which extracts additional work to drive the LP compressor 521 and the fan 502 (through the gearbox assembly 550). The gas discharged from the LP turbine exits through the exhaust nozzle 538.

Some of the air from the fan 502 bypasses the engine core 544 and is used to cool various parts of the turbine engine 500, especially the hot sections, or to power other aircraft systems. In the turbine engine 500, the hot sections refer to areas downstream of the combustion section 528, such as the turbine section 533. Other cooling fluid sources include air discharged from the LP compressor 521 or the HP compressor 518.

The turbine engine 500 shown in FIG. 7 is just an example. Other embodiments may have different configurations, including various numbers or arrangements of shafts, spools, fan blades, turbines, compressors, or combinations thereof. The gearbox assembly can have different configurations, such as star gear, planet gear, single-stage, multi-stage, epicyclic, or non-epicyclic setups. Gear ratios can range from 3:1 to 4:1, 3:5 to 4:1, 3.25:1 to 3.5:1, or 4:1 to 5:1. The fan assembly can be fixed-pitch or variable-pitch, with fan blades 524 adjustable around a pitch axis P. The turbine engine also includes components not shown in FIG. 7, like rotor blades and stator vanes. The fan assembly can be configured in various ways and supported by different fan frame setups. Some embodiments may feature an interdigitated turbine and gear assembly or vaneless counter rotating turbine (V CRT) architecture with an aft gearbox. These aspects can be applied to various turbine engines, including turbofan, propfan, turbojet, turboprop, and turboshaft engines.

Figure 8:
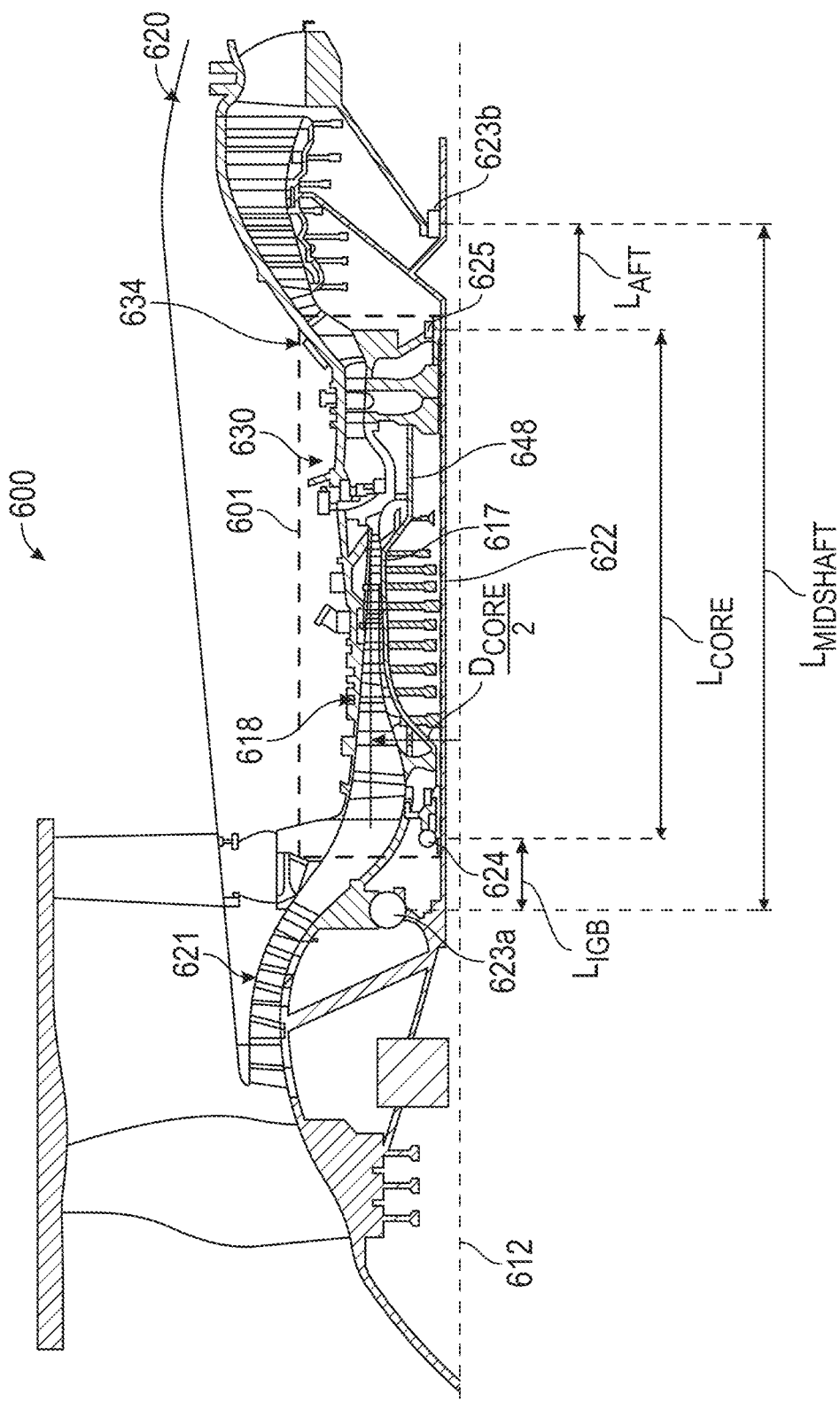
FIG. 8 is a cross-sectional view of an exemplary turbine engine, taken along a longitudinal centerline axis of the turbine engine, according to the present disclosure.

FIG. 8 is a cross-sectional view of an exemplary turbine engine 600, taken along a longitudinal centerline axis 612 of the turbine engine 600, according to the present disclosure. The turbine engine 600 includes a low-pressure (LP) compressor 621, a high-pressure (HP) compressor 618, a low-pressure (LP) turbine 620, and a high-pressure (HP) turbine 634. These features operate in the same manner as described in other embodiments above. A low-pressure shaft 622 (also referred to as a "low-speed shaft") extends between the low-pressure compressor 621 and the low-pressure turbine 620. A high-pressure shaft 648 extends between the high-pressure compressor 618 and the high-pressure turbine 634. Together, the high-pressure compressor 618, a combustor 630 (e.g., any of the combustors or combustion sections detailed herein), and the high-pressure turbine 634 define an engine core.

The low-pressure shaft 622 in the turbine engine 600 is supported by one or more bearings. As shown in FIG. 8, the engine includes a first bearing 623a (also known as "Brg 2"), a second bearing 624 ("Brg 3"), a third bearing 625 ("Brg 4"), and a fourth bearing 623b ("Brg 5"). The low-pressure shaft 622 is supported by a bearing on the forward side of the core engine (first bearing 623a) and a bearing on the aft side (fourth bearing 623b). The high-pressure shaft 648 is supported by the second bearing 624 on the forward side and the third bearing 625 on the aft side. The first and second bearings (623a and 624) are typically ball bearings, while the third and fourth bearings (625 and 623b) are usually roller bearings. However, other types of bearings or rotational supports can be used. Although each location is shown with a single bearing, multiple bearings can be used. For example, the first bearing 623a could consist of two axially spaced bearings.

In FIG. 8, the length L MIDSHAFT is a length of a portion of the low-pressure shaft 622, referred to as a midshaft. The length LMIDSHAFT is defined between the inboard low-pressure shaft forward bearing (e.g., the first bearing 623a) and the inboard low-pressure shaft aft bearing (e.g., the fourth bearing 623b). The length L MIDSHAFT is the lateral distance, parallel to the longitudinal centerline axis 612, defined between midpoints of the first bearing 623a and the fourth bearing 623b.

The length $L_{IGBi}$ is the length from the inboard low-pressure shaft forward bearing (e.g., the first bearing 623a) to the core forward bearing (e.g., the second bearing 624). The length $L_{IGB}$ is the lateral distance, parallel to the longitudinal centerline axis 612, defined between midpoints of the first bearing 623a and the second bearing 624.

The length $L_{CORE}$ is the length of the engine core (e.g., the length including the high-pressure compressor 618, the combustor, and the high-pressure turbine 634). The length $L_{CORE}$ IS defined between the core forward bearing (e.g., the second bearing 624) and the core aft bearing (e.g., the third bearing 625). The length $L_{CORE}$ is the lateral distance, parallel to the longitudinal centerline axis 612, defined between midpoints of the second bearing 624 and the third bearing 625. In this way, the length $L_{CORE}$ is the length of the high-pressure shaft 648 from the second bearing 624 to the third bearing 625. In particular, the length $L_{CORE}$ is defined as an axial distance between the core forward bearing and the core aft bearing with at least one stage of the HP compressor 618 between the core forward bearing and the core aft bearing. In FIG. 8, the core forward bearing is positioned forward of a stage of the HP compressor 618 and the core aft bearing is positioned aft of a stage of the HP turbine 634. In some embodiments, one or more stages of the HP compressor 618 can be positioned forward of the core forward bearing, while at least one stage of the HP compressor 618 is positioned aft of the core forward bearing.

The length $L_{AFT}$ is the length from aft of the core to the inboard low-pressure shaft aft bearing (e.g., the fourth bearing 623b). The length $L_{AFT}$ is the lateral distance, parallel to the longitudinal centerline axis 612, defined between midpoints of the third bearing 625 and the fourth bearing 623b.

The core diameter $D_{CORE}$ represents the diameter of the engine core. The diameter $D_{CORE}$ is defined by the outer diameter of the exit from a last stage 617 of the high-pressure compressor 618, also referred to as the exit stage diameter. In this way, the last stage 617 defines an exit of the HP compressor 618. The radius of the core is shown in FIG. 8 as $$\frac{D_{CORE}}{2}.$$

Figure 9:
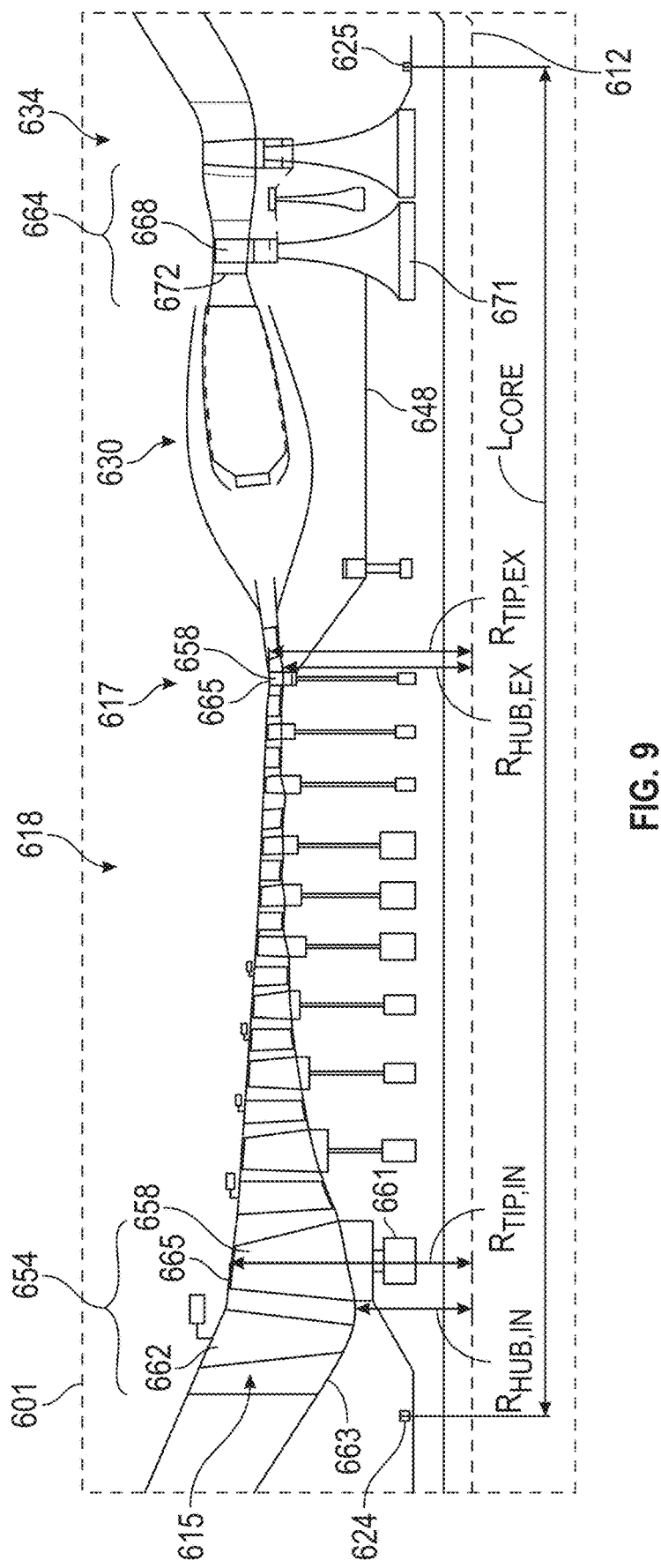
FIG. 9 is an enlarged, schematic view of the turbine engine of FIG. 8, taken at detail 601 in FIG. 8, according to the present disclosure.

FIG. 9 is an enlarged, cross-sectional view of the turbine engine 600, taken at detail 601 in FIG. 8, according to the present disclosure. In particular, FIG. 9 shows an enlarged view of the HP compressor 618, the combustor 630, and the HP turbine 634.

The HP compressor 618 has multiple stages 654 (only one labeled in FIG. 9 for clarity), where HP compressor blades 658 rotate relative to HP compressor vanes 662 to compress gas entering through the HP compressor inlet 615. This inlet is defined by the first stage 654 of the HP compressor 618. Each stage includes multiple blades 658 on a rotor disk 661 (or integrated as a blisk). A compressor blade extends radially from a blade platform to a blade tip. The HP compressor vanes 662 are positioned upstream or downstream of the rotating blades 658. The rotor disk 661 for each stage is mounted to the high-pressure shaft 648. A stage of the HP compressor 618 can refer to either a single disk of rotor blades or both the rotor blades and adjacent stator vanes. The HP turbine 634 has one or two HP turbine stages 664. In a single HP turbine stage 664, HP turbine blades 668 are provided on a rotor disk 671. A turbine blade extends radially outwardly relative to the longitudinal centerline axis 612, from a blade platform to a blade tip. The HP turbine 634 can also include an HP turbine stator vane 672. The HP turbine 634 may have both an upstream nozzle adjacent the combustor exit and an exit nozzle aft of the rotor, or a nozzle upstream of rotor blades or downstream of the rotor blades.

In FIG. 9, the radius $R_{HUB,IN}$ is a radius of a hub 663 at the HP compressor inlet 615. The radius $R_{HUB,IN}$ is defined from the longitudinal centerline axis 612 to the hub 663 at the HP compressor inlet 615 in the radial direction. The radius $R_{TIP,IN}$ is a radius of a tip 665 of the HP compressor blade 658 of the first stage (e.g., at the HP compressor inlet 615). The radius $R_{TIP,IN}$ is defined from the longitudinal centerline axis 612 to the tip 665 of the HP compressor blade 658 at the HP compressor inlet 615 in the radial direction.

The radius $R_{HUB,EX}$ is a radius of the hub 663 at the last stage 617 (e.g., at the exit of the HP compressor 618). The radius $R_{HUB,EX}$ is defined from the longitudinal centerline axis 612 to the hub 663 at the last stage 617 in the radial direction. The radius $R_{TIP,EX}$ is a radius of the tip 665 of the HP compressor blade 658 of the last stage 617 of the HP compressor 618. The radius $R_{TIP,EX}$ is defined from the longitudinal centerline axis 612 to the tip 665 of the HP compressor blade 658 at the last stage 617 of the HP compressor 618 in the radial direction. In this way, the radius $R_{TIP,EX}$ corresponds to the radius of the core $$\frac{D_{CORE}}{2}.$$

Figure 10:
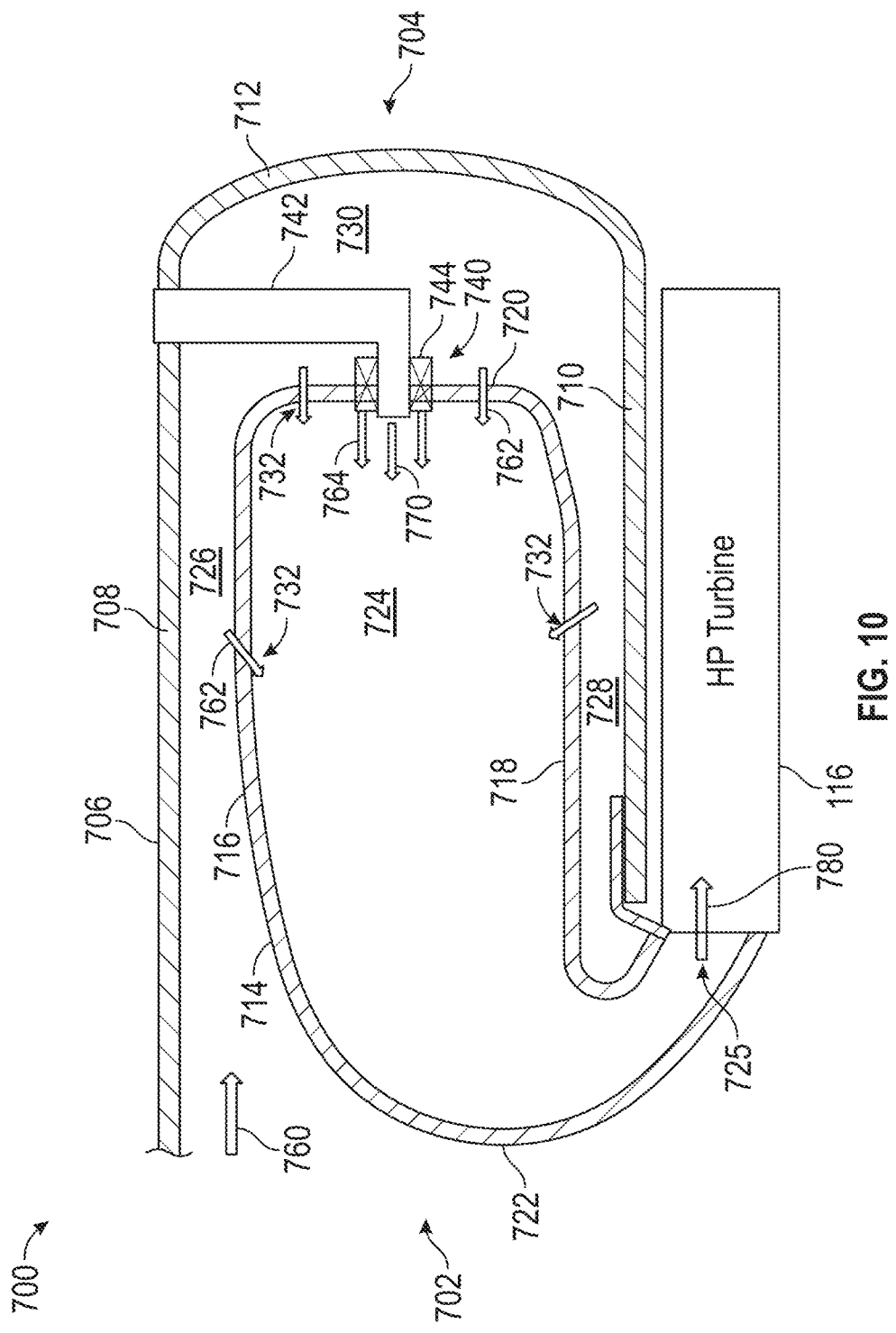
FIG. 10 is a schematic cross-sectional view of a combustor taken along a longitudinal centerline axis of the combustor, according to the present disclosure.

FIG. 10 is a cross-sectional view of a combustor 700 for the turbine engine, taken along the longitudinal centerline axis, according to the present disclosure. The combustor 700 can be used in any of the turbine engines disclosed herein.

The combustor 700 is a reverse flow combustor in which compressed air from the HP compressor flows into the combustor at an aft end thereof and mixes with the fuel to generate the combustion gases, and the combustion gases flow from the aft end to the forward end before exiting the combustor into the HP turbine. In this way, the combustion gases within the combustor flow in an opposite direction as the direction of travel (e.g., a direction of thrust) of the turbine engine 100. Such a configuration allows the HP turbine 116 (shown schematically in FIG. 10) to be radially below, and axially aligned with, the combustor 700. Accordingly, the reverse flow combustor configuration reduces $L_{CORE}$, and, thus, reduces $L_{CORE}/D_{CORE}$ for a given thrust level of the turbine engine 100.

The combustor 700 has a forward end 702 and an aft end 704. It includes a combustor casing 706 and a combustor liner 714. The combustor casing 706 consists of an outer casing 708, an inner casing 710, and an aft end 712. The combustor liner 714 comprises an outer liner 716, an inner liner 718, an aft end 720, and a forward end 722. The aft end 720 may feature an annular dome. Inside the combustor liner 714 is the combustion chamber 724, with its upstream end at the aft end 720 and downstream end at the forward end 722. The combustion chamber 724 has an outlet 725 at the downstream end, which connects to the HP turbine to supply combustion gases. The combustion chamber 724 is positioned radially outward and axially aligned with the HP turbine.

The outer liner 716 and the inner liner 718 are disposed between the outer casing 708 and the inner casing 710. The outer liner 716 and the inner liner 718 are spaced radially from each other such that the combustion chamber 724 is defined therebetween. The outer casing 708 and the outer liner 716 form an outer passage 726 therebetween, and the inner casing 710 and the inner liner 718 form an inner passage 728 therebetween. An aft passage 730 connecting the outer passage 726 and the inner passage 728 is formed between the aft end 712 and the aft end 720.

The combustor liner 714 includes a plurality of liner cooling holes 732. The plurality of liner cooling holes 732 can include at least one of one or more liner cooling holes 732 extending through the outer liner 716, one or more liner cooling holes 732 extending through the inner liner 718, or one or more liner cooling holes 732 extending through the aft end 720.

The combustor 700 includes one or more mixer assemblies 740 spaced circumferentially about the aft end 720 of the combustor liner 714 to deliver a mixture of fuel and air to the combustion chamber 724, as detailed further below. The combustor 700 includes a fuel injector 742 for providing the fuel into the combustion chamber 724, and an air swirler 744 for providing the air into the combustion chamber 724 and mixing the fuel with the air.

In operation, the combustor 700 receives compressed air 760 from a compressor section as described herein. In particular, the combustor 700 receives the compressed air 760 from the HP compressor. The compressed air 760 enters the combustion chamber 724 through the plurality of liner cooling holes 732 as a cooling air flow 762. The cooling air flow 762 provides liner cooling and film cooling along the inner wall of the combustor liner 714.

Compressed air 760 enters the combustion chamber 724 through mixer assemblies 740. The air swirler 744 directs the compressed air 760 into the chamber as a stream 764, while the fuel injector 742 supplies fuel as a stream 770. The air swirler 744 mixes the compressed air stream 764 with the fuel stream 770. These streams enter the combustion chamber 724 at the upstream end (aft end 704) and ignite in the combustion zone to produce combustion gases 780. These gases flow downstream towards the forward end 722 and into the HP turbine through the combustion chamber outlet 725. The chamber directs the gases axially forward from the aft end 720 to the forward end 722, then radially inward towards the outlet 725, which directs them axially into the HP turbine. As shown in FIG. 10, the combustor 700 is arranged so that the aft end 704 forms the upstream end of the combustion chamber 724, and the forward end 702 forms the downstream end, creating a reverse flow combustor.

Figure 11A:
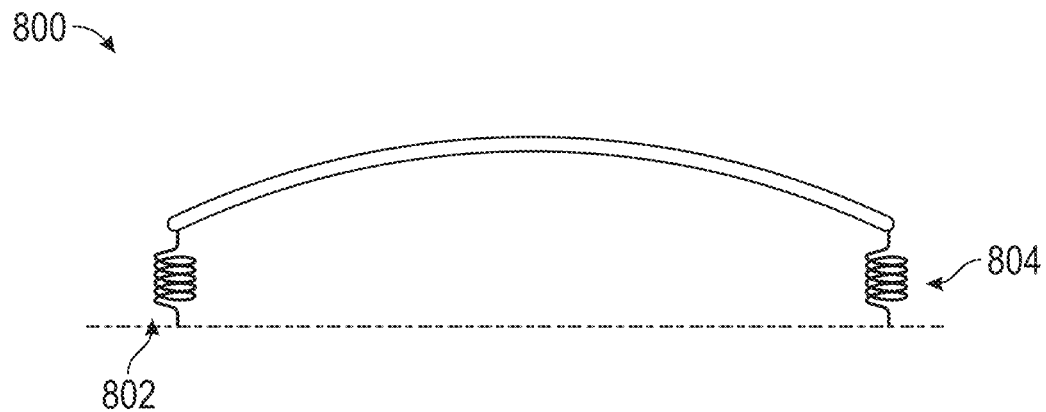
FIG. 11A shows a first bending mode of a shaft.
Figure 11B:
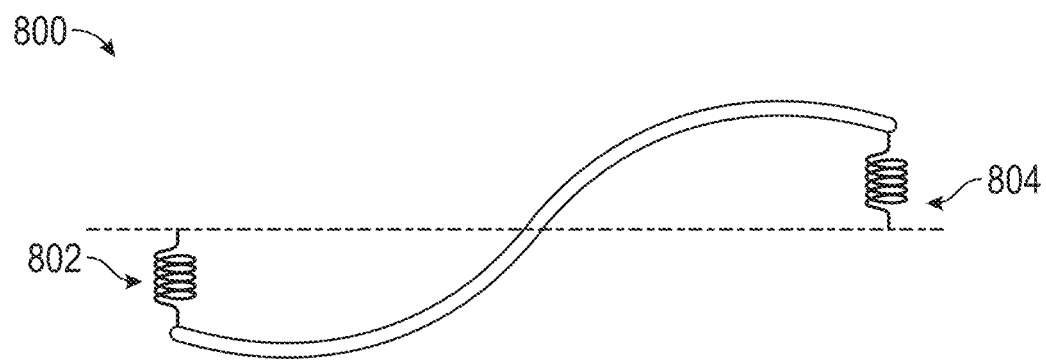
FIG. 11B shows a second bending mode of a shaft.
Figure 11C:
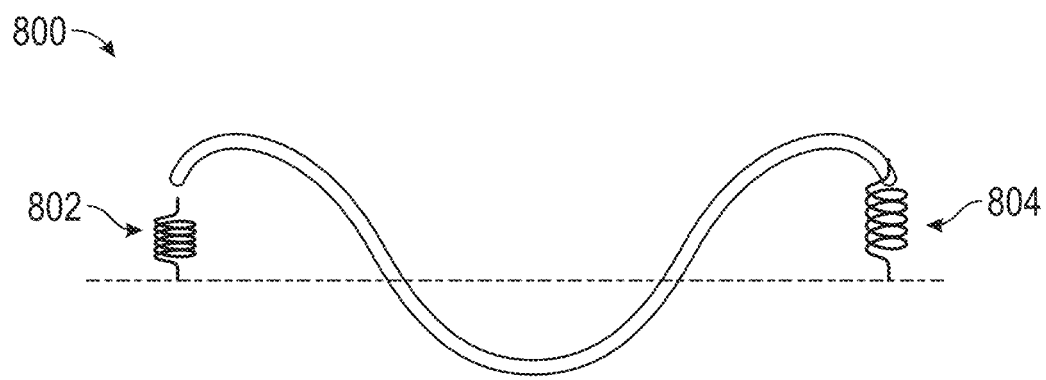
FIG. 11C shows a third bending mode of a shaft.

FIGS. 11A to 11C show a schematic view of a high-pressure shaft (HP shaft) corresponding to the predominate three typical mode shapes of the HP shaft that need to be taken into consideration when designing an engine core and avoiding dynamic instability in the HP shaft. For example, the HP shaft illustrated in FIGS. 11A to 11C can be the high-pressure shafts 648 of FIGS. 8 and 9. The HP shaft extends from the HP compressor to the HP turbine. The deformed HP shaft is supported by the HP shaft forward and aft bearings 802 and 804, respectively. The bearings are represented by their stiffnesses (shown as springs). FIG. 11A illustrates a first mode, also referred to as a fundamental bounce mode, also known as a bow rotor mode, of the high-pressure shaft 800. The first mode can occur at sub-idle speeds of the high-pressure shaft, which are about sixty percent to eighty percent below a redline speed of the high-pressure shaft (e.g., about forty percent below cruise speeds). In FIG. 11B, the high-pressure shaft 800 has a second mode, also known as the pitch mode. The second mode occurs at near to cruise speeds of the high-pressure shaft, which are about twenty percent to thirty percent below the high-pressure shaft redline speeds. In FIG. 11C, the high-pressure shaft 800 has a third mode, also known as an S-shaped mode. The third mode occurs near redline speeds of the high-pressure shaft.

When considering the speed of the high-pressure shaft, factors such as the length and diameter of the engine core, and the number of stages in the HP compressor or HP turbine were taken into account. Additionally, the inlet temperature of the HP compressor and the inlet corrected flow were also considered. Unlike existing gas turbine engines that require higher bypass ratios and smaller engine cores, the new designs faced challenges in reducing the size of the engine core (e.g., the HP shaft) without operating near the Alford margin or the third mode margin of the HP shaft. This had to be achieved while enabling higher bypass ratio engines and maintaining the performance of the HP compressor and HP turbine.

Next-generation engines will have a higher power density (power/weight), which may involve lengthening the core by adding more compression stages to the high-pressure compressor. These engines are expected to operate at higher temperatures at the compressor exit stage and downstream turbine stages. To handle these higher temperatures, materials like ceramic matrix composites (CM C) can be used. Using CM C materials will affect the weight, size, and volume of components, influencing the behavior of both the high-speed and low-speed shafts.

CMC materials are likely to be used in the high-pressure turbine (HPT), low-pressure turbine (LPT), and high-pressure compressor (HPC) parts of the engine, as they can withstand higher temperatures than traditional metal alloys. Due to the higher strength-to-weight ratio of CM C compared to metal alloys, it's important to understand their impact on the dynamics of the HP and LP shafts. CM C materials offer opportunities to increase the critical speed of the LP shaft by reducing weight and allowing for a larger diameter.

Components that may be made from CM C include HP compressor rotors and disks, HP turbine nozzles and rotors, and LP turbine nozzles and rotors. CM C allows for stiffer or smaller components with the same strength as metal alloys, enabling them to handle high stresses at high temperatures and speeds while reducing core weight. However, CM C also introduces new structural dynamics, requiring trade-offs between aero-performance (temperatures, rotation rates, pressure ratios) and stable dynamics at various operating conditions. Components of the HP compressor and HP turbine in the embodiments listed in TABLES 1 to 5 can be made from CMC, including rotors, blades, and disks, either partially or wholly.

A first relationship that provides improvements in the goal of maintaining dynamic stability among the HP shaft concerns the high-pressure shaft redline speed, or high-speed shaft rating HSR given by (1):

$$HSR = \frac{1}{k} * N2_{r/l}^2 * D_{CORE} * \left(\frac{L_{CORE}}{D_{CORE}}\right)^2 \tag{1}$$

$L_{CORE}$ and $D_{CORE}$ are defined as described previously, and $L_{CORE}/D_{CORE}$ is a ratio of the length of the engine core to the diameter of the engine core. $N2_{r/l}$ is the redline speed for the HP shaft, for example, reported in the engine Type Certificate Data Sheet (TCDS), and k is a constant with a value of $10^6$ inch-RPM. The redline speed $N2_{r/l}$ is from 10,580 RPM to 35,788 RPM. $L_{CORE}$ is from 36.4 inches (in) to 66.8 inches (in). $D_{CORE}$ is from 9.4 inches to 31.8 inches. HSR is from 1.5 to 6.2.

For stable operating conditions, the high-pressure shaft third mode should be placed as a percentage below the redline speed of the HP shaft or above the redline speed of the HP shaft and satisfying (2a), (2b), (2c), or (2d):

$$-0.1 > (-0.1822*HSR+HST) > 0 \tag{2a}$$

$$-0.2 > (-0.1822*HSR+HST) > 0 \tag{2b}$$

$$-0.3 > (-0.1822*HSR+HST) > 0 \tag{2c}$$

$$(-0.1822*HSR+HST) > -0.1 \tag{2d}$$

HST accounts for the effects that the HPC pressure ratio and the HPC exit temperature can have on the third mode. T25 is the temperature in Rankine (° R) at the high-pressure compressor (HPC) inlet. A good approximation for HST can be made in terms of only the T25, using (3):

$$HST = -0.726 * \frac{T25}{T_{STD}} + 1.61 \tag{3}$$

where T25 is from 579° R to 803° R, HST is from 0.49 to 0.8, and $T_{STD}$ is the standard temperature defined by a constant value of 518.67° R.

For stable operating conditions, the high-pressure shaft second mode is a function of the minimum speed of the HP shaft at cruise as a percentage of the redline speed of the HP shaft. For example, for stable operating conditions, the high-pressure shaft second mode should satisfy (4):

$$\left(-0.1215 * HSR + \left(\frac{2 * HST - 1}{3}\right)\right) < -0.1 \quad (4)$$

Relationships (2a) to (2d) and (4) account for individual configurations of the HP shaft that have variations in mode margin due to additional parameters, such as, for example, the bearing support stiffness, additional mass added for maintainability, and/or features such as power screws. For example, if the excess margin is 20% of the third mode, but the second mode is at −10% margin, then the mitigation is to soften the bearing support such that the third mode margin falls to 10% and the second mode margin becomes −20%. Accordingly, the relationships (2a) to (2d) and (4) provide for providing a balance among the third mode margin and the second mode margin of the HP shaft.

The blade effective acoustic length (BEAL) and acoustic spacing ratio (ASR), when used in combination with the HSR, HST, and the other performance parameters disclosed herein provide surprising benefits by enabling a balance between noise reduction, aerodynamic efficiency, and engine stability, allowing for higher bypass ratio designs with improved performance and reduced acoustic emissions.

Such a configuration of the high-pressure shaft third mode in relationships (2a) to (2d) accounts for stable operating conditions while considering variations in architectural differences in various types of turbine engines, as well as ensuring that the HP shaft is not excessively excited at the high-pressure shaft second mode during high power steady state operations (e.g., cruise, climb, and/or takeoff). For example, the third mode margin can be −10% of the redline speed of the HP shaft per relationship (2a),-20% of the redline speed of the HP shaft per relationship (2b), or −30% of the redline speed of the HP shaft per relationship (2c). The third mode margin can also be greater than −10% of the redline speed of the HP shaft per relationship (2d) to account for the architectural differences in various types of turbine engines. For example, the third mode may fall within −10% of redline speed of the HP shaft and the bearing support structure can be stiffened or softened to move the third mode margin to just above the redline speed of the HP shaft.

Further, such a configuration of the high-pressure shaft second mode in relationship (4) accounts for stable operating conditions while considering variations in architectural differences in various types of turbine engine, as well as ensuring that the HP shaft is not excessively excited at the high-pressure shaft second mode during high power steady state operations (e.g., cruise, climb, and/or takeoff). For example, the second mode margin can be −10% of the redline speed of the HP shaft per relationship (4).

Another relationship for HSR concerns the low-pressure shaft redline speed, or high-speed shaft rating $HSR_{LP}$ given by (5):

$$HSR_{LP} = \frac{1}{k} * N1_{\frac{r}{l}} * D_{CORE} * \left(\frac{L_{CORE}}{D_{CORE}}\right)^2 \quad (5)$$

$L_{CORE}$ and $D_{CORE}$ are defined as described previously. N1r/l is the redline speed for the LP shaft, for example, reported in the engine Type Certificate Data Sheet (TCDS), and k is a constant with a value of $10^6$ inch-RPM. For stable operating conditions, the high-pressure shaft first mode is a function of the minimum speed of the LP shaft at cruise as a percentage of the redline speed of the LP shaft. For example, for stable operating conditions, the high-pressure shaft first mode is placed either below (as a percentage) or just above the redline speed of the LP shaft satisfying relationship (6a), (6b), (6c), or (6d):

$$-0.1 > \left(\frac{0.55}{(HSR_{LP})^2} + LST\right) > 0 \quad (6a)$$

$$-0.2 > \left(\frac{0.55}{(HSR_{LP})^2} + LST\right) > 0 \quad (6b)$$

$$-0.3 > \left(\frac{0.55}{(HSR_{LP})^2} + LST\right) > 0 \quad (6c)$$

$$\left(\frac{0.55}{(HSR_{LP})^2} + LST\right) > -0.1 \quad (6d)$$

LP Speed Temperature Correction (LST) accounts for the effects that the HPC pressure ratio and the HPC exit temperature can have on the first mode. T25 is the temperature in Rankine (° R) at the high-pressure compressor (HPC) inlet. A good approximation for LST can be made in terms of only the T25, using (7):

$$LST = -1.193 * \frac{T25}{T_{STD}} + 1.18 \quad (7)$$

where T25 is from 579° R to 803° R, LST is from −0.67 to −0.15, and $T_{STD}$ is the standard temperature defined by a constant value of 518.67° R.

Relationships (1) through (7) when used individually or together (depending on application or changes made to a design) can identify an improved core accounting for characteristics associated with a higher power density (use of CM C material, increased number of HPC and/or HPT stages, increased bore height or length of the LP shaft) and bounding those features within constraints to avoid dynamic instability by interaction between one or more vibration modes of the LP shaft and HP shaft. The identification of such improvements can be particularly important for applications in which a desired acoustic spacing has been accounted for, as described above, resulting in engine changes associated with structural adjustments to reduce engine noise.

Further, relationships (6a) to (6d) account for individual configurations of the HP shaft that have variations in mode margin due to additional parameters, such as, for example, the bearing support stiffness, additional mass added for maintainability, and/or features such as power screws. For example, if the first mode is within −20% of the redline speed of the LP shaft (e.g., is between the redline speed of the LP shaft and −20% of the redline speed of the LP), then the mitigation is to either soften or to stiffen the bearing support such that the first mode margin falls below −20% of the redline speed of the LP shaft or above the redline speed of the LP shaft. Such a configuration of the high-pressure shaft first mode in relationships (6a) to (6d) accounts for stable operating conditions while considering variations in architectural differences in various types of turbine engine, as well as ensuring that the HP shaft is not excessively excited at the high-pressure shaft first mode during high power steady state operations (e.g., cruise, climb, and/or takeoff). For example, the first mode margin can be −10% of the redline speed of the LP shaft per relationship (6a), −20% of the redline speed of the LP shaft per relationship (6b), or −30% of the redline speed of the LP shaft per relationship (6c). The first mode margin can also be greater than-10% of the redline speed of the LP shaft per relationship (6d) to account for the architectural differences in various types of turbine engines. For example, the first mode may fall within −10% of redline speed of the LP shaft and the bearing support structure can be stiffened or softened to move the first mode margin to just above the redline speed of the LP shaft.

The area of the exit of the HP compressor (e.g., area at the last stage of the HP compressor), also referred to as the HP compressor exit flow area, provides a measure of the bypass ratio (BPR) of the engine. As mentioned earlier, as the BPR increases (e.g., BPR greater than 8.0, greater than 10.0, or greater than 12.0), the engine core size (e.g., the HP compressor exit flow area) decreases and the $L_{CORE}/D_{CORE}$ increases, thereby making it challenging to meet the HP shaft third mode margins. To ensure stable operation of the HP shaft, the $L_{CORE}/D_{CORE}$ IS from 2.1 to 4.3. As detailed further below with respect to FIGS. 8 and 9, a first relationship concerns the $L_{CORE}/D_{CORE}$ as a function of a first high-speed shaft operating parameter $HSP_X$ that is given by the following relationship (8):

$$HSP_X = \frac{(A_{ex})^2 * P_{STD} * OPR_{\frac{T}{O}}}{FN_{\frac{T}{O}} * \left(\frac{N_{Stg}}{10}\right)^2} \quad (8)$$

where $P_{STD}$ is standard pressure (e.g., absolute pressure of one atmosphere) defined by a constant value of 14.696 psi (or 14.7 psi), $FN_{T/O}$ is sea-level static thrust at takeoff flight conditions corresponding to a maximum thrust rating for an engine core configuration, for example, reported in the engine Type Certificate Data Sheet (TCDS) and is from 12,000 lbf to 107,480 lbf, $OPR_{T/O}$ is the overall pressure ratio of the engine at takeoff flight conditions corresponding to the maximum thrust rating for an engine core configuration reported in, for example, ICA O ENGINE nvPM EMISSIONS DATA SHEET and is from 26.3 to 82, $N_{Stg}$ is the number of stages in the HP compressor and is 8, 9, 10, or 11, and $A_{EX}$ is the area of the HP compressor exit and is provided by the following relationship (9):

$$A_{EX} = \pi * (R_{TIP,EX}^2 - R_{HUB,EX}^2) \quad (9)$$

where $R_{TIP,EX}$ and $R_{HUB,EX}$ are measured as detailed above with respect to FIG. 6. $A_{EX}$ is from 11 in² to 95 in².

As described herein, there are certain relationships among the HP compressor inlet temperature and the inlet corrected flow at takeoff flight conditions, and the HP dynamics that influence the design of the engine core from the perspective of maintaining stable dynamics during engine operations. A second relationship concerns the HP compressor tip radius ratio and the HP compressor area ratio, referred to as an area ratio high-speed shaft rating ($HSP_{AR}$) and is given by (10):

$$HSP_{AR} = \frac{\left(\frac{L_{CORE}}{D_{CORE}}\right)^2 * AR}{\sqrt{\frac{R_{HUB,IN}}{R_{TIP,IN}}} * \sqrt{\frac{R_{TIP,EX}}{R_{TIP,IN}}}} \quad (10)$$

where $R_{HUB,IN}/R_{TIP,IN}$ is referred to as the inlet radius ratio, $R_{TIP,EX}/R_{TIP,IN}$ is referred to as the HP compressor tip radius ratio, and AR is the area ratio of the compressor and is the ratio of the area at the inlet of the HP compressor to the area at the exit of the HP compressor ($A_{IN}/A_{EX}$). $A_{IN}$ is the HP compressor inlet flow area and is given by the following relationship (11):

$$A_{IN} = \pi * (R_{TIP,IN}^2 - R_{HUB,IN}^2) \quad (11)$$

where $R_{TIP,IN}$ and $R_{HUB,IN}$ are measured as detailed above with respect to FIG. 9. AR is from 5.6 to 13.9, the inlet radius ratio is from 0.32 to 0.6, $R_{TIP,EX}$ is from 4.73 in. to 15.83 in., and $R_{TIP,IN}$ is from 5.50 in. to 16.32 in.

A third relationship concerns the HP compressor tip radius ratio and the HP compressor inlet area, referred to as an inlet area high-speed shaft rating ($HSP\_A_{IN}$) and is given by (12):

$$HSP_{A_{IN}} = \frac{\left(\frac{L_{CORE}}{D_{CORE}}\right)^2 * A_{IN}}{\sqrt{\frac{R_{HUB,IN}}{R_{TIP,IN}}} * \sqrt{\frac{R_{TIP,EX}}{R_{TIP,IN}}}} \quad (12)$$

where $R_{HUB,IN}/R_{TIP,IN}$ is referred to as the inlet radius ratio, $R_{TIP,EX}/R_{TIP,IN}$ is referred to as the HP compressor tip radius ratio, and $A_{IN}$ is the area at the inlet of the HP compressor. $A_{IN}$ is from 77 in² to 703 in².

As detailed further below with respect to FIG. 12, $HSP\_A_{IN}$ is a function of a second high-speed shaft operating parameter ($HSP_{X1}$). $HSP_{X1}$ is given by (13):

$$HSP_{X1} = \frac{A_{EX} * 1000}{FN_{\frac{T}{O}} * \left(\frac{N_{Stg}}{10}\right)^2} \quad (13)$$

$OPR_{T/O}$ is the overall pressure ratio of the engine at takeoff flight conditions and is from 26.3 to 82, $FN_{T/O}$ is sea-level static thrust at takeoff flight conditions and is from 12,000 lbf to 107,480 lbf, and $A_{EX}$ is the area of the HP compressor exit and is provided by relationship (9) above.

A fourth relationship concerns the HP compressor exit rim speed, the HP compressor exit temperature, and the HP compressor stage count, referred to as an exit rim speed high-speed shaft rating ($HSP\_U_{RIM,R/L}$) and is given by (14):

$$HSP_{U_{RIM,\frac{R}{L}}} = \frac{\left(\frac{L_{CORE}}{D_{CORE}}\right)^2}{N_{stg} * A_{F,IN}^{\frac{1}{3}}} * \left(\frac{T3_{\frac{T}{O}}}{U_{RIM,\frac{R}{L}}}\right)^3 \quad (14)$$

where $N_{stg}$ is the number of stages of the HP compressor and is 8, 9, 10, or 11, T3r/o is the exit temperature of the HP compressor at takeoff flight conditions and is from 1455° R to 2020° R, $A_{F,IN}$ is the frontal area of the HP compressor, and $U_{RIM,R/L}$ is the exit rim speed of the HP compressor at redline speeds (e.g., the rotational speed of the exit stage of the HP compressor at the hub of the exit stage). $A_{F,IN}$ is given by (15):

$$A_{F,IN} = \pi * (R_{TIP,IN})^2 \qquad (15)$$

The frontal area $A_{F,IN}$ is from 95 in² to 837 in², and $R_{TIP,IN}$ is from 5.50 in to 16.32 in. $U_{RIM,R/L}$ is given by (16):

$$U_{RIM,\frac{R}{L}} = \frac{\pi * N2_{\frac{R}{L}}}{30} * \frac{R_{HUB,EX}}{12} \qquad (16)$$

where $N2_{R/L}$ is in RPM, $R_{HUB,EX}$ is in inches and $U_{RIM,R/L}$ is in ft/s.

The exit rim speed of the HP compressor $U_{RIM,R/L}$ is from 1,084 ft/s to 1,557 ft/s, the redline speed of the HP compressor $N2_{R/L}$ is from 10,580 RPM to 35,788 RPM, and $R_{HUB,EX}$ is from 4.31 in to 14.85 in. $T3_{T/O}$ is from 1,455° R to 2,020° R, and is given by (17):

$$T3_{\frac{T}{O}} = T25_{\frac{T}{O}} * (3.465 * AR - 5.7)^{\frac{\gamma-1}{\gamma*\eta_{Poly}}} \qquad (17)$$

where $T25_{T/O}$ is the HP compressor inlet temperature at takeoff flight conditions, AR is the area ratio of the HP compressor, $\gamma$ is the gas constant of air and is equal to 1.37, $\eta_{Poly}$ is the compressor efficiency and is approximately equal to 0.9. $T25_{T/O}$ is from 579° R to 803° R and is given by (18):

$$T25_{\frac{T}{O}} = T_{ISA} * \left(\frac{125 * OPR_{\frac{T}{O}}}{3.465 * AR - 5.7}\right)^{\frac{\gamma-1}{\gamma*\eta_{Poly}}} + T_{IC} \qquad (18)$$

where $T_{ISA}$ is ambient temperature and is approximately equal to 545.67° R, $OPR_{T/O}$ is the overall pressure ratio of the engine at takeoff flight conditions, $\gamma$ is the gas constant of air and is equal to 1.37, $\eta_{Poly}$ is the compression efficiency and is approximately equal to 0.9, $T_{IC}$ is the intercooler temperature drop (e.g., reduction) at takeoff flight conditions upstream of the HP compressor (e.g., between the LP compressor and the HP compressor), and is from −100° R to 0° R, AR is the area ratio of the compressor and is the ratio of the area at the inlet of the HP compressor to the area at the exit of the HP compressor ($A_{IN}/A_{EX}$).

A fifth relationship concerns the HP compressor tip radius ratio and HP compressor inlet temperature, referred to as a radius ratio high-speed shaft rating ($HSP_{RR}$) and is given by (19):

$$HSP_{RR} = \frac{\left(\frac{L_{CORE}}{D_{CORE}} * \frac{T25_{\frac{T}{O}}}{T_{STD}}\right)^2}{\sqrt{\frac{R_{HUB,IN}}{R_{TIP,IN}}} * \sqrt{\frac{R_{TIP,EX}}{R_{TIP,IN}}}} \qquad (19)$$

where $R_{HUB,IN}/R_{TIP,IN}$ is referred to as the inlet radius ratio, $R_{TIP,EX}/R_{TIP,IN}$ is referred to as the HP compressor tip radius ratio, $T_{STD}$ is the standard temperature and is equal to 518.67° R, and $T25_{T/O}$ is the HP compressor inlet temperature at takeoff flight conditions. The $T25_{T/O}$ is given by the relationship (18) above.

As discussed above, the HP compressor inlet temperature and the inlet corrected flow impact the HP shaft redline speed. The lower HP compressor inlet temperature and the higher inlet corrected flow at the takeoff flight conditions can be obtained by: 1. Increased HP compressor pressure ratio with low HP compressor inlet radius ratio, higher HP compressor exit radius, or higher HP compressor stage count, 2. Intercooling the HP compressor inlet air, 3. Lowering the HP compressor inlet pressure, 4. Water/steam ingestion forward of the HP compressor inlet, 5. Lower specific (corrected) flow, 6. Lower exhaust gas temperature (EGT), 7. Lower OPR or BPR. The lower HP compressor inlet radius ratio and the water/steam ingestion have favorable effects on performance (e.g., increase performance of the HP compressor), the higher HP compressor exit radius, the higher HP compressor stage count, the intercooling, the lowering HP compressor inlet pressure, and the lower specific flow have minor effects on the performance of the HP compressor, while the lower exhaust gas temperature and the lower OPR or BPR have negative effects on the overall engine performance.

Accordingly, the relationships (1) to (19) detailed herein when used together or individually can identify an improved engine core accounting for characteristics associated with lower HP compressor inlet temperatures and higher HP compressor inlet corrected flow, accounting for the factors and tradeoffs discussed above, and bounding those features within constraints to avoid dynamic instability by interaction between one or more vibration modes of the HP shaft. For example, the relationships (1) to (19) results in the unexpected result of lowering the HP compressor tip radius ratio and increasing the HP compressor pressure ratio, thereby lowering the HP compressor inlet temperature at a fixed OPR and increasing the HP compressor inlet corrected flow while accounting for a feasible $L_{CORE}/D_{CORE}$ for avoiding undesired HP shaft dynamics (e.g., the Alford stability and/or the third mode of the HP shaft).

The inventors have unexpectedly discovered the relationships detailed above among the $L_{CORE}/D_{CORE}$, the HP compressor inlet radius ratio, the HP compressor exit radius, and/or the HP compressor inlet temperature and the HP compressor inlet corrected flow, for improving performance (e.g., higher T3 or OPR, and/or larger HP compressor blade heights and/or improved clearance) at desired $L_{CORE}/D_{CORE}$, in combination with the acoustic spacing features described herein provide significant improvements to engine efficiencies while at the same time reducing acoustic noise. These discoveries reveal a novel interplay between aerodynamic, thermodynamic, and acoustic parameters that were previously unrecognized in conventional gas turbine engine designs. The unexpected benefits of combining these relationships enable a significant and important balancing of noise reduction and engine performance. The combination provides a surprising synergistic effect with improvements to acoustic and thermodynamic parameters in a quieter engine with higher efficiencies, a balance that was previously difficult to achieve. Importantly, the combinations provide a framework for designing engines that meet stringent noise and performance requirements without compromising stability or reliability.

The relationships detailed above also account for a feasible dynamics margin design space for HP compressor stage count of 9, 10, or greater, and/or for 8 stages at lower HP compressor tip radius ratios with improved performance. The relationships, thus, provide for higher OPR or BPR or exhaust gas temperature configurations with HP compressor stage counts of 8 or greater and either subcritical or supercritical midshaft of the LP shaft.

TABLES 1 to 6 list embodiments of the HP compressor and the HP shaft along with their associated HSR, $HSR_{LP}$, $L_{CORE}/D_{CORE}$, $HSP_{AR}$, $HSP\_A_{IN}$, $HSP\_U_{RIM,R/L}$, and $HSP_{RR}$ values. TABLES 1 to 6 include embodiments 1 to 145 and show values for various parameters of each of the relationships (1) to (19) detailed above. The parameters shown in each of TABLES 1 to 6 can be combined such that each embodiment 1 to 145 includes values for every parameter shown in TABLES 1 to 6. Embodiments 121 to 131 include a reverse flow combustor, such as the combustor 700 of FIG. 7. Embodiments 1 to 120 and 132 to 145 include a combustor that is not a reverse flow combustor (e.g., the flow through the combustor is in the same direction as the direction of thrust of the turbine engine).

TABLE 1 lists embodiments of HSR and $HSR_{LP}$, along with the associated $N2_{R/L}$ and $N1_{R/L}$ values. The embodiments inform of the dimensions or qualities of the HP compressor, the HP shaft, and the LP shaft that are believed reasonable and practical for the HP compressor, the HP shaft, and the LP shaft for providing a balance among improving the third mode margin of the HP shaft, without overly reducing performance of the HP compressor and/or the HP turbine. In other words, the HSR and $HSR_{LP}$ indicates the operating ranges of interest, taking into account the constraints in which the HP compressor operates, e.g., the HP compressor inlet temperature and the HP compressor inlet corrected flow, that have not been previously considered in HP compressor and HP shaft designs, as detailed above, as well as ensuring the HP dynamics do not excite the LP shaft and vice-versa.

TABLE 1

| Emb. | $N2_{R/L}$ (RPM) | $L_{CORE}/D_{CORE}$ | HSR | HST | $N1_{R/L}$ (RPM) | $HSR_{LP}$ | LST |
|---|---|---|---|---|---|---|---|
| 1 | 24788 | 3.4 | 3.9 | 0.56 | 10137 | 1.6 | −0.54 |
| 2 | 23020 | 2.9 | 2.9 | 0.57 | 9772 | 1.2 | −0.53 |
| 3 | 22481 | 2.9 | 3.1 | 0.64 | 8515 | 1.2 | −0.41 |
| 4 | 22417 | 3.0 | 3.2 | 0.64 | 8515 | 1.2 | −0.41 |
| 5 | 22246 | 2.8 | 2.6 | 0.57 | 9772 | 1.2 | −0.53 |
| 6 | 20928 | 2.9 | 2.8 | 0.59 | 10137 | 1.3 | −0.49 |
| 7 | 19967 | 2.8 | 2.6 | 0.63 | 10137 | 1.3 | −0.44 |
| 8 | 21281 | 2.6 | 2.5 | 0.56 | 9772 | 1.1 | −0.54 |
| 9 | 21695 | 2.8 | 2.7 | 0.56 | 9772 | 1.2 | −0.54 |
| 10 | 19922 | 3.0 | 2.9 | 0.56 | 9346 | 1.4 | −0.54 |
| 11 | 20809 | 2.7 | 2.7 | 0.52 | 9346 | 1.2 | −0.61 |
| 12 | 20809 | 2.5 | 2.3 | 0.52 | 9346 | 1.0 | −0.61 |
| 13 | 20809 | 2.3 | 1.9 | 0.57 | 9346 | 0.8 | −0.52 |
| 14 | 35788 | 4.3 | 6.2 | 0.59 | 8771 | 1.5 | −0.50 |
| 15 | 35788 | 4.0 | 5.5 | 0.64 | 8771 | 1.4 | −0.42 |
| 16 | 12306 | 2.1 | 1.5 | 0.70 | 10393 | 1.2 | −0.32 |
| 17 | 10580 | 2.1 | 1.5 | 0.64 | 7748 | 1.1 | −0.42 |
| 18 | 24181 | 2.8 | 2.7 | 0.58 | 10632 | 1.2 | −0.51 |
| 19 | 23523 | 2.7 | 2.7 | 0.53 | 10076 | 1.2 | −0.59 |
| 20 | 18378 | 2.2 | 1.7 | 0.73 | 9791 | 0.9 | −0.27 |
| 21 | 18401 | 2.3 | 1.7 | 0.67 | 9696 | 0.9 | −0.37 |
| 22 | 21259 | 2.5 | 2.2 | 0.65 | 10096 | 1.0 | −0.39 |
| 23 | 23255 | 2.8 | 2.7 | 0.67 | 10423 | 1.2 | −0.37 |
| 24 | 20398 | 2.5 | 2.1 | 0.66 | 10329 | 1.1 | −0.38 |
| 25 | 24432 | 2.8 | 2.9 | 0.55 | 10616 | 1.3 | −0.57 |
| 26 | 19914 | 2.4 | 2.0 | 0.77 | 10539 | 1.1 | −0.20 |
| 27 | 19790 | 2.4 | 2.0 | 0.73 | 10174 | 1.0 | −0.26 |
| 28 | 24618 | 3.0 | 3.1 | 0.67 | 11814 | 1.5 | −0.36 |
| 29 | 23073 | 2.7 | 2.6 | 0.67 | 10795 | 1.2 | −0.36 |
| 30 | 24152 | 2.9 | 2.9 | 0.66 | 11535 | 1.4 | −0.38 |
| 31 | 24437 | 2.8 | 2.8 | 0.64 | 11113 | 1.3 | −0.41 |
| 32 | 23043 | 2.7 | 2.6 | 0.61 | 10323 | 1.2 | −0.47 |
| 33 | 20310 | 2.5 | 2.1 | 0.77 | 10081 | 1.1 | −0.20 |
| 34 | 23662 | 2.7 | 2.6 | 0.70 | 11102 | 1.2 | −0.31 |
| 35 | 24039 | 2.8 | 2.8 | 0.69 | 11420 | 1.3 | −0.32 |
| 36 | 20133 | 2.6 | 2.3 | 0.69 | 9988 | 1.1 | −0.34 |

TABLE 1-continued

| Emb. | $N2_{R/L}$ (RPM) | $L_{CORE}/D_{CORE}$ | HSR | HST | $N1_{R/L}$ (RPM) | $HSR_{LP}$ | LST |
|---|---|---|---|---|---|---|---|
| 37 | 20410 | 2.7 | 2.6 | 0.61 | 9229 | 1.2 | −0.45 |
| 38 | 22900 | 2.9 | 3.0 | 0.58 | 9844 | 1.3 | −0.51 |
| 39 | 28164 | 3.6 | 4.3 | 0.68 | 9745 | 1.5 | −0.35 |
| 40 | 25626 | 3.6 | 4.5 | 0.58 | 6545 | 1.2 | −0.51 |
| 41 | 23225 | 3.3 | 3.6 | 0.64 | 7866 | 1.2 | −0.41 |
| 42 | 21410 | 3.3 | 3.5 | 0.69 | 8122 | 1.3 | −0.34 |
| 43 | 19521 | 2.8 | 2.6 | 0.58 | 9891 | 1.3 | −0.51 |
| 44 | 18233 | 2.8 | 2.6 | 0.62 | 9936 | 1.4 | −0.45 |
| 45 | 19710 | 2.6 | 2.2 | 0.54 | 11250 | 1.3 | −0.58 |
| 46 | 18510 | 2.6 | 2.2 | 0.61 | 11406 | 1.3 | −0.47 |
| 47 | 15207 | 2.5 | 2.1 | 0.72 | 11633 | 1.6 | −0.28 |
| 48 | 17374 | 2.4 | 1.9 | 0.62 | 12784 | 1.4 | −0.44 |
| 49 | 20022 | 2.7 | 2.7 | 0.61 | 9295 | 1.3 | −0.46 |
| 50 | 19304 | 2.4 | 2.0 | 0.57 | 11428 | 1.2 | −0.53 |
| 51 | 17220 | 2.4 | 2.0 | 0.65 | 11778 | 1.3 | −0.40 |
| 52 | 18140 | 2.2 | 1.7 | 0.59 | 12842 | 1.2 | −0.50 |
| 53 | 16123 | 2.2 | 1.7 | 0.66 | 13224 | 1.4 | −0.38 |
| 54 | 18670 | 2.5 | 2.1 | 0.64 | 11034 | 1.3 | −0.41 |
| 55 | 15873 | 2.3 | 1.9 | 0.73 | 11849 | 1.4 | −0.26 |
| 56 | 27161 | 2.8 | 2.9 | 0.65 | 8771 | 0.9 | −0.40 |
| 57 | 22208 | 2.4 | 2.1 | 0.78 | 10971 | 1.0 | −0.18 |
| 58 | 24006 | 2.6 | 2.6 | 0.61 | 9004 | 1.0 | −0.47 |
| 59 | 20495 | 2.3 | 1.9 | 0.64 | 11554 | 1.1 | −0.41 |
| 60 | 17397 | 2.1 | 1.7 | 0.73 | 12849 | 1.2 | −0.26 |
| 61 | 24405 | 2.3 | 2.1 | 0.49 | 9321 | 0.8 | −0.67 |
| 62 | 18478 | 2.2 | 1.8 | 0.74 | 12364 | 1.2 | −0.25 |
| 63 | 19700 | 2.3 | 2.0 | 0.61 | 10906 | 1.1 | −0.47 |
| 64 | 20730 | 2.5 | 2.2 | 0.77 | 8367 | 0.9 | −0.20 |
| 65 | 26513 | 3.0 | 3.5 | 0.58 | 8624 | 1.1 | −0.52 |
| 66 | 20516 | 2.8 | 2.7 | 0.69 | 8012 | 1.1 | −0.33 |
| 67 | 27440 | 3.1 | 3.4 | 0.61 | 9166 | 1.1 | −0.46 |
| 68 | 22948 | 2.8 | 2.7 | 0.58 | 9942 | 1.2 | −0.51 |
| 69 | 23902 | 2.7 | 2.8 | 0.64 | 9569 | 1.1 | −0.41 |
| 70 | 23444 | 2.9 | 2.9 | 0.53 | 6816 | 0.9 | −0.59 |
| 71 | 22409 | 2.4 | 2.1 | 0.67 | 8736 | 0.8 | −0.36 |
| 72 | 26430 | 2.8 | 2.9 | 0.59 | 7546 | 0.8 | −0.50 |
| 73 | 24926 | 3.2 | 3.5 | 0.65 | 9124 | 1.3 | −0.40 |
| 74 | 24030 | 2.9 | 3.0 | 0.72 | 7481 | 0.9 | −0.28 |
| 75 | 24497 | 3.1 | 3.4 | 0.73 | 8976 | 1.2 | −0.27 |
| 76 | 25286 | 3.0 | 3.3 | 0.61 | 9854 | 1.3 | −0.46 |
| 77 | 27176 | 2.9 | 3.2 | 0.49 | 6886 | 0.8 | −0.66 |
| 78 | 24306 | 3.1 | 3.1 | 0.72 | 10523 | 1.4 | −0.28 |
| 79 | 21613 | 2.4 | 2.0 | 0.66 | 9631 | 0.9 | −0.38 |
| 80 | 27294 | 3.4 | 4.0 | 0.70 | 8494 | 1.2 | −0.31 |
| 81 | 26052 | 3.6 | 4.2 | 0.71 | 8157 | 1.3 | −0.31 |
| 82 | 26029 | 3.5 | 4.2 | 0.67 | 8882 | 1.4 | −0.37 |
| 83 | 21762 | 2.7 | 2.6 | 0.72 | 7908 | 0.9 | −0.29 |
| 84 | 24839 | 3.4 | 3.8 | 0.60 | 8481 | 1.3 | −0.48 |
| 85 | 25546 | 3.1 | 3.4 | 0.54 | 9088 | 1.2 | −0.57 |
| 86 | 23396 | 3.0 | 3.2 | 0.78 | 10436 | 1.4 | −0.19 |
| 87 | 21419 | 2.7 | 2.5 | 0.76 | 8521 | 1.0 | −0.21 |
| 88 | 26095 | 3.1 | 3.4 | 0.70 | 9709 | 1.3 | −0.32 |
| 89 | 23364 | 2.9 | 2.9 | 0.72 | 9835 | 1.2 | −0.28 |
| 90 | 24653 | 3.4 | 3.9 | 0.74 | 8923 | 1.4 | −0.25 |
| 91 | 23589 | 3.3 | 3.7 | 0.59 | 8376 | 1.3 | −0.50 |
| 92 | 20805 | 2.7 | 2.5 | 0.80 | 8693 | 1.0 | −0.15 |
| 93 | 23344 | 3.2 | 3.6 | 0.60 | 6345 | 1.0 | −0.48 |
| 94 | 26303 | 3.4 | 4.0 | 0.72 | 8481 | 1.3 | −0.29 |
| 95 | 23050 | 2.7 | 2.5 | 0.71 | 8264 | 0.9 | −0.30 |
| 96 | 23094 | 3.3 | 3.6 | 0.65 | 8411 | 1.3 | −0.39 |
| 97 | 24334 | 3.4 | 3.8 | 0.72 | 7411 | 1.2 | −0.29 |
| 98 | 24109 | 2.8 | 2.8 | 0.73 | 9936 | 1.2 | −0.26 |
| 99 | 27525 | 3.1 | 3.5 | 0.65 | 8938 | 1.1 | −0.39 |
| 100 | 26007 | 2.8 | 3.1 | 0.49 | 7071 | 0.8 | −0.66 |
| 101 | 24924 | 3.1 | 3.4 | 0.52 | 9768 | 1.3 | −0.60 |
| 102 | 25797 | 3.6 | 4.3 | 0.70 | 8334 | 1.4 | −0.31 |
| 103 | 24704 | 3.4 | 4.0 | 0.65 | 8037 | 1.3 | −0.40 |
| 104 | 26645 | 3.4 | 3.8 | 0.61 | 9325 | 1.3 | −0.46 |
| 105 | 23578 | 3.3 | 3.7 | 0.71 | 8428 | 1.3 | −0.30 |
| 106 | 27652 | 3.4 | 3.9 | 0.66 | 8802 | 1.2 | −0.38 |
| 107 | 21015 | 3.1 | 3.3 | 0.66 | 8078 | 1.3 | −0.39 |
| 108 | 24454 | 2.7 | 2.6 | 0.66 | 9936 | 1.1 | −0.38 |
| 109 | 25294 | 2.8 | 2.9 | 0.68 | 9283 | 1.1 | −0.35 |
| 110 | 24002 | 3.3 | 3.8 | 0.68 | 8082 | 1.3 | −0.35 |
| 111 | 25956 | 3.2 | 3.6 | 0.62 | 9610 | 1.3 | −0.45 |
| 112 | 23911 | 3.2 | 3.5 | 0.69 | 8746 | 1.3 | −0.33 |
| 113 | 24993 | 3.1 | 3.3 | 0.55 | 6672 | 0.9 | −0.56 |

TABLE 1-continued

| Emb. | $N2_{R/L}$ (RPM) | $L_{CORE}/D_{CORE}$ | HSR | HST | $N1_{R/L}$ (RPM) | $HSR_{LP}$ | LST |
|---|---|---|---|---|---|---|---|
| 114 | 24106 | 2.8 | 2.8 | 0.64 | 7524 | 0.9 | −0.42 |
| 115 | 26699 | 3.1 | 3.6 | 0.59 | 7611 | 1.0 | −0.49 |
| 116 | 24229 | 2.9 | 3.2 | 0.65 | 8541 | 1.1 | −0.39 |
| 117 | 21483 | 2.6 | 2.4 | 0.68 | 7855 | 0.9 | −0.34 |
| 118 | 23965 | 3.0 | 3.2 | 0.64 | 8443 | 1.1 | −0.42 |
| 119 | 26550 | 2.9 | 3.1 | 0.53 | 7813 | 0.9 | −0.59 |
| 120 | 24214 | 3.1 | 3.2 | 0.61 | 8266 | 1.1 | −0.46 |
| 121 | 32209 | 3.8 | 4.5 | 0.73 | 8771 | 1.2 | −0.27 |
| 122 | 30420 | 3.7 | 4.3 | 0.72 | 8771 | 1.2 | −0.28 |
| 123 | 32209 | 3.7 | 4.4 | 0.73 | 8771 | 1.2 | −0.27 |
| 124 | 29302 | 3.4 | 3.6 | 0.58 | 8771 | 1.1 | −0.51 |
| 125 | 29982 | 3.6 | 4.0 | 0.64 | 8771 | 1.2 | −0.41 |
| 126 | 28112 | 3.7 | 4.3 | 0.69 | 8771 | 1.3 | −0.33 |
| 127 | 28852 | 3.9 | 4.8 | 0.79 | 8771 | 1.5 | −0.17 |
| 128 | 27120 | 3.9 | 4.6 | 0.75 | 9745 | 1.7 | −0.23 |
| 129 | 28059 | 3.6 | 4.0 | 0.69 | 8771 | 1.2 | −0.33 |
| 130 | 30335 | 3.6 | 4.1 | 0.67 | 7894 | 1.1 | −0.36 |
| 131 | 28034 | 3.8 | 4.6 | 0.76 | 8771 | 1.4 | −0.21 |
| 132 | 19914 | 3.6 | 4.5 | 0.77 | 9346 | 2.1 | −0.20 |
| 133 | 24039 | 3.4 | 4.2 | 0.69 | 9346 | 1.6 | −0.32 |
| 134 | 20133 | 3.4 | 4.1 | 0.69 | 9346 | 1.9 | −0.34 |
| 135 | 23255 | 3.1 | 3.3 | 0.67 | 9346 | 1.3 | −0.37 |
| 136 | 23344 | 3.3 | 3.8 | 0.71 | 9346 | 1.5 | −0.30 |
| 137 | 20183 | 3.8 | 4.1 | 0.66 | 9346 | 1.9 | −0.38 |
| 138 | 28788 | 3.9 | 4.1 | 0.74 | 9346 | 1.3 | −0.24 |
| 139 | 23444 | 3.1 | 3.5 | 0.64 | 9346 | 1.4 | −0.41 |
| 140 | 23344 | 3.5 | 4.1 | 0.69 | 9346 | 1.6 | −0.33 |
| 141 | 25626 | 3.8 | 4.9 | 0.79 | 9346 | 1.8 | −0.16 |
| 142 | 23344 | 3.7 | 4.8 | 0.78 | 9346 | 1.9 | −0.19 |
| 143 | 23344 | 3.3 | 3.8 | 0.78 | 9346 | 1.5 | −0.19 |
| 144 | 23344 | 3.5 | 4.5 | 0.74 | 9346 | 1.8 | −0.25 |
| 145 | 28788 | 4.0 | 4.4 | 0.73 | 9346 | 1.4 | −0.26 |

With reference to TABLE 1, $N2_{R/L}$ is in a range from 10,580 RPM to 35,788 RPM, HSR is in a range from 1.5 to 6.2, HST is in a range from 0.49 to 0.8, $N1_{R/L}$ is in a range from 6,345 RPM to 13,225 RPM, $HSR_{LP}$ is in a range from 0.8 to 2.1, and LST is in a range from −0.67 to −0.15.

TABLE 2 lists embodiments of the HP compressor and the HP shaft along with the associated HSR and $L_{CORE}/D_{CORE}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the HSR and the $L_{CORE}/D_{CORE}$ ratio indicates the operating ranges of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 2

| Emb. | $FN_{T/O}$ (lbf) | $EGT_{T/O}$ (° C.) | $N2_{R/L}$ (RPM) | $OPR_{T/O}$ | $N_{Stg}$ | $R_{TIP, EX}$ (in) | $R_{HUB, EX}$ (in) | $A_{EX}$ (in$^2$) | $L_{CORE}$ (in) | $L_{CORE}/D_{CORE}$ | HSR | $HSP_x$ |
|---|---|---|---|---|---|---|---|---|---|---|---|---|
| 1 | 35940 | 1113 | 24788 | 49.5 | 10 | 6.9 | 6.39 | 21 | 46.5 | 3.4 | 3.9 | 9.3 |
| 2 | 36228 | 1113 | 23020 | 44.1 | 9 | 7.6 | 7.1 | 22 | 43.9 | 2.9 | 2.9 | 10.8 |
| 3 | 36228 | 1175 | 22481 | 41.8 | 10 | 7.9 | 7.39 | 22 | 46.2 | 2.9 | 3.1 | 8.5 |
| 4 | 36228 | 1175 | 22417 | 40.7 | 10 | 7.7 | 7.26 | 22 | 46.8 | 3.0 | 3.2 | 7.7 |
| 5 | 36228 | 1113 | 22246 | 44.1 | 9 | 7.8 | 7.31 | 23 | 43 | 2.8 | 2.6 | 12.2 |
| 6 | 36228 | 1113 | 20928 | 44.1 | 10 | 8 | 7.43 | 29 | 46.2 | 2.9 | 2.8 | 15.1 |
| 7 | 36228 | 1113 | 19967 | 44.1 | 11 | 8.4 | 7.78 | 32 | 47.2 | 2.8 | 2.6 | 15 |
| 8 | 3628 | 1113 | 21281 | 44.1 | 9 | 8.4 | 7.86 | 26 | 43.9 | 2.6 | 2.5 | 15.5 |
| 9 | 36228 | 1113 | 21695 | 44.1 | 9 | 8 | 7.5 | 25 | 44.9 | 2.8 | 2.7 | 13.5 |
| 10 | 39515 | 1113 | 19922 | 44.1 | 9 | 8.4 | 7.8 | 32 | 49.8 | 3.0 | 2.9 | 20.6 |
| 11 | 39515 | 1113 | 20809 | 44.1 | 8 | 8.8 | 8.11 | 34 | 47.7 | 2.7 | 2.7 | 30.4 |
| 12 | 27633 | 1113 | 20809 | 37.4 | 8 | 8.8 | 8.11 | 34 | 43.7 | 2.5 | 2.3 | 36.9 |
| 13 | 19324 | 1113 | 20809 | 31.7 | 8 | 8.8 | 8.11 | 34 | 39.7 | 2.3 | 1.9 | 44.7 |
| 14 | 18124 | 1113 | 35788 | 40.9 | 9 | 4.7 | 4.31 | 12 | 40.3 | 4.3 | 6.2 | 5.7 |
| 15 | 12674 | 1113 | 35788 | 34.6 | 9 | 4.7 | 4.31 | 12 | 38.2 | 4.0 | 5.5 | 6.9 |
| 16 | 75161 | 1113 | 12306 | 47.8 | 10 | 13 | 12.57 | 68 | 56.2 | 2.1 | 1.5 | 43 |
| 17 | 107480 | 1113 | 10580 | 56.4 | 10 | 16 | 14.85 | 95 | 66.8 | 2.1 | 1.5 | 69.1 |
| 18 | 25247 | 1063 | 24181 | 44.9 | 8 | 7.4 | 6.83 | 24 | 40.9 | 2.8 | 2.7 | 24.2 |
| 19 | 25288 | 1080 | 23523 | 41.7 | 8 | 7.6 | 7.06 | 26 | 41.7 | 2.7 | 2.7 | 25.4 |
| 20 | 29198 | 1158 | 18378 | 32.5 | 8 | 9.2 | 8.7 | 30 | 40.9 | 2.2 | 1.7 | 23.4 |
| 21 | 26169 | 1208 | 18401 | 26.3 | 8 | 9.2 | 8.6 | 34 | 41.7 | 2.3 | 1.7 | 26 |
| 22 | 23249 | 1088 | 21259 | 32.5 | 8 | 8.2 | 7.59 | 28 | 40.9 | 2.5 | 2.2 | 25.7 |
| 23 | 29699 | 1071 | 23255 | 53.5 | 9 | 7.4 | 6.94 | 22 | 41.7 | 2.8 | 2.7 | 16.2 |
| 24 | 20081 | 1073 | 20398 | 32.5 | 9 | 8.2 | 7.72 | 26 | 40.9 | 2.5 | 2.1 | 19.5 |
| 25 | 27940 | 1102 | 24432 | 62.9 | 9 | 7.4 | 6.93 | 19 | 41.7 | 2.8 | 2.9 | 14.8 |
| 26 | 24574 | 1074 | 19914 | 53.5 | 10 | 8.6 | 8.3 | 18 | 41.7 | 2.4 | 2 | 10.1 |
| 27 | 28698 | 1119 | 19790 | 53.4 | 10 | 8.5 | 8.12 | 19 | 40.9 | 2.4 | 2 | 10.2 |
| 28 | 22111 | 1160 | 24618 | 53.5 | 10 | 7 | 6.67 | 15 | 41.7 | 3.0 | 3.1 | 8.4 |
| 29 | 24668 | 1079 | 23073 | 62.9 | 10 | 7.5 | 7.17 | 16 | 40.9 | 2.7 | 2.6 | 9.7 |
| 30 | 25477 | 1186 | 24152 | 62.9 | 10 | 7.2 | 6.83 | 15 | 41.7 | 2.9 | 2.9 | 7.6 |
| 31 | 26508 | 1103 | 24437 | 82 | 10 | 7.2 | 6.93 | 13 | 40.9 | 2.8 | 2.8 | 8.1 |
| 32 | 31781 | 1128 | 23043 | 62.9 | 10 | 7.7 | 7.3 | 20 | 41.7 | 2.7 | 2.6 | 11.7 |
| 33 | 29444 | 1134 | 20310 | 34.9 | 8 | 8.6 | 8.06 | 29 | 42.4 | 2.5 | 2.1 | 22.3 |
| 34 | 25868 | 1165 | 23662 | 40.6 | 8 | 7.4 | 6.86 | 22 | 40.3 | 2.7 | 2.6 | 17.3 |
| 35 | 25169 | 1135 | 24039 | 51.2 | 9 | 7.4 | 7.03 | 18 | 41.9 | 2.8 | 2.8 | 12.5 |
| 36 | 29459 | 1107 | 20133 | 43 | 9 | 8.7 | 8.16 | 26 | 44.5 | 2.6 | 2.3 | 17.7 |
| 37 | 30518 | 1065 | 20410 | 58.8 | 10 | 8.7 | 8.28 | 22 | 47 | 2.7 | 2.6 | 13.9 |
| 38 | 25749 | 1069 | 22900 | 64.6 | 10 | 7.8 | 7.4 | 18 | 45.4 | 2.9 | 3 | 11.6 |
| 39 | 18136 | 1113 | 28164 | 40.6 | 10 | 5.8 | 5.48 | 11 | 41.9 | 3.6 | 4.3 | 4.3 |
| 40 | 36229 | 1113 | 25626 | 40.7 | 9 | 6.6 | 6.03 | 24 | 48.3 | 3.6 | 4.5 | 11.4 |
| 41 | 36254 | 1113 | 23225 | 40.6 | 10 | 7.2 | 6.66 | 23 | 47.3 | 3.3 | 3.6 | 8.8 |

TABLE 2-continued

| Emb. | $FN_{T/O}$ (lbf) | $EGT_{T/O}$ (° C.) | $N2_{R/L}$ (RPM) | $OPR_{T/O}$ | $N_{Stg}$ | $R_{TIP, EX}$ (in) | $R_{HUB, EX}$ (in) | $A_{EX}$ (in$^2$) | $L_{CORE}$ (in) | $L_{CORE}/D_{CORE}$ | HSR | $HSP_x$ |
|---|---|---|---|---|---|---|---|---|---|---|---|---|
| 42 | 36253 | 1113 | 21410 | 40.4 | 10 | 7.7 | 7.23 | 23 | 50.3 | 3.3 | 3.5 | 8.6 |
| 43 | 52524 | 1113 | 19521 | 40.7 | 9 | 8.6 | 7.92 | 34 | 48.2 | 2.8 | 2.6 | 16.5 |
| 44 | 52523 | 1113 | 18233 | 41 | 9 | 9.1 | 8.48 | 34 | 51.2 | 2.8 | 2.6 | 16.6 |
| 45 | 52525 | 1113 | 19710 | 40.1 | 9 | 8.5 | 7.85 | 36 | 43.7 | 2.6 | 2.2 | 17.7 |
| 46 | 52561 | 1113 | 18510 | 40.7 | 10 | 9 | 8.36 | 35 | 46 | 2.6 | 2.2 | 13.9 |
| 47 | 52558 | 1113 | 15207 | 40.1 | 10 | 11 | 10.17 | 34 | 54.1 | 2.5 | 2.1 | 12.7 |
| 48 | 52560 | 1113 | 17374 | 40.6 | 10 | 9.5 | 8.9 | 34 | 45.2 | 2.4 | 1.9 | 13.1 |
| 49 | 52523 | 1113 | 20022 | 40.8 | 9 | 8.9 | 8.3 | 34 | 49 | 2.7 | 2.7 | 16.8 |
| 50 | 52524 | 1113 | 19304 | 40.8 | 9 | 9.3 | 8.61 | 36 | 44.2 | 2.4 | 2 | 18.2 |
| 51 | 52522 | 1113 | 17220 | 40.9 | 9 | 10 | 9.65 | 34 | 48.1 | 2.4 | 2 | 16.7 |
| 52 | 52523 | 1113 | 18140 | 40.8 | 9 | 9.8 | 9.16 | 35 | 43.2 | 2.2 | 1.7 | 17.1 |
| 53 | 52522 | 1113 | 16123 | 40.8 | 9 | 11 | 10.31 | 33 | 47.2 | 2.2 | 1.7 | 15.8 |
| 54 | 52560 | 1113 | 18670 | 40.7 | 10 | 9.5 | 8.9 | 35 | 46.7 | 2.5 | 2.1 | 14 |
| 55 | 52558 | 1113 | 15873 | 39.9 | 10 | 11 | 10.47 | 34 | 51.5 | 2.3 | 1.9 | 13.3 |
| 56 | 18124 | 1113 | 27161 | 40.8 | 9 | 6.7 | 6.42 | 12 | 37.6 | 2.8 | 2.9 | 5.7 |
| 57 | 18136 | 1113 | 22208 | 39.4 | 10 | 8.3 | 8.04 | 12 | 39.4 | 2.4 | 2.1 | 4.7 |
| 58 | 36228 | 1113 | 54006 | 40.9 | 9 | 7.9 | 7.4 | 24 | 41.6 | 2.6 | 2.6 | 11.8 |
| 59 | 36228 | 1113 | 20495 | 41 | 9 | 9.1 | 8.67 | 24 | 41.3 | 2.3 | 1.9 | 12.1 |
| 60 | 36228 | 1113 | 17397 | 40.2 | 9 | 11 | 10.21 | 24 | 45 | 2.1 | 1.7 | 11.4 |
| 61 | 36230 | 1113 | 24405 | 40.1 | 9 | 7.8 | 7.28 | 27 | 36.4 | 2.3 | 2.1 | 14.4 |
| 62 | 36253 | 1113 | 18478 | 39.8 | 10 | 10 | 9.61 | 24 | 43.6 | 2.2 | 1.8 | 9.5 |
| 63 | 52523 | 1113 | 19700 | 40.9 | 9 | 9.6 | 9.16 | 36 | 44.7 | 2.3 | 2 | 17.9 |
| 64 | 29791 | 1141 | 20730 | 46.7 | 10 | 8.7 | 8.42 | 16 | 42.9 | 2.5 | 2.2 | 5.6 |
| 65 | 38564 | 1123 | 26513 | 48.5 | 8 | 7.1 | 6.58 | 21 | 43.1 | 3.0 | 3.5 | 13 |
| 66 | 41861 | 1258 | 20516 | 39.3 | 10 | 8.3 | 7.81 | 22 | 46.9 | 2.8 | 2.7 | 6.7 |
| 67 | 34695 | 1249 | 27440 | 40.3 | 9 | 6.7 | 6.2 | 19 | 40.8 | 3.1 | 3.4 | 7.4 |
| 68 | 45080 | 1187 | 22948 | 40.2 | 9 | 7.6 | 6.99 | 26 | 42.5 | 2.8 | 2.7 | 11.1 |
| 69 | 38835 | 1252 | 23902 | 42.3 | 8 | 7.8 | 7.37 | 19 | 42.6 | 2.7 | 2.8 | 9.4 |
| 70 | 41411 | 1128 | 23444 | 39.3 | 8 | 7.6 | 7 | 29 | 43.7 | 2.9 | 2.9 | 17.7 |
| 71 | 40010 | 1281 | 22409 | 44.2 | 9 | 8.3 | 7.93 | 20 | 39.9 | 2.4 | 2.1 | 6.8 |
| 72 | 34589 | 1261 | 26430 | 40.1 | 8 | 7.1 | 6.62 | 19 | 39 | 2.8 | 2.9 | 9.5 |
| 73 | 36392 | 1184 | 24926 | 45.2 | 10 | 6.7 | 6.3 | 18 | 43.6 | 3.2 | 3.5 | 6.1 |
| 74 | 29097 | 1266 | 24030 | 46.7 | 9 | 7.4 | 7.07 | 13 | 42.5 | 2.9 | 3 | 5.1 |
| 75 | 29975 | 1273 | 24497 | 47.3 | 10 | 7.1 | 6.77 | 13 | 44.3 | 3.1 | 3.4 | 4 |
| 76 | 35983 | 1230 | 25286 | 38.4 | 8 | 7.1 | 6.62 | 21 | 43.2 | 3.0 | 3.3 | 10.3 |
| 77 | 35202 | 1136 | 27176 | 39.2 | 8 | 6.9 | 6.33 | 26 | 40.4 | 2.9 | 3.2 | 16.8 |
| 78 | 28834 | 1252 | 24306 | 42.3 | 10 | 6.9 | 6.54 | 14 | 42.2 | 3.1 | 3.1 | 4.2 |
| 79 | 38443 | 1282 | 21613 | 38.2 | 9 | 8.5 | 8.13 | 20 | 40.2 | 2.4 | 2 | 7.5 |
| 80 | 27754 | 1263 | 27294 | 43.6 | 10 | 6.2 | 5.82 | 13 | 42.4 | 3.4 | 4 | 4.1 |
| 81 | 27382 | 1156 | 26052 | 43.3 | 10 | 6.4 | 5.96 | 15 | 45.4 | 3.6 | 4.2 | 5.4 |
| 82 | 34118 | 1225 | 26029 | 48.9 | 10 | 6.4 | 5.99 | 15 | 45.2 | 3.5 | 4.2 | 4.8 |
| 83 | 41362 | 1282 | 21762 | 48.9 | 10 | 8 | 7.65 | 17 | 43.3 | 2.7 | 2.6 | 4.9 |
| 84 | 33372 | 1118 | 24839 | 44.3 | 10 | 6.8 | 6.35 | 20 | 46 | 3.4 | 3.8 | 7.9 |
| 85 | 44425 | 1118 | 25546 | 43.2 | 9 | 7 | 6.29 | 28 | 43.2 | 3.1 | 3.4 | 13.4 |
| 86 | 28190 | 1269 | 23396 | 45.3 | 10 | 7.5 | 7.19 | 13 | 45.3 | 3.0 | 3.2 | 3.8 |
| 87 | 35231 | 1273 | 21419 | 47.9 | 10 | 8.1 | 7.83 | 15 | 43.4 | 2.7 | 2.5 | 4.3 |
| 88 | 28272 | 1262 | 26095 | 44.8 | 10 | 6.7 | 6.32 | 13 | 41.4 | 3.1 | 3.4 | 4.1 |
| 89 | 42416 | 1282 | 23364 | 48.5 | 10 | 7.6 | 7.26 | 17 | 43.9 | 2.9 | 2.9 | 4.9 |
| 90 | 28346 | 1263 | 24653 | 40 | 10 | 6.8 | 6.49 | 15 | 46.4 | 3.4 | 3.9 | 4.5 |
| 91 | 43315 | 1115 | 23589 | 41.3 | 9 | 7.2 | 6.59 | 27 | 47.4 | 3.3 | 3.7 | 12.5 |
| 92 | 33540 | 1259 | 20805 | 47.8 | 10 | 8.5 | 8.24 | 14 | 45.2 | 2.7 | 2.5 | 4.3 |
| 93 | 42603 | 1139 | 23344 | 41.4 | 9 | 7.4 | 6.8 | 26 | 47.5 | 3.2 | 3.6 | 12.1 |
| 94 | 29583 | 1278 | 26303 | 47.6 | 10 | 6.5 | 6.13 | 13 | 44.3 | 3.4 | 4 | 3.8 |
| 95 | 31357 | 1281 | 23050 | 41.7 | 10 | 7.6 | 7.24 | 15 | 40.7 | 2.7 | 2.5 | 4.7 |
| 96 | 44345 | 1215 | 23094 | 42.4 | 10 | 7.3 | 6.78 | 23 | 47.5 | 3.3 | 3.6 | 7.2 |
| 97 | 36178 | 1233 | 24334 | 45.9 | 10 | 6.9 | 6.5 | 17 | 46.5 | 3.4 | 3.8 | 5.2 |
| 98 | 33158 | 1260 | 24109 | 46 | 10 | 7.4 | 7.02 | 15 | 41.6 | 2.8 | 2.8 | 4.4 |
| 99 | 32153 | 1279 | 27525 | 48.7 | 10 | 6.6 | 6.27 | 14 | 40.9 | 3.1 | 3.5 | 4.3 |
| 100 | 44003 | 1118 | 26067 | 48.4 | 8 | 7.4 | 6.78 | 26 | 41.9 | 2.8 | 3.1 | 17.6 |
| 101 | 42640 | 1127 | 24924 | 41.3 | 9 | 6.9 | 6.22 | 27 | 43 | 3.1 | 3.4 | 13.1 |
| 102 | 30510 | 1281 | 25797 | 39.3 | 10 | 6.4 | 6.02 | 16 | 46 | 3.6 | 4.3 | 4.7 |
| 103 | 39341 | 1137 | 24704 | 43.8 | 9 | 6.9 | 6.37 | 22 | 47.6 | 3.4 | 4 | 9.7 |
| 104 | 38354 | 1216 | 26645 | 43.6 | 10 | 6.3 | 5.83 | 19 | 42.8 | 3.4 | 3.8 | 6.3 |
| 105 | 39061 | 1277 | 23578 | 48.7 | 10 | 7 | 6.64 | 16 | 46.9 | 3.3 | 3.7 | 4.6 |
| 106 | 34146 | 1256 | 27652 | 45.3 | 10 | 6.2 | 5.83 | 16 | 41.9 | 3.4 | 3.9 | 4.9 |
| 107 | 44129 | 1158 | 21015 | 42.1 | 10 | 7.9 | 7.38 | 25 | 49.6 | 3.1 | 3.3 | 8.5 |
| 108 | 39281 | 1281 | 24454 | 47.1 | 9 | 7.5 | 7.13 | 17 | 40.3 | 2.7 | 2.6 | 6.1 |
| 109 | 27391 | 1213 | 25294 | 45 | 9 | 7.2 | 6.87 | 14 | 40.6 | 2.8 | 2.9 | 5.8 |
| 110 | 36428 | 1203 | 24002 | 43.8 | 10 | 7 | 6.61 | 19 | 47.1 | 3.3 | 3.8 | 6.2 |
| 111 | 45242 | 1281 | 25956 | 44.8 | 10 | 6.7 | 6.15 | 20 | 42.8 | 3.2 | 3.6 | 6.1 |
| 112 | 31468 | 1271 | 23911 | 46.1 | 10 | 6.9 | 6.55 | 14 | 44.7 | 3.2 | 3.5 | 4.2 |
| 113 | 44365 | 1118 | 24993 | 44.5 | 9 | 7 | 6.32 | 27 | 42.7 | 3.1 | 3.3 | 13.1 |
| 114 | 40875 | 1186 | 24106 | 46.7 | 8 | 7.7 | 7.31 | 20 | 42.6 | 2.8 | 2.8 | 11 |
| 115 | 38425 | 1246 | 26699 | 40.3 | 9 | 6.8 | 6.28 | 21 | 42.5 | 3.1 | 3.6 | 8.6 |
| 116 | 42939 | 1208 | 24229 | 44.4 | 8 | 7.6 | 7.14 | 21 | 44.7 | 2.9 | 3.2 | 10.8 |
| 117 | 38881 | 1139 | 21483 | 46.8 | 9 | 8.5 | 8.13 | 20 | 43.8 | 2.6 | 2.4 | 9.1 |
| 118 | 43139 | 1250 | 23965 | 43.5 | 10 | 7.3 | 6.8 | 21 | 44.3 | 3.0 | 3.2 | 6.5 |

TABLE 2-continued

| Emb. | $FN_{T/O}$ (lbf) | $EGT_{T/O}$ (° C.) | $N2_{R/L}$ (RPM) | $OPR_{T/O}$ | $N_{Stg}$ | $R_{TIP, EX}$ (in) | $R_{HUB, EX}$ (in) | $A_{EX}$ (in²) | $L_{CORE}$ (in) | $L_{CORE}/D_{CORE}$ | HSR | $HSP_x$ |
|---|---|---|---|---|---|---|---|---|---|---|---|---|
| 119 | 36707 | 1195 | 26550 | 40.8 | 8 | 7.2 | 6.66 | 23 | 41.1 | 2.9 | 3.1 | 13 |
| 120 | 43047 | 1201 | 24214 | 42.7 | 10 | 7.2 | 6.65 | 23 | 43.8 | 3.1 | 3.2 | 7.7 |
| 121 | 18124 | 1113 | 32209 | 40.9 | 9 | 4.95 | 4.55 | 12 | 37.1 | 3.8 | 4.5 | 5.7 |
| 122 | 12674 | 1113 | 30420 | 41.6 | 9 | 5.20 | 4.82 | 12 | 38.2 | 3.7 | 4.3 | 8.2 |
| 123 | 18124 | 1113 | 32209 | 40.9 | 9 | 4.95 | 4.55 | 12 | 36.8 | 3.7 | 4.4 | 5.7 |
| 124 | 18125 | 1113 | 29302 | 40.3 | 9 | 5.39 | 5.01 | 12 | 36.4 | 3.4 | 3.6 | 5.1 |
| 125 | 18124 | 1113 | 29982 | 40.8 | 9 | 5.26 | 4.89 | 12 | 37.6 | 3.6 | 4.0 | 4.6 |
| 126 | 18124 | 1113 | 28112 | 41.0 | 9 | 5.56 | 5.22 | 11 | 41.2 | 3.7 | 4.3 | 4.4 |
| 127 | 18137 | 1113 | 28852 | 40.6 | 10 | 5.43 | 5.08 | 12 | 42.4 | 3.9 | 4.8 | 4.4 |
| 128 | 18136 | 1113 | 27120 | 52.7 | 10 | 5.74 | 5.41 | 12 | 44.3 | 3.9 | 4.6 | 5.7 |
| 129 | 18137 | 1113 | 28059 | 40.6 | 10 | 5.57 | 5.23 | 12 | 39.6 | 3.6 | 4.0 | 4.4 |
| 130 | 18124 | 1113 | 30335 | 41.1 | 9 | 5.21 | 4.84 | 12 | 37.3 | 3.6 | 4.1 | 4.7 |
| 131 | 18124 | 1113 | 28034 | 36.9 | 9 | 5.58 | 5.23 | 12 | 42.8 | 3.8 | 4.6 | 4.1 |
| 132 | 24574 | 1074 | 19914 | 53.5 | 10 | 8.64 | 8.30 | 18 | 62.2 | 3.6 | 4.5 | 10.1 |
| 133 | 25169 | 1135 | 24039 | 51.2 | 9 | 7.43 | 7.03 | 18 | 51.0 | 3.4 | 4.2 | 12.5 |
| 134 | 38011 | 1107 | 20133 | 43.0 | 9 | 8.65 | 8.16 | 26 | 59.0 | 3.4 | 4.1 | 13.7 |
| 135 | 29699 | 1071 | 23255 | 53.5 | 9 | 7.43 | 6.94 | 22 | 46.1 | 3.1 | 3.3 | 16.2 |
| 136 | 45593 | 1139 | 23344 | 36.1 | 8 | 7.62 | 7.00 | 29 | 50.0 | 3.3 | 3.8 | 14.8 |
| 137 | 25477 | 1186 | 20183 | 62.9 | 9 | 7.16 | 6.83 | 15 | 54.0 | 3.8 | 4.1 | 9.4 |
| 138 | 13600 | 1113 | 28788 | 42.1 | 8 | 4.73 | 4.31 | 12 | 36.8 | 3.9 | 4.1 | 9.8 |
| 139 | 41411 | 1128 | 23444 | 39.3 | 8 | 7.62 | 7.00 | 29 | 48.0 | 3.1 | 3.5 | 17.7 |
| 140 | 42603 | 1139 | 23344 | 48.7 | 9 | 7.39 | 6.80 | 26 | 51.0 | 3.5 | 4.1 | 14.2 |
| 141 | 30229 | 1113 | 25626 | 31.8 | 9 | 6.62 | 6.03 | 24 | 50.3 | 3.8 | 4.9 | 10.7 |
| 142 | 44695 | 1139 | 23344 | 36.1 | 9 | 7.62 | 7.00 | 29 | 56.0 | 3.7 | 4.8 | 11.9 |
| 143 | 41695 | 1139 | 23344 | 36.1 | 8 | 7.62 | 7.00 | 29 | 50.0 | 3.3 | 3.8 | 16.2 |
| 144 | 44695 | 1139 | 23344 | 40.7 | 9 | 7.62 | 7.00 | 29 | 54.0 | 3.5 | 4.5 | 13.5 |
| 145 | 12000 | 1113 | 28788 | 44.1 | 9 | 4.73 | 4.31 | 12 | 38.2 | 4.0 | 4.4 | 9.2 |

The ranges of $FN_{T/O}$, $N2_{R/L}$, $OPR_{T/O}$, $R_{HUB,EX}$, $A_{EX}$, $L_{CORE}$, and $L_{CORE}/D_{CORE}$ are detailed above. HSR is given by relationship (1) above and is from 1.5 to 6.2. The exhaust gas temperature (EGT) is from 1,063° C. to 1,282° C. at redline speeds of the HP shaft. The EGT is a measure of BPR of the turbine engine along with the fan diameter. The EGT is limited by material capability of the LP turbine inlet blades. For example, the LP turbine inlet blades can include metallic single crystal blades uncooled (e.g., minimum capability), cooled (+200° C.), or CM C blade uncooled (+100° C. to +150° C.). The fan diameter is a function of the thrust requirement, and the core size is decided by the EGT and the OPR. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). Accordingly, embodiments 1 to 145 provide for lowering the core size, while accounting for the dynamics margins and overall engine performance.

FIG. 9 represents, in graph form, the $L_{CORE}/D_{CORE}$ as a function of the $HSP_X$. $HSP_X$ is given by relationship (8) detailed above. $L_{CORE}/D_{CORE}$ is in a range from 2.1 to 4.3 and $HSP_X$ is in a range from 3.8 in² to 69.1 in². An area 900 represents the boundaries of $L_{CORE}/D_{CORE}$ and $HSP_X$. $L_{CORE}/D_{CORE}$ and $HSP_X$ are bounded by an upper bound 902. The upper bound 902 is given by (20):

$$\frac{L_{CORE}}{D_{CORE}} < MAX(4.8 - 0.088*(HSP_X), 3.18 - 0.015*(HSP_X)) \quad (20)$$

Figure 12:
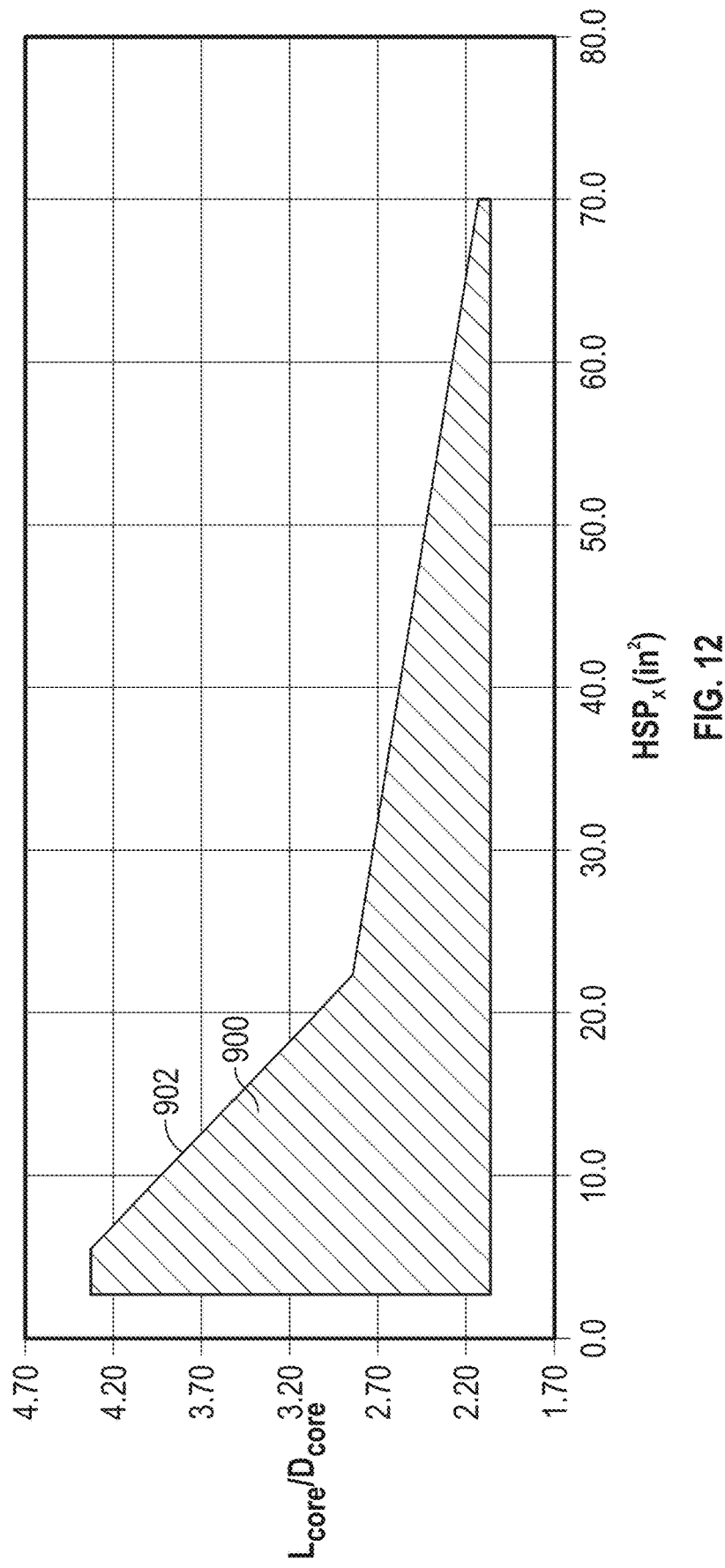
FIG. 12 represents, in graph form, a range of a high-speed shaft rating (HSR). In particular.

With reference to TABLE 2 and FIG. 12, in general, $L_{CORE}/D_{CORE}$ decreases as $HSP_X$ increases, and $L_{CORE}/D_{CORE}$ increases as $HSP_X$ decreases. $HSP_X$ increases with increased $A_{EX}$ and/or increases $OPR_{T/O}$, and decreases with increased $FN_{T/O}$. The area 900 shows the behavior of lower core size, leading to higher $L_{CORE}/D_{CORE}$ due to $L_{CORE}$ not scaling with flow size, as detailed above. For direct drive engines, reducing the core size leads to an increase in $L_{CORE}/D_{CORE}$ (e.g., up to 3.25), which has an effect on the dynamics margins, thereby limiting the design of the engine core. For geared engines (e.g., indirect drive), the $L_{CORE}/D_{CORE}$ is limited to about 3.0, which has been achieved with 8 stage compressors. The BPR can be increased in three ways: 1. Increased thrust from the same engine core size by increasing the fan size, 2. Smaller engine core size with increased OPR by increasing the LP compressor pressure ratio or increasing T25, or 3. Smaller engine core size with increased EGT. All three methods of increasing the BPR lead to lowering the $HSP_X$, thereby increasing $L_{CORE}/D_{CORE}$. To increase $L_{CORE}/D_{CORE}$ with minimal effects on the dynamics margins, the HP compressor tip radius ratio is increased, and the number of HP compressor stages is reduced. Additionally, smaller blade heights at the HP compressor exit can be utilized.

Accordingly, the area 900 illustrates feasible dynamics zone for higher stage count compressors with higher $L_{CORE}/D_{CORE}$ than engines without the benefit of the present disclosure (e.g., engines at lower $HSP_X$). This is achieved by balancing the HP compressor inlet temperature, corrected inlet flows, and higher HP compressor pressure ratios with the radius ratio.

Figure 13:
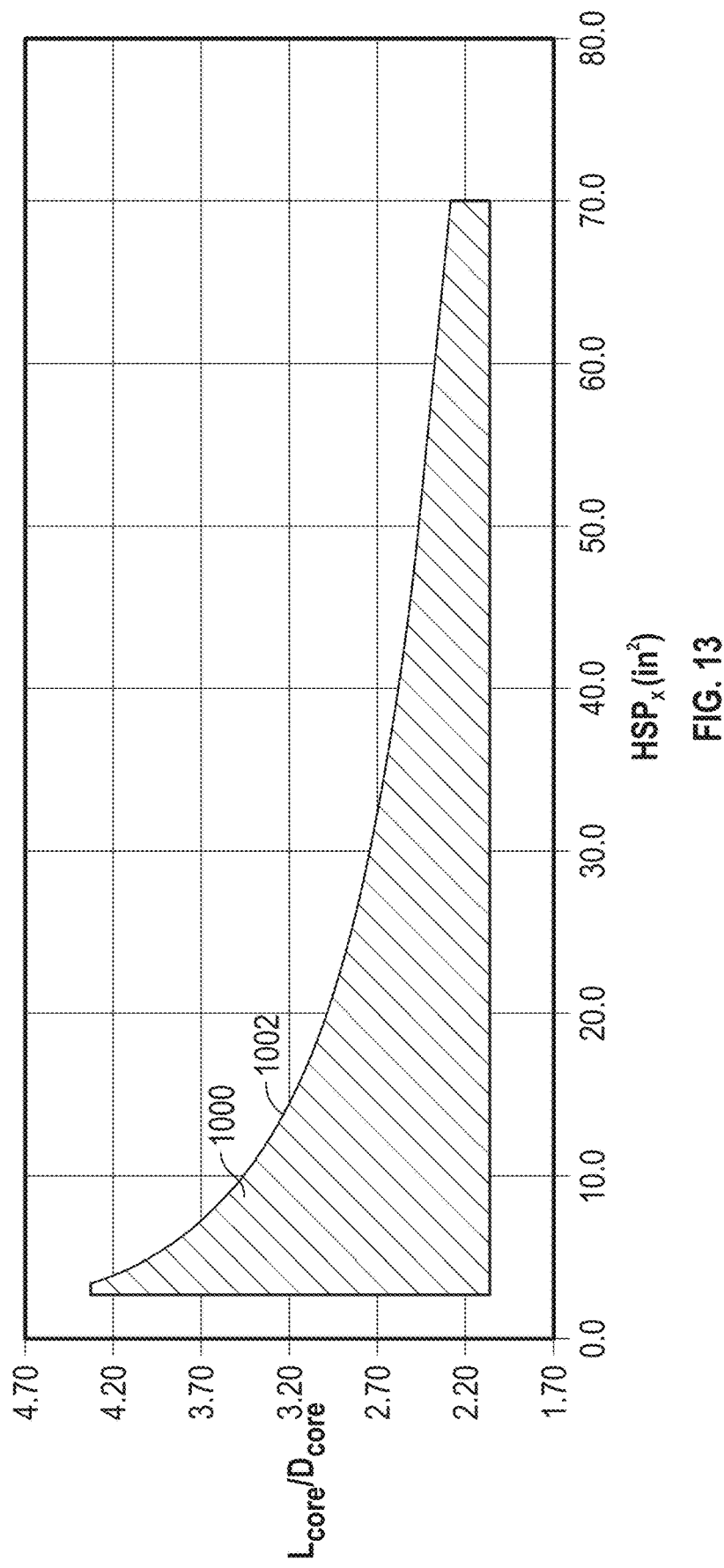
FIG. 13 represents, in graph form, a range of a high-speed shaft rating (HSR), according to another embodiment. In particular.

FIG. 13 represents, in graph form, the $L_{CORE}/D_{CORE}$ as a function of the $HSP_X$, according to another embodiment. $HSP_X$ is given by relationship (8) detailed above. $L_{CORE}/D_{CORE}$ is in a range from 2.1 to 4.3 and $HSP_X$ is in a range from 3.8 in² to 69.1 in². An area 1000 represents the boundaries of $L_{CORE}/D_{CORE}$ and $HSP_X$. $L_{CORE}/D_{CORE}$ and $HSP_X$ are bounded by an upper bound 1002. The upper bound 1002 is given by (21):

$$\frac{L_{CORE}}{D_{CORE}} < \frac{4.08}{(HSP_X - 8)^{0.14}} \quad (21)$$

With reference to TABLE 2 and FIG. 13, in general, $L_{CORE}/D_{CORE}$ decreases as $HSP_X$ increases, and $L_{CORE}/D_{CORE}$ increases as $HSP_X$ decreases, as detailed above. $HSP_X$ increases with increased $A_{EX}$ and/or increases $OPR_{T/O}$, and decreases with increased $FN_{T/O}$, as detailed above.

Figure 14:
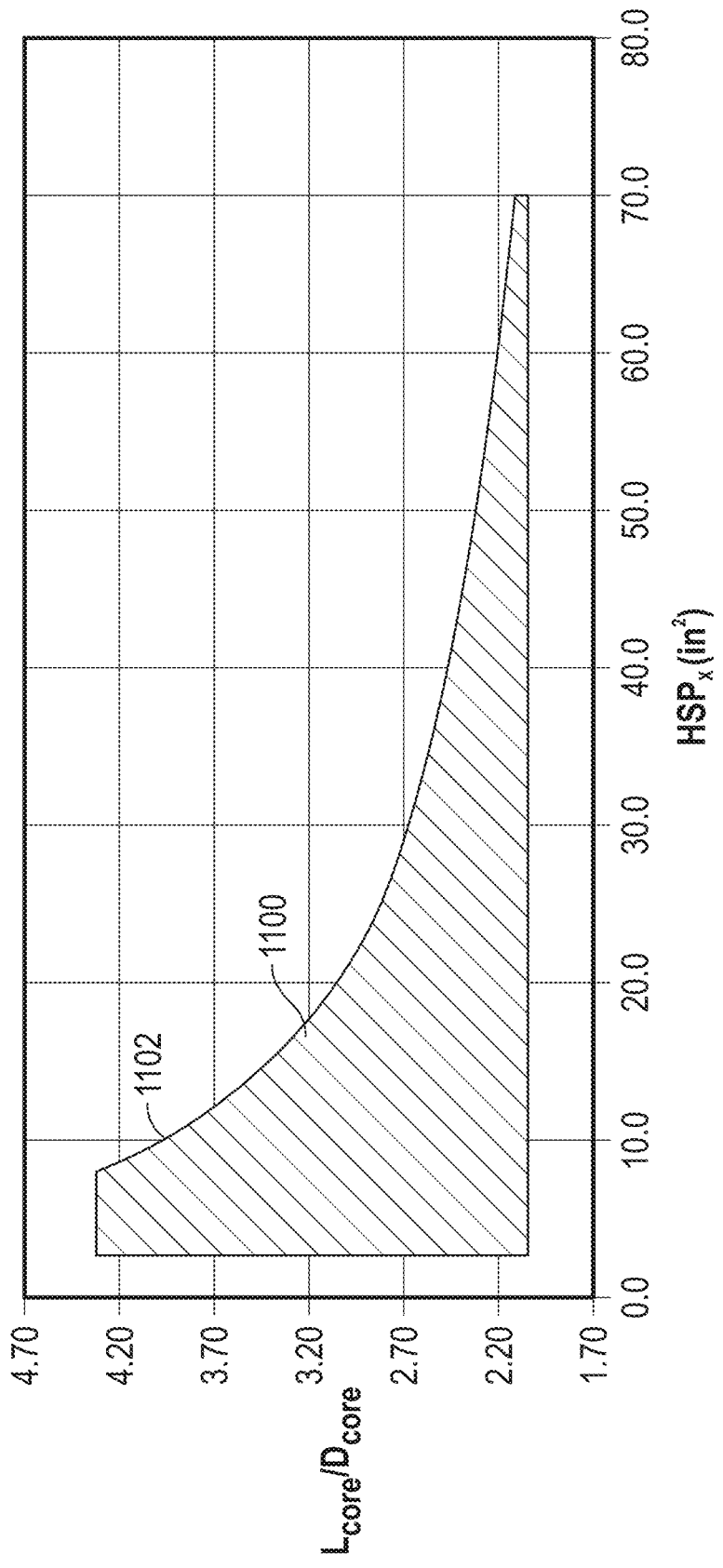
FIG. 14 represents, in graph form, a range of a high-speed shaft rating (HSR), according to another embodiment. In particular.

FIG. 14 represents, in graph form, the $L_{CORE}/D_{CORE}$ as a function of the $HSP_X$, according to another embodiment. $HSP_X$ is given by relationship (8) detailed above. $L_{CORE}/D_{CORE}$ is in a range from 2.1 to 4.3 and $HSP_X$ is in a range from 3.8 in$^2$ to 69.1 in$^2$. An area 1100 represents the boundaries of $L_{CORE}/D_{CORE}$ and $HSP_X$. $L_{CORE}/D_{CORE}$ and $HSP_X$ are bounded by an upper bound 1102. The upper bound 1102 is given by (22):

$$\frac{L_{CORE}}{D_{CORE}} < \text{MAX}\left(9.55*(HSP_X)^{-0.38},\ 6.95*(HSP_X)^{-0.28}\right) \quad (22)$$

With reference to TABLE 2 and FIG. 14, in general, $L_{CORE}/D_{CORE}$ decreases as $HSP_X$ increases, and $L_{CORE}/D_{CORE}$ increases as $HSP_X$ decreases, as detailed above. $HSP_X$ increases with increased $A_{EX}$ and/or increases $OPR_{T/O}$, and decreases with increased $FN_{T/O}$, as detailed above. The upper bound 1102 is given by $9.55*(HSP_X)^{-0.38}$ for values of $HSP_X$ from 3.8 in$^2$ to 25 in$^2$, and is given by $6.95*(HSP_X)^{-0.28}$ for values of $HSP_X$ from 25 in$^2$ to 69.1 in$^2$.

In general, the areas 900, 1000, and 1100 having the upper bounds 902, 1002, and 1102, respectively, provide for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine. The enhanced engine performance (higher thermodynamic cycle performance) of the present disclosure is achieved by the turbine engine having a higher bypass ratio by reducing the size of the engine core as compared to turbine engines that fall outside of the areas 900, 1000, and 1100. In particular, the enhanced engine performance is achieved by the turbine engine having: 1. an improved overall compression efficiency by moving the pressure ratio from the LP compressor to the HP compressor, 2. an improved HP turbine efficiency due to higher HP turbine inlet temperature, and 3. a reduced HP system weight due to a lower radius of the engine core by lowering the inlet radius ratio of the HP compressor.

The areas 900, 1000, and 1100 being bounded by the upper bounds 902, 1002, 1102 represent the enhanced engine performance. In particular, at a given value of $L_{CORE}/D_{CORE}$, the areas 900, 1000, and 1100 represent the largest engine core size at a given thrust level and at a given OPR that results in the enhanced engine performance (higher thermodynamic cycle performance) without overly sacrificing the engine performance. For example, if $L_{CORE}/D_{CORE}$ and $HSP_X$ (i.e., $HSP_X$ is a function of the exit area of the HP compressor, the OPR at takeoff, the sea-level static thrust at takeoff, and the number of stages in the HP compressor) are within the areas 900, 1000, and 1100, then the turbine engine has a lower engine core size (as represented by the exit area of the HP compressor in $HSP_X$), and, thus, a higher bypass ratio, for the given thrust level (as given in $HSP_X$) and the given OPR (as given in $HSP_X$), resulting in the enhanced engine performance (lower specific fuel consumption at the given thrust level and at the given OPR of the turbine engine.) If $L_{CORE}/D_{CORE}$ and $HSP_X$ are outside of the areas 900, 1000, and 1100, then the engine core size will be too large, resulting in poorer engine performance for the given thrust level and the given OPR.

The dynamics constraint (e.g., the third mode of the HP shaft) of the claimed invention is greater than-10% of the redline speed of the HP shaft for stable operating conditions and is given by equation (2d), discussed above. Additionally, the dynamics constraint of equation (2d) also ensures balancing with the first mode and the second mode of the HP shaft to meet dynamics requirements under all nominal conditions (the design point (e.g., cruise conditions) where the turbine engine is intended to normally perform at a certain performance level) and off design conditions (conditions other than the design point, such as, low power operation (e.g., idle conditions, start conditions, etc.), transient operation, or non-standard ambient conditions or altitude). The stable operating conditions of the present disclosure are achieved by the turbine engine in embodiments 1 to 145 having a lower $L_{CORE}/D_{CORE}$ (HP shaft L/D) and a lower HP shaft redline speed due to higher HP compressor inlet corrected flow and lower HP compressor inlet temperature for a given thrust level and a given OPR.

The areas 900, 1000, and 1100 represent the dynamics constraint of equation (2d). In particular, if $L_{CORE}/D_{CORE}$ and $HSP_X$ are within the areas 900, 1000, and 1100, then the third mode will meet the required dynamics constraint of equation (2d) (being greater than −0.1), and, thus, the HP shaft will have stable operating conditions, and the third mode will not be excited. If $L_{CORE}/D_{CORE}$ and $HSP_X$ are outside of the areas 900, 1000, and 1100, then the third mode will not meet the required dynamics constraint of equation (2d) (being less than −0.1), and, thus, the third mode of the HP shaft will be excited during normal operation of the turbine engine, thereby resulting in excessive vibrations of the HP shaft. Thus, the areas 900, 1000, and 1100 provide for an improved turbine engine having enhanced engine performance (i.e., a lower specific fuel consumption at a given thrust level and at a given OPR of the turbine engine), while ensuring that the dynamics (e.g., the third mode of the HP shaft) are constrained to be greater than-10% of the redline speed to ensure stable operating conditions of the HP shaft without exciting the third mode, and balancing with the first mode and the second mode of the HP shaft during an entire operation of the turbine engine (including steady state conditions and transient conditions).

TABLE 3 lists embodiments of the HP compressor and the HP shaft along with the associated $HSP_{AR}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the $HSP_{AR}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 3

| Emb. | $FN_{T/O}$ (lbf) | $OPR_{T/O}$ | $N_{Stg}$ | $R_{HUB,IN}/R_{TIP,IN}$ | $R_{TIP,IN}$ (in) | $R_{TIP,EX}$ (in) | $A_{IN}$ (in$^2$) | $A_{EX}$ (in$^2$) | AR | $HSP_x$ (in$^2$) | $HSP_{AR}$ |
|---|---|---|---|---|---|---|---|---|---|---|---|
| 1 | 35940 | 49.5 | 10 | 0.47 | 8.35 | 6.9 | 170 | 21 | 7.9 | 9.3 | 144 |
| 2 | 36228 | 44.1 | 9 | 0.56 | 8.68 | 7.58 | 162 | 22 | 7.3 | 10.8 | 87 |
| 3 | 36228 | 41.8 | 10 | 0.47 | 8.85 | 7.86 | 192 | 22 | 8.6 | 8.5 | 115 |
| 4 | 36228 | 40.7 | 10 | 0.47 | 8.6 | 7.72 | 181 | 22 | 8.4 | 7.7 | 118 |
| 5 | 36228 | 44.1 | 9 | 0.56 | 8.9 | 7.8 | 171 | 23 | 7.3 | 12.2 | 79 |
| 6 | 36228 | 44.1 | 10 | 0.56 | 10.25 | 8.03 | 227 | 29 | 7.8 | 15.1 | 97 |
| 7 | 36228 | 44.1 | 11 | 0.56 | 11.2 | 8.41 | 270 | 32 | 8.5 | 15 | 103 |
| 8 | 36228 | 44.1 | 9 | 0.56 | 9.4 | 8.38 | 190 | 26 | 7.2 | 15.5 | 70 |
| 9 | 36228 | 44.1 | 9 | 0.56 | 9.1 | 8.01 | 178 | 25 | 7.2 | 13.5 | 80 |
| 10 | 39515 | 44.1 | 9 | 0.56 | 10.35 | 8.43 | 230 | 32 | 7.2 | 20.6 | 93 |
| 11 | 39515 | 44.1 | 8 | 0.57 | 10.25 | 8.76 | 223 | 34 | 6.5 | 30.4 | 69 |
| 12 | 27633 | 37.4 | 8 | 0.57 | 9.69 | 8.76 | 199 | 34 | 5.8 | 36.9 | 50 |
| 13 | 19324 | 31.7 | 8 | 0.57 | 9.69 | 8.76 | 199 | 34 | 5.8 | 44.7 | 41 |
| 14 | 18124 | 40.9 | 9 | 0.4 | 5.68 | 4.73 | 85 | 12 | 7.2 | 5.7 | 228 |
| 15 | 12674 | 34.6 | 9 | 0.4 | 5.68 | 4.73 | 85 | 12 | 7.2 | 6.9 | 205 |
| 16 | 75161 | 47.8 | 10 | 0.4 | 13.98 | 13.4 | 516 | 68 | 7.6 | 43 | 54 |
| 17 | 107480 | 56.4 | 10 | 0.4 | 16.32 | 15.83 | 703 | 95 | 7.4 | 69.1 | 53 |
| 18 | 25247 | 44.9 | 8 | 0.52 | 8.02 | 7.37 | 148 | 24 | 6.1 | 24.2 | 68 |
| 19 | 25288 | 41.7 | 8 | 0.56 | 8.76 | 7.62 | 165 | 26 | 6.4 | 25.4 | 68 |
| 20 | 29198 | 32.5 | 8 | 0.57 | 10.07 | 9.24 | 213 | 30 | 7.1 | 23.4 | 48 |
| 21 | 26169 | 26.3 | 8 | 0.58 | 9.96 | 9.2 | 207 | 34 | 6.2 | 26 | 44 |
| 22 | 23249 | 32.5 | 8 | 0.54 | 9.2 | 8.17 | 190 | 28 | 6.7 | 25.7 | 61 |
| 23 | 29699 | 53.5 | 9 | 0.47 | 8.37 | 7.43 | 172 | 22 | 7.7 | 16.2 | 95 |
| 24 | 20081 | 32.5 | 9 | 0.54 | 9.09 | 8.23 | 184 | 26 | 7.1 | 19.5 | 63 |
| 25 | 27940 | 62.9 | 9 | 0.56 | 8.23 | 7.35 | 145 | 19 | 7.6 | 14.8 | 86 |
| 26 | 24574 | 53.5 | 10 | 0.5 | 9.06 | 8.64 | 194 | 18 | 10.9 | 10.1 | 92 |
| 27 | 28698 | 53.4 | 10 | 0.55 | 9.55 | 8.49 | 201 | 19 | 10.4 | 10.2 | 87 |
| 28 | 22111 | 53.5 | 10 | 0.46 | 7.39 | 7.03 | 136 | 15 | 8.8 | 8.4 | 118 |
| 29 | 24668 | 62.9 | 10 | 0.53 | 8.45 | 7.52 | 162 | 16 | 10.1 | 9.7 | 109 |
| 30 | 25477 | 62.9 | 10 | 0.54 | 7.91 | 7.16 | 139 | 15 | 9.6 | 7.6 | 116 |
| 31 | 26508 | 82 | 10 | 0.57 | 8.16 | 7.23 | 141 | 13 | 10.5 | 8.1 | 118 |
| 32 | 31781 | 62.9 | 10 | 0.43 | 8.21 | 7.73 | 173 | 20 | 8.6 | 11.7 | 99 |
| 33 | 29444 | 34.9 | 8 | 0.46 | 9.13 | 8.61 | 207 | 29 | 7.2 | 22.3 | 67 |
| 34 | 25868 | 40.6 | 8 | 0.52 | 8.11 | 7.35 | 151 | 22 | 6.9 | 17.3 | 76 |
| 35 | 25169 | 51.2 | 9 | 0.44 | 7.6 | 7.43 | 147 | 18 | 8 | 12.5 | 97 |
| 36 | 29459 | 43 | 9 | 0.47 | 9.12 | 8.65 | 202 | 26 | 7.8 | 17.7 | 77 |
| 37 | 30518 | 58.8 | 10 | 0.51 | 9.72 | 8.69 | 219 | 22 | 9.9 | 13.9 | 107 |
| 38 | 25749 | 64.6 | 10 | 0.55 | 9.01 | 7.77 | 177 | 18 | 10 | 11.6 | 123 |
| 39 | 18136 | 40.6 | 10 | 0.54 | 6.89 | 5.8 | 106 | 11 | 9.2 | 4.3 | 178 |
| 40 | 36229 | 40.7 | 9 | 0.4 | 7.95 | 6.62 | 167 | 24 | 7.1 | 11.4 | 163 |
| 41 | 36254 | 40.6 | 10 | 0.4 | 8.53 | 7.19 | 192 | 23 | 8.3 | 8.8 | 155 |
| 42 | 36253 | 40.4 | 10 | 0.4 | 9.03 | 7.71 | 215 | 23 | 9.4 | 8.6 | 171 |
| 43 | 52524 | 40.7 | 9 | 0.54 | 10.46 | 8.59 | 243 | 34 | 7.1 | 16.5 | 84 |
| 44 | 52523 | 41 | 9 | 0.54 | 10.97 | 9.1 | 268 | 34 | 7.8 | 16.6 | 93 |
| 45 | 52525 | 40.1 | 9 | 0.6 | 10.6 | 8.54 | 226 | 36 | 6.3 | 17.7 | 59 |
| 46 | 52561 | 40.7 | 10 | 0.54 | 10.91 | 9 | 265 | 35 | 7.6 | 13.9 | 74 |
| 47 | 52558 | 40.1 | 10 | 0.54 | 12.48 | 10.69 | 347 | 34 | 10.3 | 12.7 | 97 |
| 48 | 52560 | 40.6 | 10 | 0.6 | 11.55 | 9.49 | 268 | 34 | 7.9 | 13.1 | 63 |
| 49 | 52523 | 40.8 | 9 | 0.4 | 9.99 | 8.94 | 263 | 34 | 7.6 | 16.8 | 96 |
| 50 | 52524 | 40.8 | 9 | 0.54 | 10.57 | 9.25 | 249 | 36 | 6.9 | 18.2 | 57 |
| 51 | 52522 | 40.9 | 9 | 0.54 | 11.4 | 10.2 | 289 | 34 | 8.4 | 16.7 | 68 |
| 52 | 52523 | 40.8 | 9 | 0.6 | 11.17 | 9.75 | 251 | 35 | 7.2 | 17.1 | 49 |
| 53 | 52522 | 40.8 | 9 | 0.6 | 12.09 | 10.81 | 294 | 33 | 8.8 | 15.8 | 57 |
| 54 | 52560 | 40.7 | 10 | 0.4 | 10.55 | 9.51 | 294 | 35 | 8.4 | 14 | 84 |
| 55 | 52558 | 39.9 | 10 | 0.4 | 11.82 | 10.98 | 369 | 34 | 10.7 | 13.3 | 97 |
| 56 | 18124 | 40.8 | 9 | 0.6 | 7.06 | 6.71 | 100 | 12 | 8.5 | 5.7 | 88 |
| 57 | 18136 | 39.4 | 10 | 0.54 | 8.26 | 8.27 | 152 | 12 | 12.5 | 4.7 | 96 |
| 58 | 36228 | 40.9 | 9 | 0.4 | 8.32 | 7.9 | 182 | 24 | 7.6 | 11.8 | 86 |
| 59 | 36228 | 41 | 9 | 0.54 | 9.56 | 9.1 | 203 | 24 | 8.4 | 12.1 | 60 |
| 60 | 36228 | 40.2 | 9 | 0.54 | 10.72 | 10.57 | 256 | 24 | 10.8 | 11.4 | 67 |
| 61 | 36230 | 40.1 | 9 | 0.6 | 8.66 | 7.84 | 151 | 27 | 5.6 | 14.4 | 41 |
| 62 | 36253 | 39.8 | 10 | 0.4 | 10.08 | 10.01 | 268 | 24 | 11 | 9.5 | 83 |
| 63 | 52523 | 40.9 | 9 | 0.4 | 10.12 | 9.62 | 270 | 36 | 7.6 | 17.9 | 66 |
| 64 | 29791 | 46.7 | 8 | 0.46 | 8.88 | 8.71 | 194 | 16 | 12.4 | 5.6 | 111 |
| 65 | 38564 | 48.5 | 8 | 0.45 | 7.87 | 7.08 | 156 | 21 | 7.3 | 13 | 108 |
| 66 | 41861 | 39.3 | 10 | 0.45 | 9.07 | 8.25 | 205 | 22 | 9.3 | 6.7 | 117 |
| 67 | 34695 | 40.3 | 9 | 0.45 | 7.51 | 6.66 | 142 | 19 | 7.6 | 7.4 | 113 |
| 68 | 45080 | 40.2 | 9 | 0.54 | 9.14 | 7.57 | 185 | 26 | 7.1 | 11.1 | 83 |
| 69 | 38835 | 42.3 | 8 | 0.53 | 8.55 | 7.78 | 165 | 19 | 8.5 | 9.4 | 92 |
| 70 | 41411 | 39.3 | 8 | 0.51 | 8.69 | 7.62 | 174 | 29 | 6.1 | 17.7 | 75 |
| 71 | 40010 | 44.2 | 9 | 0.54 | 8.53 | 8.29 | 161 | 18 | 8.7 | 6.8 | 70 |
| 72 | 34589 | 40.1 | 8 | 0.55 | 7.86 | 7.06 | 135 | 19 | 7.1 | 9.5 | 77 |
| 73 | 36392 | 45.2 | 10 | 0.48 | 8.02 | 6.74 | 155 | 18 | 8.4 | 6.1 | 138 |
| 74 | 29097 | 46.7 | 9 | 0.56 | 8.03 | 7.36 | 140 | 13 | 10.6 | 5.1 | 124 |
| 75 | 29975 | 47.3 | 10 | 0.45 | 7.56 | 7.08 | 143 | 13 | 10.9 | 4 | 165 |
| 76 | 35983 | 38.4 | 8 | 0.51 | 8.03 | 7.1 | 151 | 21 | 7.4 | 10.3 | 102 |
| 77 | 35202 | 39.2 | 8 | 0.45 | 7.58 | 6.94 | 143 | 26 | 5.6 | 16.8 | 73 |

TABLE 3-continued

| Emb. | $FN_{T/O}$ (lbf) | $OPR_{T/O}$ | $N_{Stg}$ | $R_{HUB,IN}/R_{TIP,IN}$ | $R_{TIP,IN}$ (in) | $R_{TIP,EX}$ (in) | $A_{IN}$ (in²) | $A_{EX}$ (in²) | AR | $HSP_x$ (in²) | $HSP_{AR}$ |
|---|---|---|---|---|---|---|---|---|---|---|---|
| 78 | 28834 | 42.3 | 10 | 0.55 | 7.91 | 6.88 | 138 | 14 | 9.8 | 4.2 | 134 |
| 79 | 38443 | 38.2 | 9 | 0.55 | 8.83 | 8.52 | 171 | 20 | 8.4 | 7.5 | 64 |
| 80 | 27754 | 43.6 | 10 | 0.47 | 7.19 | 6.17 | 126 | 13 | 9.5 | 4.1 | 175 |
| 81 | 27382 | 43.3 | 10 | 0.42 | 7.46 | 6.35 | 144 | 15 | 9.5 | 5.4 | 203 |
| 82 | 34118 | 48.9 | 10 | 0.49 | 7.71 | 6.38 | 142 | 15 | 9.4 | 4.8 | 185 |
| 83 | 41362 | 48.9 | 10 | 0.53 | 8.96 | 7.99 | 182 | 17 | 10.9 | 4.9 | 117 |
| 84 | 33372 | 44.3 | 10 | 0.43 | 7.91 | 6.83 | 160 | 20 | 8 | 7.9 | 148 |
| 85 | 44425 | 43.2 | 9 | 0.43 | 8.17 | 6.96 | 172 | 28 | 6.2 | 13.4 | 100 |
| 86 | 28190 | 45.3 | 10 | 0.41 | 7.78 | 7.46 | 158 | 13 | 12.4 | 3.8 | 182 |
| 87 | 35231 | 47.9 | 10 | 0.53 | 8.98 | 8.12 | 182 | 15 | 12.4 | 4.3 | 127 |
| 88 | 28272 | 44.8 | 10 | 0.49 | 7.3 | 6.66 | 127 | 13 | 9.6 | 4.1 | 138 |
| 89 | 42416 | 48.5 | 10 | 0.41 | 8.43 | 7.63 | 186 | 17 | 10.9 | 4.9 | 149 |
| 90 | 28346 | 40 | 10 | 0.4 | 7.88 | 6.84 | 164 | 15 | 11.1 | 4.5 | 216 |
| 91 | 43315 | 41.3 | 9 | 0.45 | 8.86 | 7.21 | 196 | 27 | 7.3 | 12.5 | 129 |
| 92 | 33540 | 47.8 | 10 | 0.45 | 8.93 | 8.52 | 200 | 14 | 13.9 | 4.3 | 150 |
| 93 | 42603 | 41.4 | 9 | 0.44 | 8.82 | 7.39 | 198 | 26 | 7.6 | 12.1 | 129 |
| 94 | 29583 | 47.6 | 10 | 0.46 | 7.4 | 6.45 | 135 | 13 | 10.7 | 3.8 | 198 |
| 95 | 31357 | 41.7 | 10 | 0.56 | 8.55 | 7.57 | 158 | 15 | 10.2 | 4.7 | 105 |
| 96 | 44345 | 42.4 | 10 | 0.4 | 8.73 | 7.29 | 201 | 23 | 8.9 | 7.2 | 163 |
| 97 | 36178 | 45.9 | 10 | 0.41 | 8.11 | 6.89 | 172 | 17 | 10.3 | 5.2 | 199 |
| 98 | 33158 | 46 | 10 | 0.48 | 8.11 | 7.35 | 158 | 15 | 10.8 | 4.4 | 131 |
| 99 | 32153 | 48.7 | 10 | 0.41 | 6.94 | 6.61 | 125 | 14 | 9 | 4.3 | 138 |
| 100 | 44003 | 48.4 | 8 | 0.44 | 7.93 | 7.37 | 159 | 26 | 6 | 17.6 | 76 |
| 101 | 42640 | 41.3 | 9 | 0.51 | 8.56 | 6.89 | 171 | 27 | 6.3 | 13.1 | 96 |
| 102 | 30510 | 39.3 | 10 | 0.41 | 7.61 | 6.42 | 152 | 16 | 9.6 | 4.7 | 211 |
| 103 | 39341 | 43.8 | 9 | 0.41 | 8.26 | 6.9 | 178 | 22 | 8.1 | 9.7 | 165 |
| 104 | 38354 | 43.6 | 10 | 0.45 | 7.59 | 6.33 | 144 | 19 | 7.4 | 6.3 | 137 |
| 105 | 39061 | 48.7 | 10 | 0.49 | 8.39 | 7.01 | 168 | 16 | 10.6 | 4.6 | 185 |
| 106 | 34146 | 45.3 | 10 | 0.44 | 7.32 | 6.24 | 136 | 16 | 8.6 | 4.9 | 159 |
| 107 | 44129 | 42.1 | 10 | 0.44 | 9.29 | 7.9 | 219 | 25 | 8.9 | 8.5 | 144 |
| 108 | 39281 | 47.1 | 9 | 0.55 | 8.24 | 7.5 | 149 | 17 | 8.9 | 6.1 | 91 |
| 109 | 27391 | 45 | 9 | 0.53 | 7.5 | 7.19 | 126 | 14 | 9.1 | 5.8 | 101 |
| 110 | 36428 | 43.8 | 10 | 0.41 | 8.35 | 7.04 | 182 | 19 | 9.7 | 6.2 | 184 |
| 111 | 45242 | 44.8 | 10 | 0.43 | 7.81 | 6.65 | 156 | 20 | 7.6 | 6.1 | 130 |
| 112 | 31468 | 46.1 | 10 | 0.55 | 7.83 | 6.89 | 135 | 14 | 9.6 | 4.2 | 147 |
| 113 | 44365 | 44.5 | 9 | 0.49 | 8.52 | 6.97 | 174 | 27 | 6.5 | 13.1 | 96 |
| 114 | 40875 | 46.7 | 8 | 0.5 | 8.51 | 7.74 | 171 | 20 | 8.4 | 11 | 94 |
| 115 | 38425 | 40.3 | 9 | 0.4 | 7.62 | 6.8 | 153 | 21 | 7.2 | 8.6 | 118 |
| 116 | 42939 | 44.4 | 8 | 0.44 | 8.37 | 7.6 | 178 | 21 | 8.3 | 10.8 | 114 |
| 117 | 38881 | 46.8 | 9 | 0.48 | 8.96 | 8.52 | 194 | 20 | 9.5 | 9.1 | 93 |
| 118 | 43139 | 43.5 | 10 | 0.43 | 8.39 | 7.28 | 181 | 21 | 8.7 | 6.5 | 132 |
| 119 | 36707 | 40.8 | 8 | 0.45 | 7.54 | 7.18 | 143 | 23 | 6.3 | 13 | 79 |
| 120 | 43047 | 42.7 | 10 | 0.42 | 8.39 | 7.18 | 182 | 23 | 7.9 | 7.7 | 123 |
| 121 | 18124 | 40.9 | 9 | 0.32 | 5.50 | 4.95 | 85 | 12 | 7.2 | 5.7 | 189 |
| 122 | 12674 | 41.6 | 9 | 0.43 | 5.77 | 5.20 | 85 | 12 | 7.2 | 8.2 | 157 |
| 123 | 18124 | 40.9 | 9 | 0.32 | 5.50 | 4.95 | 85 | 12 | 7.2 | 5.7 | 186 |
| 124 | 18125 | 40.3 | 9 | 0.56 | 5.99 | 5.39 | 77 | 12 | 6.2 | 5.1 | 100 |
| 125 | 18124 | 40.8 | 9 | 0.47 | 5.84 | 5.26 | 84 | 12 | 7.1 | 4.6 | 141 |
| 126 | 18124 | 41.0 | 9 | 0.49 | 6.17 | 5.56 | 91 | 11 | 7.9 | 4.4 | 164 |
| 127 | 18137 | 40.6 | 10 | 0.32 | 5.87 | 5.43 | 97 | 12 | 8.4 | 4.4 | 235 |
| 128 | 18136 | 52.7 | 10 | 0.32 | 6.20 | 5.74 | 109 | 12 | 9.4 | 5.7 | 258 |
| 129 | 18137 | 40.6 | 10 | 0.32 | 5.68 | 5.57 | 91 | 12 | 7.9 | 4.4 | 178 |
| 130 | 18124 | 41.1 | 9 | 0.38 | 5.79 | 5.21 | 90 | 12 | 7.6 | 4.7 | 166 |
| 131 | 18124 | 36.9 | 9 | 0.39 | 6.19 | 5.58 | 102 | 12 | 8.8 | 4.1 | 217 |
| 132 | 24574 | 53.5 | 10 | 0.40 | 8.57 | 8.64 | 194 | 18 | 10.9 | 10.1 | 223 |
| 133 | 25169 | 51.2 | 9 | 0.44 | 7.60 | 7.43 | 147 | 18 | 8.0 | 12.5 | 144 |
| 134 | 38011 | 43.0 | 9 | 0.47 | 9.12 | 8.65 | 202 | 26 | 7.8 | 13.7 | 136 |
| 135 | 29699 | 53.5 | 9 | 0.47 | 8.37 | 7.43 | 172 | 22 | 7.7 | 16.2 | 115 |
| 136 | 45593 | 36.1 | 8 | 0.32 | 8.69 | 7.62 | 213 | 29 | 7.5 | 14.8 | 152 |
| 137 | 25477 | 62.9 | 9 | 0.54 | 7.91 | 7.16 | 139 | 15 | 9.6 | 9.4 | 194 |
| 138 | 13600 | 42.1 | 8 | 0.32 | 5.68 | 4.73 | 91 | 12 | 7.7 | 9.8 | 227 |
| 139 | 41411 | 39.3 | 8 | 0.51 | 8.69 | 7.62 | 174 | 29 | 6.1 | 17.7 | 90 |
| 140 | 42603 | 48.7 | 9 | 0.44 | 8.82 | 7.39 | 198 | 26 | 7.6 | 14.2 | 149 |
| 141 | 30229 | 31.8 | 9 | 0.40 | 7.95 | 6.62 | 167 | 24 | 7.1 | 10.7 | 177 |
| 142 | 44695 | 36.1 | 9 | 0.32 | 8.69 | 7.62 | 213 | 29 | 7.5 | 11.9 | 190 |
| 143 | 41695 | 36.1 | 8 | 0.32 | 8.69 | 7.62 | 213 | 29 | 7.5 | 16.2 | 152 |
| 144 | 44695 | 40.7 | 9 | 0.32 | 8.69 | 7.62 | 213 | 29 | 7.5 | 13.5 | 177 |
| 145 | 12000 | 44.1 | 9 | 0.32 | 5.68 | 4.73 | 91 | 12 | 7.7 | 9.2 | 244 |

The embodiments 1 to 145 of TABLE 3 are the same as the embodiments 1 to 145 of TABLES 1 and 2, but TABLE 3 includes parameters in the $HSP_{AR}$ relationship (10) above. The ranges of $FN_{T/O}$, $N2_{R/L}$, $OPR_{T/O}$, $N_{STG}$, $R_{HUB,IN}/R_{TIP,IN}$, $R_{TIP,IN}$, $R_{TIP,EX}$, $A_{IN}$, $A_{EX}$, AR, and $L_{CORE}/D_{CORE}$ are detailed above. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). $A_{IN}$ and $A_{EX}$ are proportional to engine core size. $A_{IN}$ increases to achieve higher HP compressor pressure ratios. AR is indicative of the HP compressor pressure ratio, and, thus, indicative of T25. Accordingly, embodiments 1 to 145 provide for lowering the core size, while accounting for the dynamics margins and overall engine performance.

Figure 15:
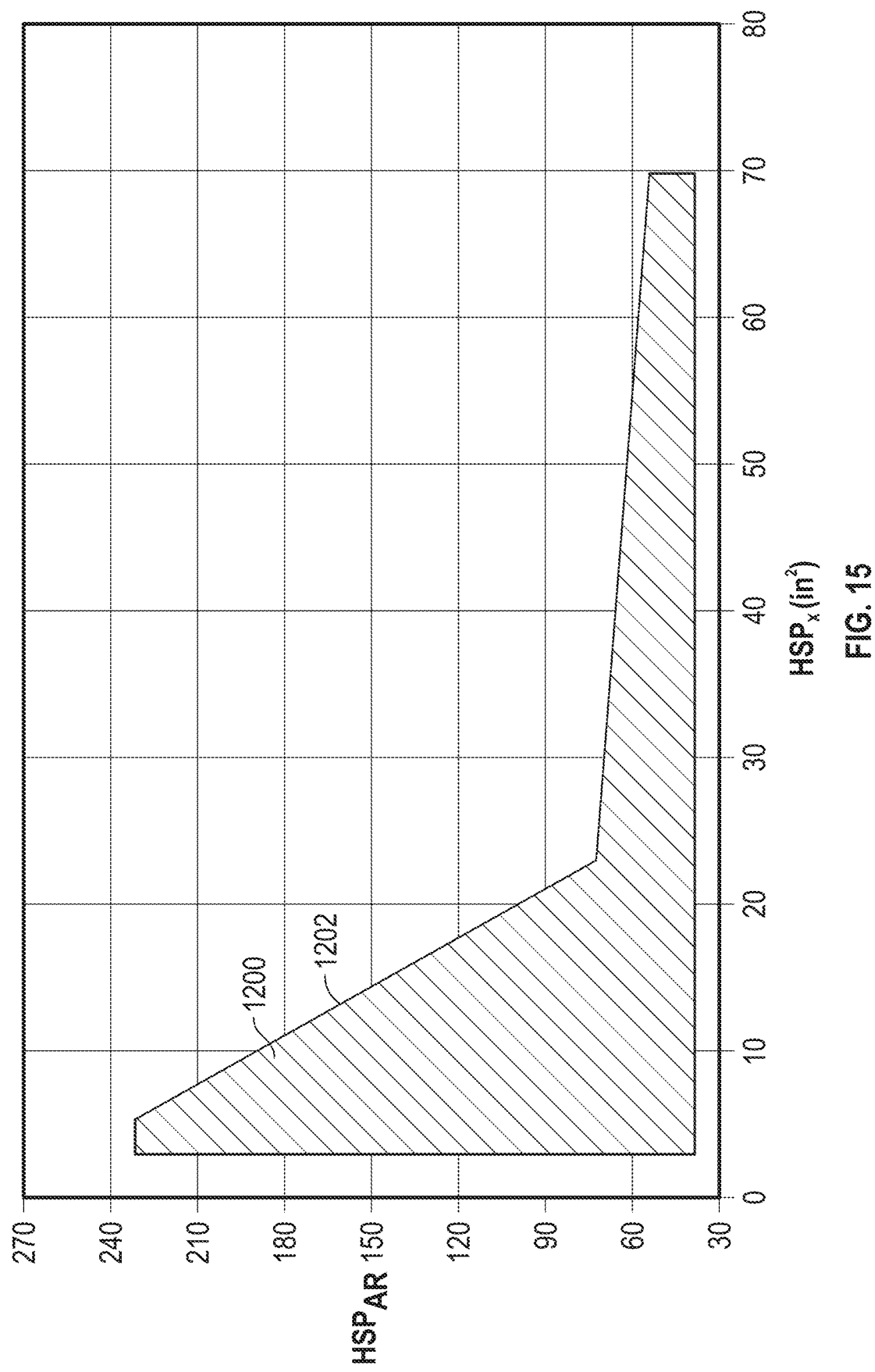
FIG. 15 represents, in graph form, an area ratio high-speed shaft rating ($HSP_{AR}$) as a function of the $HSP_X$.

FIG. 15 represents, in graph form, the $HSP_{AR}$ as a function of the $HSP_X$. $HSP_X$ is given by relationship (8) detailed above. $HSP_{AR}$ is in a range from 41 to 258 and $HSP_X$ is in a range from 3.8 in² to 69.1 in². An area 1200 represents the boundaries of $HSP_{AR}$ and $HSP_X$. $HSP_{AR}$ is given by relationship (10) above. $HSP_{AR}$ and $HSP_X$ are bounded by an upper bound 1202. The upper bound 1002 is given by (23):

$$HSP_{AR} < MAX(280-9*(HSP_X), 82-0.4*(HSP_X)) \quad (23)$$

With reference to TABLE 3 and FIG. 15, in general, $HSP_{AR}$ increases as $HSP_X$ increases, and $HSP_{AR}$ decreases as $HSP_X$ increases. $HSP_X$ increases with increased $A_{EX}$ and/or increases $OPR_{T/O}$, and decreases with increased $FN_{T/O}$. In general, better engine performance, higher BPR, smaller engine core size, higher $L_{CORE}/D_{CORE}$, and higher T25 result in reduced dynamics margins. Higher AR, higher HP compressor pressure ratio, lower T25, and higher inlet corrected flow result in lower $N2_{R/L}$. Increased radius ratio, reduced blade height, reduce HP compressor speeds, and lower HP compressor pressure ratios result in diminishing returns on dynamics margins with poor performance. Accordingly, embodiments 1 to 145 provide for balancing higher AR with increased radius ratios to meet dynamics margins with improved performance of the engine core (and of the overall engine).

The lower the $HSP_{AR}$, the greater the third mode margin and the lower the HP compressor tip radius ratio for improved performance of the HP compressor and the HP turbine. Thus, the $HSP_{AR}$ is selected for providing a balance among improving the third mode margin of the HP shaft, without overly sacrificing performance of the HP compressor and/or the HP turbine.

Figure 16:
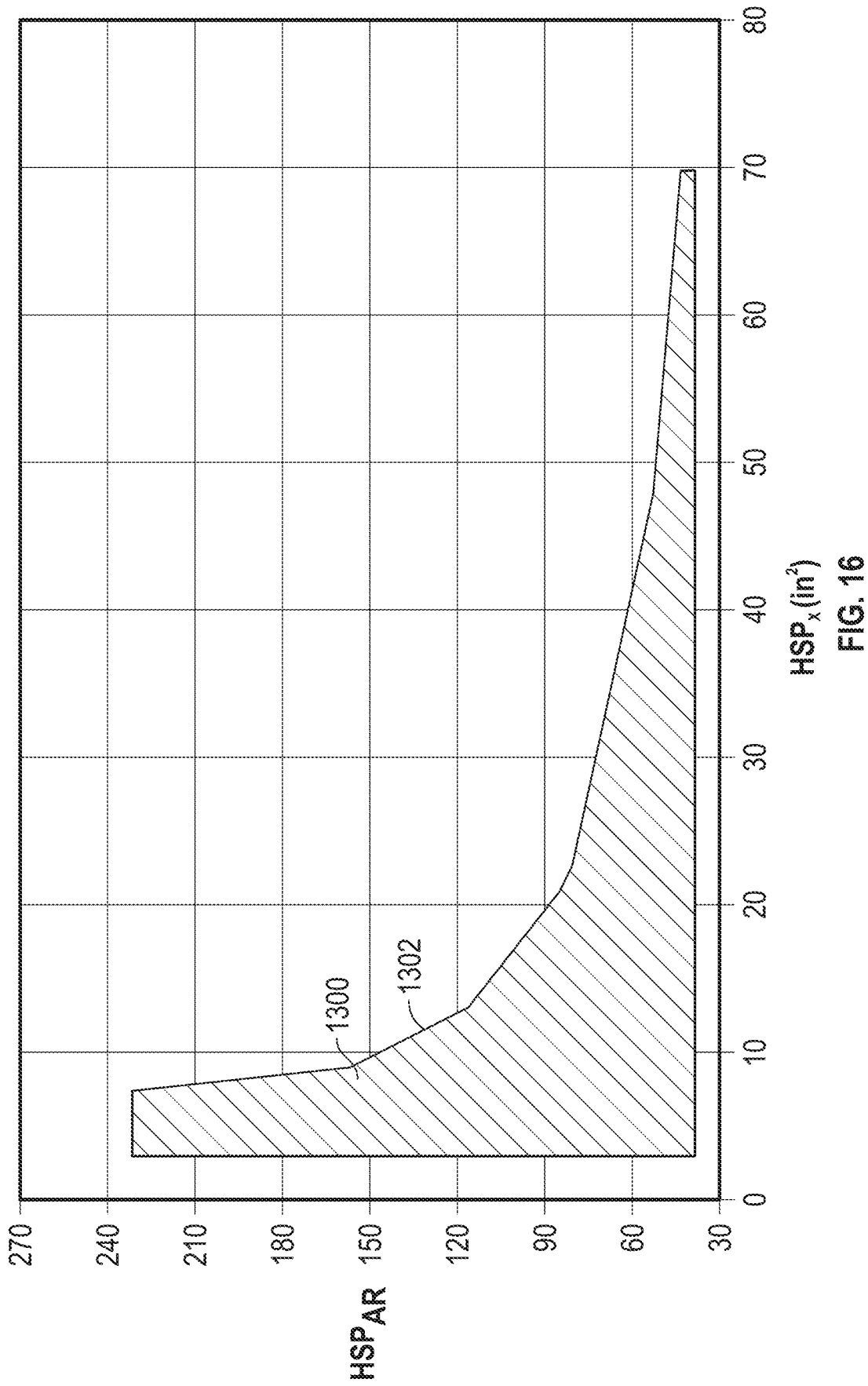
FIG. 16 represents, in graph form, an area ratio high-speed shaft rating ($HSP_{AR}$) as a function of the $HSP_X$, according to another embodiment.

FIG. 16 represents, in graph form, the $HSP_{AR}$ as a function of the $HSP_X$, according to another embodiment. $HSP_X$ is given by relationship (8) detailed above. $HSP_{AR}$ is in a range from 41 to 258 and $HSP_X$ is in a range from 3.8 in² to 69.1 in². An area 1300 represents the boundaries of $HSP_{AR}$ and $HSP_X$. $HSP_{AR}$ is bounded by an upper bound 1302. The upper bound 1302 is given by (24):

$$HSP_{AR} < \frac{350}{(HSP_X - 4)^{0.5}} \quad (24)$$

With reference to TABLE 3 and FIG. 16, in general, $HSP_{AR}$ increases as $HSP_X$ increases, and $HSP_{AR}$ decreases as $HSP_X$ increases, as detailed above. $HSP_X$ increases with increased $A_{EX}$ and/or increases $OPR_{T/O}$, and decreases with increased $FN_{T/O}$, as detailed above.

Figure 17:
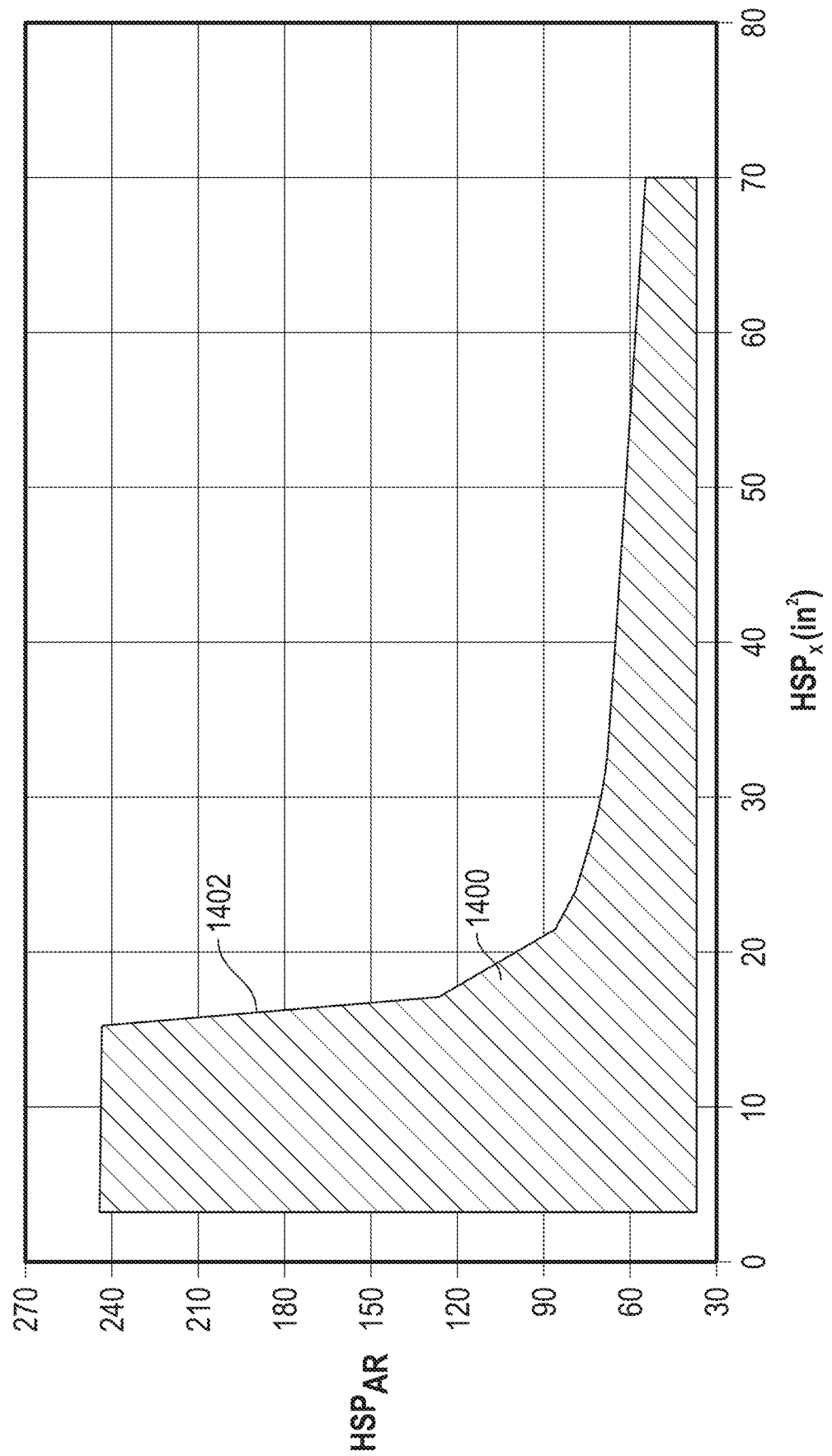
FIG. 17 represents, in graph form, an area ratio high-speed shaft rating ($HSP_{AR}$) as a function of the $HSP_X$, according to another embodiment.

FIG. 17 represents, in graph form, the $HSP_{AR}$ as a function of the $HSP_X$, according to another embodiment. $HSP_X$ is given by relationship (8) detailed above. $HSP_{AR}$ is in a range from 41 to 258 and $HSP_X$ is in a range from 3.8 in² to 69.1 in². An area 1400 represents the boundaries of $HSP_{AR}$ and $HSP_X$. $HSP_{AR}$ and $HSP_X$ are bounded by an upper bound 1402. The upper bound 1402 is given by (25a) and 25(b):

$$HSP_{AR} \leq 258, \text{ for } 3.8 \leq HSP_X \leq 16 \quad (25a)$$

$$HSP_{AR} < 120*(HSP_X - 16)^{-0.2}, \text{ for } HSP_X > 16 \quad (25b)$$

With reference to TABLE 3 and FIG. 17, in general, $HSP_{AR}$ decreases as $HSP_X$ increases, and $HSP_{AR}$ increases as $HSP_X$ decreases, as detailed above. $HSP_X$ increases with increased $A_{EX}$ and/or increases $OPR_{T/O}$, and decreases with increased $FN_{T/O}$, as detailed above. The upper bound 1402 is 258 for values of $HSP_X$ from 3.8 in² to 16 in², and is given by $120*(HSP_X-16)^{-0.2}$ for values of $HSP_X$ from 16 in² to 69.1 in².

In general, the areas 1200, 1300, and 1400 having the upper bounds 1202, 1302, and 1402, respectively, provide for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine, as detailed above.

TABLE 4 lists embodiments of the HP compressor and the HP shaft along with the associated $HSP\_A_{IN}$ values of the HP compressor and the HP shaft. The embodiments inform the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the $HSP\_A_{IN}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 4

| Emb. | $FN_{T/O}$ (lbf) | $N2_{R/L}$ (RPM) | $R_{HUB,IN}/R_{TIP,IN}$ | $R_{TIP,IN}$ (in) | $R_{TIP,EX}$ (in) | $A_{IN}$ (in²) | $A_{EX}$ (in²) | $L_{CORE}/D_{CORE}$ | $HSP_{X1}$ (in²/klbf) | $HSP\_A_{IN}$ (in²) |
|---|---|---|---|---|---|---|---|---|---|---|
| 1 | 35940 | 24788 | 0.47 | 8.35 | 6.9 | 170 | 21 | 3.4 | 0.6 | 3081 |
| 2 | 36228 | 23020 | 0.56 | 8.68 | 7.58 | 162 | 22 | 2.9 | 0.76 | 1927 |
| 3 | 36228 | 22481 | 0.47 | 8.85 | 7.86 | 192 | 22 | 2.9 | 0.62 | 2572 |
| 4 | 36228 | 22417 | 0.47 | 8.6 | 7.72 | 181 | 22 | 3 | 0.6 | 2565 |
| 5 | 36228 | 22246 | 0.56 | 8.9 | 7.8 | 171 | 23 | 2.8 | 0.8 | 1852 |
| 6 | 36228 | 20928 | 0.56 | 10.25 | 8.03 | 227 | 29 | 2.9 | 0.8 | 2828 |

TABLE 4-continued

| Emb. | $FN_{T/O}$ (lbf) | $N2_{R/L}$ (RPM) | $R_{HUB,IN}/R_{TIP,IN}$ | $R_{TIP,IN}$ (in) | $R_{TIP,EX}$ (in) | $A_{IN}$ (in$^2$) | $A_{EX}$ (in$^2$) | $L_{CORE}/D_{CORE}$ | $HSP_{X1}$ (in$^2$/klbf) | $HSP\_A_{IN}$ (in$^2$) |
|---|---|---|---|---|---|---|---|---|---|---|
| 7 | 36228 | 19967 | 0.56 | 11.2 | 8.41 | 270 | 32 | 2.8 | 0.73 | 3288 |
| 8 | 36228 | 21281 | 0.56 | 9.4 | 8.38 | 190 | 26 | 2.6 | 0.9 | 1841 |
| 9 | 36228 | 21695 | 0.56 | 9.1 | 8.01 | 178 | 25 | 2.8 | 0.84 | 1988 |
| 10 | 39515 | 19922 | 0.56 | 10.35 | 8.43 | 230 | 32 | 3 | 1.0 | 2970 |
| 11 | 39515 | 20809 | 0.57 | 10.25 | 8.76 | 223 | 34 | 2.7 | 1.36 | 2369 |
| 12 | 27633 | 20809 | 0.57 | 9.69 | 8.76 | 199 | 34 | 2.5 | 1.95 | 1729 |
| 13 | 19324 | 20809 | 0.57 | 9.69 | 8.76 | 199 | 34 | 2.3 | 2.79 | 1427 |
| 14 | 18124 | 35788 | 0.4 | 5.68 | 4.73 | 85 | 12 | 4.3 | 0.8 | 2683 |
| 15 | 12674 | 35788 | 0.4 | 5.68 | 4.73 | 85 | 12 | 4 | 1.15 | 2406 |
| 16 | 75161 | 12306 | 0.4 | 13.98 | 13.4 | 516 | 68 | 2.1 | 0.9 | 3665 |
| 17 | 107480 | 10580 | 0.4 | 16.32 | 15.83 | 703 | 95 | 2.1 | 0.88 | 5017 |
| 18 | 25247 | 24181 | 0.52 | 8.02 | 7.37 | 148 | 24 | 2.8 | 1.51 | 1645 |
| 19 | 25288 | 23523 | 0.56 | 8.76 | 7.62 | 165 | 26 | 2.7 | 1.6 | 1771 |
| 20 | 29198 | 18378 | 0.57 | 10.07 | 9.24 | 213 | 30 | 2.2 | 1.62 | 1444 |
| 21 | 26169 | 18401 | 0.58 | 9.96 | 9.2 | 207 | 34 | 2.3 | 2 | 1462 |
| 22 | 23249 | 21259 | 0.54 | 9.2 | 8.17 | 190 | 28 | 2.5 | 1.9 | 1726 |
| 23 | 29699 | 23255 | 0.47 | 8.37 | 7.43 | 172 | 22 | 2.8 | 0.92 | 2110 |
| 24 | 20081 | 20398 | 0.54 | 9.09 | 8.23 | 184 | 26 | 2.5 | 1.58 | 1628 |
| 25 | 27940 | 24432 | 0.56 | 8.23 | 7.35 | 145 | 19 | 2.8 | 0.84 | 1642 |
| 26 | 24574 | 19914 | 0.5 | 9.06 | 8.64 | 194 | 18 | 2.4 | 0.72 | 1641 |
| 27 | 28698 | 19790 | 0.55 | 9.55 | 8.49 | 201 | 19 | 2.4 | 0.67 | 1682 |
| 28 | 22111 | 24618 | 0.46 | 7.39 | 7.03 | 136 | 15 | 3 | 0.7 | 1819 |
| 29 | 24668 | 23073 | 0.53 | 8.45 | 7.52 | 162 | 16 | 2.7 | 0.65 | 1757 |
| 30 | 25477 | 24152 | 0.54 | 7.91 | 7.16 | 139 | 15 | 2.9 | 0.57 | 1682 |
| 31 | 26508 | 24437 | 0.57 | 8.16 | 7.23 | 141 | 13 | 2.8 | 0.51 | 1585 |
| 32 | 31781 | 23043 | 0.43 | 8.21 | 7.73 | 173 | 20 | 2.7 | 0.63 | 1981 |
| 33 | 29444 | 20310 | 0.46 | 9.13 | 8.61 | 207 | 29 | 2.5 | 1.52 | 1911 |
| 34 | 25868 | 23662 | 0.52 | 8.11 | 7.35 | 151 | 22 | 2.7 | 1.32 | 1656 |
| 35 | 25169 | 24039 | 0.44 | 7.6 | 7.43 | 147 | 18 | 2.8 | 0.9 | 1784 |
| 36 | 29459 | 20133 | 0.47 | 9.12 | 8.65 | 202 | 26 | 2.6 | 1.08 | 1998 |
| 37 | 30518 | 20410 | 0.51 | 9.72 | 8.69 | 219 | 22 | 2.7 | 0.73 | 2369 |
| 38 | 25749 | 22900 | 0.55 | 9.01 | 7.77 | 177 | 18 | 2.9 | 0.69 | 2191 |
| 39 | 18136 | 28164 | 0.54 | 6.89 | 5.8 | 106 | 11 | 3.6 | 0.63 | 2045 |
| 40 | 36229 | 25626 | 0.4 | 7.95 | 6.62 | 167 | 24 | 3.6 | 0.81 | 3841 |
| 41 | 36254 | 23225 | 0.4 | 8.53 | 7.19 | 192 | 23 | 3.3 | 0.64 | 3582 |
| 42 | 36253 | 21410 | 0.4 | 9.03 | 7.71 | 215 | 23 | 3.3 | 0.63 | 3912 |
| 43 | 52524 | 19521 | 0.54 | 10.46 | 8.59 | 243 | 34 | 2.8 | 0.81 | 2881 |
| 44 | 52523 | 18233 | 0.54 | 10.97 | 9.1 | 268 | 34 | 2.8 | 0.8 | 3166 |
| 45 | 52525 | 19710 | 0.6 | 10.6 | 8.54 | 226 | 36 | 2.6 | 0.84 | 2126 |
| 46 | 52561 | 18510 | 0.54 | 10.91 | 9 | 265 | 35 | 2.6 | 0.66 | 2596 |
| 47 | 52558 | 15207 | 0.54 | 12.48 | 10.69 | 347 | 34 | 2.5 | 0.64 | 3269 |
| 48 | 52560 | 17374 | 0.6 | 11.55 | 9.49 | 268 | 34 | 2.4 | 0.65 | 2161 |
| 49 | 52523 | 20022 | 0.4 | 9.99 | 8.94 | 263 | 34 | 2.7 | 0.81 | 3313 |
| 50 | 52524 | 19304 | 0.54 | 10.57 | 9.25 | 249 | 36 | 2.4 | 0.84 | 2063 |
| 51 | 52522 | 17220 | 0.54 | 11.4 | 10.2 | 289 | 34 | 2.4 | 0.81 | 2318 |
| 52 | 52523 | 18140 | 0.6 | 11.17 | 9.75 | 251 | 35 | 2.2 | 0.82 | 1707 |
| 53 | 52522 | 16123 | 0.6 | 12.09 | 10.81 | 294 | 33 | 2.2 | 0.79 | 1915 |
| 54 | 52560 | 18670 | 0.4 | 10.55 | 9.51 | 294 | 35 | 2.5 | 0.67 | 2953 |
| 55 | 52558 | 15873 | 0.4 | 11.82 | 10.98 | 369 | 34 | 2.3 | 0.66 | 3333 |
| 56 | 18124 | 27161 | 0.6 | 7.06 | 6.71 | 100 | 12 | 2.8 | 0.8 | 1038 |
| 57 | 18136 | 22208 | 0.54 | 8.26 | 8.27 | 152 | 12 | 2.4 | 0.67 | 1167 |
| 58 | 36228 | 24006 | 0.4 | 8.32 | 7.9 | 182 | 24 | 2.6 | 0.82 | 2057 |
| 59 | 36228 | 20495 | 0.54 | 9.56 | 9.1 | 203 | 24 | 2.3 | 0.83 | 1460 |
| 60 | 36228 | 17397 | 0.54 | 10.72 | 10.57 | 256 | 24 | 2.1 | 0.81 | 1584 |
| 61 | 36230 | 24405 | 0.6 | 8.66 | 7.84 | 151 | 27 | 2.3 | 0.91 | 1101 |
| 62 | 36253 | 18478 | 0.4 | 10.08 | 10.01 | 268 | 24 | 2.2 | 0.67 | 2020 |
| 63 | 52523 | 19700 | 0.4 | 10.12 | 9.62 | 270 | 36 | 2.3 | 0.84 | 2367 |
| 64 | 29791 | 20730 | 0.46 | 8.88 | 8.71 | 194 | 16 | 2.5 | 0.53 | 1743 |
| 65 | 38564 | 26513 | 0.45 | 7.87 | 7.08 | 156 | 21 | 3 | 0.86 | 2282 |
| 66 | 41861 | 20516 | 0.45 | 9.07 | 8.25 | 205 | 22 | 2.8 | 0.53 | 2578 |
| 67 | 34695 | 27440 | 0.45 | 7.51 | 6.66 | 142 | 19 | 3.1 | 0.66 | 2115 |
| 68 | 45080 | 22948 | 0.54 | 9.14 | 7.57 | 185 | 26 | 2.8 | 0.72 | 2172 |
| 69 | 38835 | 23902 | 0.53 | 8.55 | 7.78 | 165 | 19 | 2.7 | 0.78 | 1774 |
| 70 | 41411 | 23444 | 0.51 | 8.69 | 7.62 | 174 | 23 | 2.9 | 1.08 | 2137 |
| 71 | 40010 | 22409 | 0.54 | 8.53 | 8.29 | 161 | 18 | 2.4 | 0.57 | 1278 |
| 72 | 34589 | 26430 | 0.55 | 7.86 | 7.06 | 135 | 19 | 2.8 | 0.85 | 1464 |
| 73 | 36392 | 24926 | 0.48 | 8.02 | 6.74 | 155 | 18 | 3.2 | 0.5 | 2529 |
| 74 | 29097 | 24030 | 0.56 | 8.03 | 7.36 | 140 | 13 | 2.9 | 0.56 | 1637 |
| 75 | 29975 | 24497 | 0.45 | 7.56 | 7.08 | 143 | 13 | 3.1 | 0.44 | 2160 |
| 76 | 35983 | 25286 | 0.51 | 8.03 | 7.1 | 151 | 21 | 3 | 0.89 | 2098 |
| 77 | 35202 | 27176 | 0.45 | 7.58 | 6.94 | 143 | 26 | 2.9 | 1.14 | 1879 |
| 78 | 28834 | 24306 | 0.55 | 7.91 | 6.88 | 138 | 14 | 3.1 | 0.49 | 1877 |
| 79 | 38443 | 21613 | 0.55 | 8.83 | 8.52 | 171 | 20 | 2.4 | 0.66 | 1308 |
| 80 | 27754 | 27294 | 0.47 | 7.19 | 6.17 | 126 | 13 | 3.4 | 0.48 | 2321 |
| 81 | 27382 | 26052 | 0.42 | 7.46 | 6.35 | 144 | 15 | 3.6 | 0.56 | 3090 |
| 82 | 34118 | 26029 | 0.49 | 7.71 | 6.38 | 142 | 15 | 3.5 | 0.44 | 2798 |
| 83 | 41362 | 21762 | 0.53 | 8.96 | 7.99 | 182 | 17 | 2.7 | 0.4 | 1953 |

TABLE 4-continued

| Emb. | $FN_{T/O}$ (lbf) | $N2_{R/L}$ (RPM) | $R_{HUB,IN}/R_{TIP,IN}$ | $R_{TIP,IN}$ (in) | $R_{TIP,EX}$ (in) | $A_{IN}$ (in²) | $A_{EX}$ (in²) | $L_{CORE}/D_{CORE}$ | $HSP_{X1}$ (in²/klbf) | $HSP\_A_{IN}$ (in²) |
|---|---|---|---|---|---|---|---|---|---|---|
| 84 | 33372 | 24839 | 0.43 | 7.91 | 6.83 | 160 | 20 | 3.4 | 0.6 | 2966 |
| 85 | 44425 | 25546 | 0.43 | 8.17 | 6.96 | 172 | 28 | 3.1 | 0.77 | 2743 |
| 86 | 28190 | 23396 | 0.41 | 7.78 | 7.46 | 158 | 13 | 3 | 0.45 | 2321 |
| 87 | 35231 | 21419 | 0.53 | 8.98 | 8.12 | 182 | 15 | 2.7 | 0.42 | 1872 |
| 88 | 28272 | 26095 | 0.49 | 7.3 | 6.66 | 127 | 13 | 3.1 | 0.47 | 1829 |
| 89 | 42416 | 23364 | 0.41 | 8.43 | 7.63 | 186 | 17 | 2.9 | 0.4 | 2538 |
| 90 | 28346 | 24653 | 0.4 | 7.88 | 6.84 | 164 | 15 | 3.4 | 0.52 | 3179 |
| 91 | 43315 | 23589 | 0.45 | 8.86 | 7.21 | 196 | 27 | 3.3 | 0.77 | 3472 |
| 92 | 33540 | 20805 | 0.45 | 8.93 | 8.52 | 200 | 14 | 2.7 | 0.43 | 2150 |
| 93 | 42603 | 23344 | 0.44 | 8.82 | 7.39 | 198 | 26 | 3.2 | 0.76 | 3379 |
| 94 | 29583 | 26303 | 0.46 | 7.4 | 6.45 | 135 | 13 | 3.4 | 0.43 | 2515 |
| 95 | 31357 | 23050 | 0.56 | 8.55 | 7.57 | 158 | 15 | 2.7 | 0.49 | 1619 |
| 96 | 44345 | 23094 | 0.4 | 8.73 | 7.29 | 201 | 23 | 3.3 | 0.51 | 3681 |
| 97 | 36178 | 24334 | 0.41 | 8.11 | 6.89 | 172 | 17 | 3.4 | 0.46 | 3319 |
| 98 | 33158 | 24109 | 0.48 | 8.11 | 7.35 | 158 | 15 | 2.8 | 0.44 | 1921 |
| 99 | 32153 | 27525 | 0.41 | 6.94 | 6.61 | 125 | 14 | 3.1 | 0.43 | 1918 |
| 100 | 44003 | 26067 | 0.44 | 7.93 | 7.37 | 159 | 26 | 2.8 | 0.94 | 2012 |
| 101 | 42640 | 24924 | 0.51 | 8.56 | 6.89 | 171 | 27 | 3.1 | 0.79 | 2614 |
| 102 | 30510 | 25797 | 0.41 | 7.61 | 6.42 | 152 | 16 | 3.6 | 0.52 | 3318 |
| 103 | 39341 | 24704 | 0.41 | 8.26 | 6.9 | 178 | 22 | 3.4 | 0.69 | 3614 |
| 104 | 38354 | 26645 | 0.45 | 7.59 | 6.33 | 144 | 19 | 3.4 | 0.51 | 2666 |
| 105 | 39061 | 23578 | 0.49 | 8.39 | 7.01 | 168 | 16 | 3.3 | 0.4 | 2928 |
| 106 | 34146 | 27652 | 0.44 | 7.32 | 6.24 | 136 | 16 | 3.4 | 0.46 | 2507 |
| 107 | 44129 | 21015 | 0.44 | 9.29 | 7.9 | 219 | 25 | 3.1 | 0.56 | 3548 |
| 108 | 39281 | 24454 | 0.55 | 8.24 | 7.5 | 149 | 17 | 2.7 | 0.53 | 1523 |
| 109 | 27391 | 25294 | 0.53 | 7.5 | 7.19 | 126 | 14 | 2.8 | 0.63 | 1410 |
| 110 | 36428 | 24002 | 0.41 | 8.35 | 7.04 | 182 | 19 | 3.3 | 0.51 | 3434 |
| 111 | 45242 | 25956 | 0.43 | 7.81 | 6.65 | 156 | 20 | 3.2 | 0.45 | 2654 |
| 112 | 31468 | 23911 | 0.55 | 7.83 | 6.89 | 135 | 14 | 3.2 | 0.45 | 2063 |
| 113 | 44365 | 24993 | 0.49 | 8.52 | 6.97 | 174 | 27 | 3.1 | 0.75 | 2585 |
| 114 | 40875 | 24106 | 0.5 | 8.51 | 7.74 | 171 | 20 | 2.8 | 0.78 | 1929 |
| 115 | 38425 | 26699 | 0.4 | 7.62 | 6.8 | 153 | 21 | 3.1 | 0.68 | 2503 |
| 116 | 42939 | 24229 | 0.44 | 8.37 | 7.6 | 178 | 21 | 2.9 | 0.78 | 2435 |
| 117 | 38881 | 21483 | 0.48 | 8.96 | 8.52 | 194 | 20 | 2.6 | 0.65 | 1900 |
| 118 | 43139 | 23965 | 0.43 | 8.39 | 7.28 | 181 | 21 | 3 | 0.49 | 2763 |
| 119 | 36707 | 26550 | 0.45 | 7.54 | 7.18 | 143 | 23 | 2.9 | 0.96 | 1793 |
| 120 | 43047 | 24214 | 0.42 | 8.39 | 7.18 | 182 | 23 | 3.1 | 0.53 | 2828 |
| 121 | 18124 | 32209 | 0.32 | 5.50 | 4.95 | 85 | 12 | 3.8 | 0.80 | 2219 |
| 122 | 12674 | 30420 | 0.43 | 5.77 | 5.20 | 85 | 12 | 3.7 | 1.15 | 1841 |
| 123 | 18124 | 32209 | 0.32 | 5.50 | 4.95 | 85 | 12 | 3.7 | 0.80 | 2187 |
| 124 | 18125 | 29302 | 0.56 | 5.99 | 5.39 | 77 | 12 | 3.4 | 0.69 | 1241 |
| 125 | 18124 | 29982 | 0.47 | 5.84 | 5.26 | 84 | 12 | 3.6 | 0.65 | 1648 |
| 126 | 18124 | 28112 | 0.49 | 6.17 | 5.56 | 91 | 11 | 3.7 | 0.63 | 1883 |
| 127 | 18137 | 28852 | 0.32 | 5.87 | 5.43 | 97 | 12 | 3.9 | 0.64 | 2717 |
| 128 | 18136 | 27120 | 0.32 | 6.20 | 5.74 | 109 | 12 | 3.9 | 0.64 | 2977 |
| 129 | 18137 | 28059 | 0.32 | 5.68 | 5.57 | 91 | 12 | 3.6 | 0.64 | 2065 |
| 130 | 18124 | 30335 | 0.38 | 5.79 | 5.21 | 90 | 12 | 3.6 | 0.65 | 1963 |
| 131 | 18124 | 28034 | 0.39 | 6.19 | 5.58 | 102 | 12 | 3.8 | 0.64 | 2535 |
| 132 | 24574 | 19914 | 0.40 | 8.57 | 8.64 | 194 | 18 | 3.6 | 0.72 | 3961 |
| 133 | 25169 | 24039 | 0.44 | 7.60 | 7.43 | 147 | 18 | 3.4 | 0.90 | 2646 |
| 134 | 38011 | 20133 | 0.47 | 9.12 | 8.65 | 202 | 26 | 3.4 | 0.84 | 3506 |
| 135 | 29699 | 23255 | 0.47 | 8.37 | 7.43 | 172 | 22 | 3.1 | 0.92 | 2569 |
| 136 | 45593 | 23344 | 0.32 | 8.69 | 7.62 | 213 | 29 | 3.3 | 0.98 | 4323 |
| 137 | 25477 | 20183 | 0.54 | 7.91 | 7.16 | 139 | 15 | 3.8 | 0.70 | 2815 |
| 138 | 13600 | 28788 | 0.32 | 5.68 | 4.73 | 91 | 12 | 3.9 | 1.35 | 2668 |
| 139 | 41411 | 23444 | 0.51 | 8.69 | 7.62 | 174 | 29 | 3.1 | 1.08 | 2576 |
| 140 | 42603 | 23344 | 0.44 | 8.82 | 7.39 | 198 | 26 | 3.5 | 0.76 | 3890 |
| 141 | 30229 | 25626 | 0.40 | 7.95 | 6.62 | 167 | 24 | 3.8 | 0.97 | 4178 |
| 142 | 44695 | 23344 | 0.32 | 8.69 | 7.62 | 213 | 29 | 3.7 | 0.79 | 5423 |
| 143 | 41695 | 23344 | 0.32 | 8.69 | 7.62 | 213 | 29 | 3.3 | 1.07 | 4323 |
| 144 | 44695 | 23344 | 0.32 | 8.69 | 7.62 | 213 | 29 | 3.5 | 0.79 | 5042 |
| 145 | 12000 | 28788 | 0.32 | 5.68 | 4.73 | 91 | 12 | 4.0 | 1.21 | 2874 |

The embodiments 1 to 145 of TABLE 4 are the same as the embodiments 1 to 145 of TABLES 1 to 3, but TABLE 4 includes parameters in the $HSP\_A_{IN}$ relationship (12) above. The ranges of $FN_{T/O}$, $N2_{R/L}$, $OPR_{T/O}$, $R_{HUB,IN}/R_{TIP,IN}$, $R_{TIP,IN}$, $R_{TIP,EX}$, $R_{HUB,EX}$, $A_{IN}$, $A_{EX}$, and $L_{CORE}/D_{CORE}$ are detailed above. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). $A_{IN}$ and $A_{EX}$ is proportional to the engine core size. $A_{IN}$ is indicative of the HP compressor inlet corrected flow and the HP compressor pressure ratio, and, thus, indicative of T25. Accordingly, embodiments 1 to 145 provide for lowering the core size, while accounting for the dynamics margins and overall engine performance.

Figure 18:
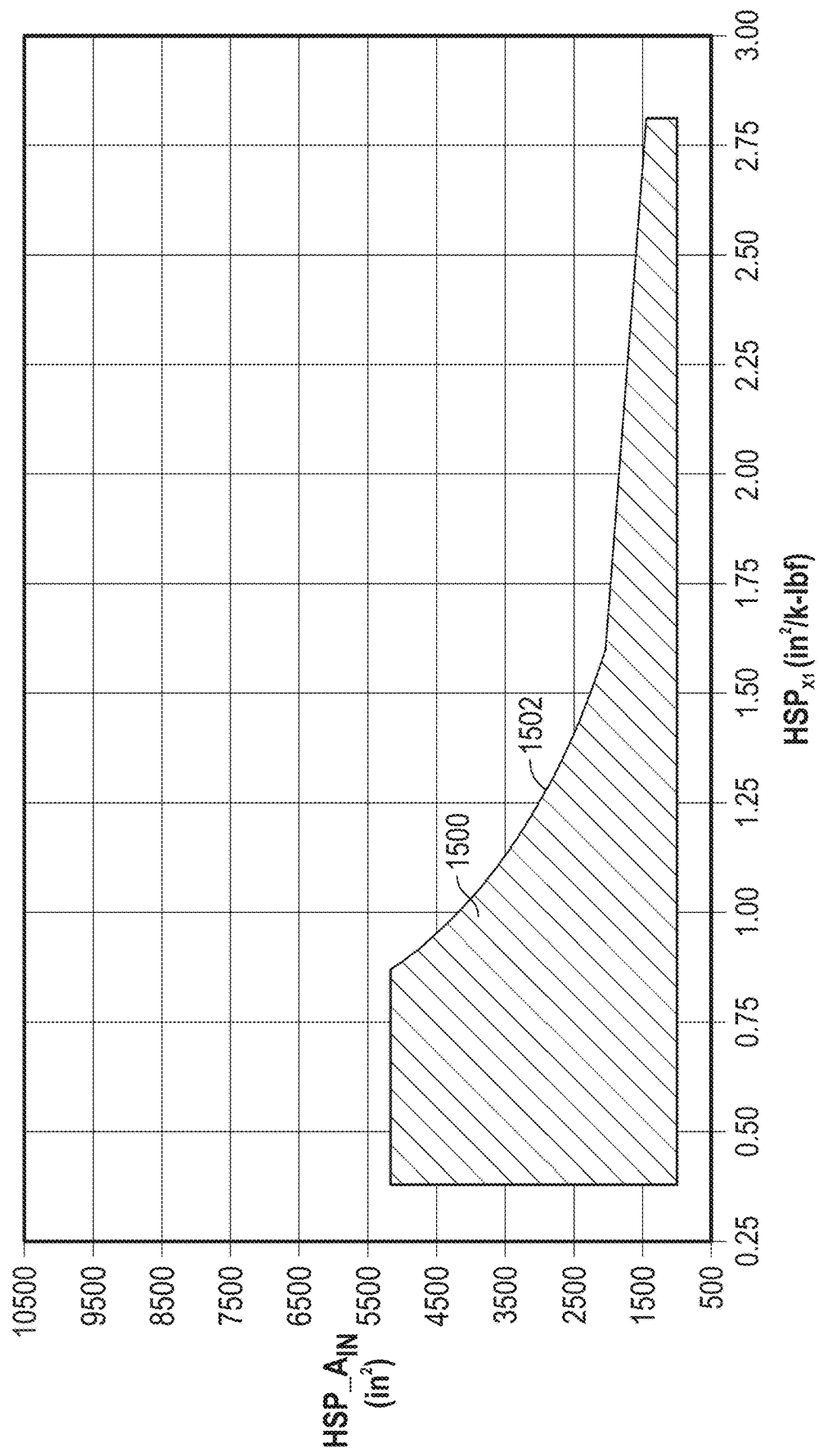
FIG. 18 represents, in graph form, an inlet area high-speed shaft rating ($HSP\_A_{IN}$) as a function of a second high-speed shaft operating parameter ($HSP_{X1}$) as given by relationship (12) detailed below.

FIG. 18 represents, in graph form, the $HSP\_A_{IN}$ as a function of the $HSP_{X1}$. $HSP_{X1}$ is given by relationship (13) detailed above. $HSP\_A_{IN}$ is in a range from 1038 in² to 5423 in², and $HSP_{X1}$ is in a range from 0.4 in²/k-lbf to 2.79 in²/k-lbf. In some embodiments, $HSP\_A_{IN}$ is in a range from 1,420 in² to 3,920 in². An area 1200 represents the boundaries of $HSP\_A_{IN}$ and $HSP_{X1}$. $HSP\_A_{IN}$ and $HSP_{X1}$ are bounded by an upper bound 1202. The upper bound 1202 is given by the relationship (26):

$$HSP_{A_{IN}} < \text{MAX}\left(\frac{4200}{(HSP_{X1})^{1.5}}, 2850 - 500*(HSP_{X1})\right) \quad (26)$$

With reference to TABLE 4 and FIG. 18, in general, $HSP\_A_{IN}$ increases as $HSP_{X1}$ increases, and $HSP\_A_{IN}$ decreases as $HSP_{X1}$ increases. The upper bound 1502 is given by $$\frac{4200}{(HSP_{X1})^{1.5}}$$

for values of $HSP_{X1}$ from 0.4 in²/k-lbf to 1.6 in²/k-lbf, and is given by 2850-500*($HSP_{X1}$) for values of $HSP_X$ from 1.6 in²/k-lbf to 2.79 in²/k-lbf. $HSP_{X1}$ increases with increased $A_{EX}$, and decreases with increased $FN_{T/O}$. In general, better engine performance, higher BPR, smaller engine core size, higher $L_{CORE}/D_{CORE}$, and higher T25 result in reduced dynamics margins. Higher AR, higher HP compressor pressure ratio, lower T25, and higher inlet corrected flow result in lower $N2_{R/L}$. Increased radius ratio, reduced blade height, reduce HP compressor speeds, and lower HP compressor pressure ratios result in diminishing returns on dynamics margins with poor performance. Accordingly, embodiments 1 to 145 provide for balancing higher $A_{IN}$ with increased radius ratios to meet dynamics margins with improved performance of the engine core (and of the overall engine).

The lower the $HSP\_A_{IN}$, the greater the third mode margin and the lower the HP compressor tip radius ratio for improved performance of the HP compressor and the HP turbine. Thus, the $HSP\_A_{IN}$ is selected for providing a balance among improving the third mode margin of the HP shaft, without overly sacrificing performance of the HP compressor and/or the HP turbine.

Accordingly, the area 1500 having the upper bound 1502 provides for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine, as detailed above with respect to FIGS. 9 to 11

TABLE 5 lists embodiments of the HP compressor and HP shaft along with the associated $HSP\_U_{RIM,R/L}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the $HSP\_U_{RIM,R/L}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 5

| Emb. | $N2_{R/L}$ (RPM) | $OPR_{T/O}$ | $T_{IC}$ (°R) | $N_{Stg}$ | AR | $T25_{T/O}$ (°R) | $T3_{T/O}$ (°R) | $HSP_X$ (in²) | $A_{F,IN}$ (in²) | $U_{RIM,R/L}$ (ft/s) | $HSP\_U_{RIM,R/L}$ (in$^{-2/3}$(ft/s/°R)$^{-3}$) |
|---|---|---|---|---|---|---|---|---|---|---|---|
| 1 | 24788 | 49.5 | 0 | 10 | 7.9 | 747 | 1881 | 9.3 | 219 | 1382 | 0.48 |
| 2 | 23020 | 44.1 | 0 | 9 | 7.3 | 745 | 1818 | 10.8 | 236 | 1426 | 0.31 |
| 3 | 22481 | 41.8 | 0 | 10 | 8.6 | 690 | 1788 | 8.5 | 246 | 1450 | 0.26 |
| 4 | 22417 | 40.7 | 0 | 10 | 8.4 | 690 | 1774 | 7.7 | 232 | 1420 | 0.29 |
| 5 | 22246 | 44.1 | 0 | 9 | 7.3 | 745 | 1818 | 12.2 | 249 | 1419 | 0.28 |
| 6 | 20928 | 44.1 | 0 | 10 | 7.8 | 725 | 1818 | 15.1 | 330 | 1357 | 0.29 |
| 7 | 19967 | 44.1 | 0 | 11 | 8.5 | 702 | 1818 | 15 | 394 | 1356 | 0.24 |
| 8 | 21281 | 44.1 | 0 | 9 | 7.2 | 749 | 1818 | 15.5 | 278 | 1460 | 0.23 |
| 9 | 21695 | 44.1 | 0 | 9 | 7.2 | 749 | 1818 | 13.5 | 260 | 1420 | 0.29 |
| 10 | 19922 | 44.1 | 0 | 9 | 7.2 | 748 | 1818 | 20.6 | 337 | 1356 | 0.34 |
| 11 | 20809 | 44.1 | 0 | 8 | 6.5 | 780 | 1818 | 30.4 | 330 | 1473 | 0.25 |
| 12 | 20809 | 37.4 | 0 | 8 | 5.8 | 777 | 1729 | 36.9 | 295 | 1473 | 0.19 |
| 13 | 20809 | 31.7 | 0 | 8 | 5.8 | 740 | 1646 | 44.7 | 295 | 1473 | 0.13 |
| 14 | 35788 | 40.9 | 0 | 9 | 7.2 | 730 | 1776 | 5.7 | 101 | 1347 | 1 |
| 15 | 35788 | 34.6 | 0 | 9 | 7.2 | 695 | 1690 | 6.9 | 101 | 1347 | 0.77 |
| 16 | 12306 | 47.8 | -100 | 10 | 7.6 | 651 | 1614 | 43 | 614 | 1350 | 0.09 |
| 17 | 10580 | 56.4 | -100 | 10 | 7.4 | 696 | 1711 | 69.1 | 837 | 1371 | 0.09 |
| 18 | 24181 | 44.9 | -71 | 8 | 6.1 | 735 | 1667 | 24.2 | 202 | 1441 | 0.25 |
| 19 | 23523 | 41.7 | -3 | 8 | 6.4 | 770 | 1781 | 25.4 | 241 | 1449 | 0.28 |
| 20 | 18378 | 32.5 | -59 | 8 | 7.1 | 629 | 1515 | 23.4 | 319 | 1395 | 0.12 |
| 21 | 18401 | 26.3 | -7 | 8 | 6.2 | 673 | 1539 | 26 | 312 | 1380 | 0.13 |
| 22 | 21259 | 32.5 | -18 | 8 | 6.7 | 684 | 1615 | 25.7 | 266 | 1409 | 0.18 |
| 23 | 23255 | 53.5 | -98 | 9 | 7.7 | 673 | 1680 | 16.2 | 220 | 1408 | 0.25 |
| 24 | 20398 | 32.5 | -6 | 9 | 7.1 | 679 | 1644 | 19.5 | 259 | 1374 | 0.18 |
| 25 | 24432 | 62.9 | -54 | 9 | 7.6 | 760 | 1886 | 14.8 | 213 | 1477 | 0.31 |
| 26 | 19914 | 53.5 | -80 | 10 | 10.9 | 600 | 1698 | 10.1 | 258 | 1443 | 0.15 |
| 27 | 19790 | 53.4 | -66 | 10 | 10.4 | 625 | 1742 | 10.2 | 287 | 1402 | 0.17 |
| 28 | 24618 | 53.5 | -66 | 10 | 8.8 | 668 | 1752 | 8.4 | 171 | 1433 | 0.29 |
| 29 | 23073 | 62.9 | -63 | 10 | 10.1 | 671 | 1848 | 9.7 | 224 | 1444 | 0.26 |
| 30 | 24152 | 62.9 | -70 | 10 | 9.6 | 678 | 1832 | 7.6 | 197 | 1439 | 0.3 |
| 31 | 24437 | 82 | -93 | 10 | 10.5 | 690 | 1929 | 8.1 | 209 | 1478 | 0.3 |
| 32 | 23043 | 62.9 | -60 | 10 | 8.6 | 717 | 1866 | 11.7 | 212 | 1468 | 0.25 |
| 33 | 20310 | 34.9 | -98 | 8 | 7.2 | 598 | 1455 | 22.3 | 262 | 1429 | 0.12 |
| 34 | 23662 | 40.6 | -93 | 8 | 6.9 | 650 | 1551 | 17.3 | 206 | 1416 | 0.21 |
| 35 | 24039 | 51.2 | -98 | 9 | 8 | 654 | 1652 | 12.5 | 182 | 1474 | 0.22 |

TABLE 5-continued

| Emb. | N2$_{R/L}$ (RPM) | OPR$_{T/O}$ | T$_{IC}$ (°R) | N$_{Stg}$ | AR | T25$_{T/O}$ (°R) | T3$_{T/O}$ (°R) | HSP$_X$ (in$^2$) | A$_{F,IN}$ (in$^2$) | U$_{RIM,R/L}$ (ft/s) | HSP$_X$·U$_{RIM,R/L}$ (in$^{-2/3}$(ft/s/°R)$^{-3}$ |
|---|---|---|---|---|---|---|---|---|---|---|---|
| 36 | 20133 | 43 | −58 | 9 | 7.8 | 661 | 1657 | 17.7 | 261 | 1434 | 0.18 |
| 37 | 20410 | 58.8 | −14 | 10 | 9.9 | 711 | 1944 | 13.9 | 297 | 1474 | 0.25 |
| 38 | 22900 | 64.6 | −6 | 10 | 10 | 737 | 2020 | 11.6 | 255 | 1478 | 0.34 |
| 39 | 28164 | 40.6 | 0 | 10 | 9.2 | 665 | 1773 | 4.3 | 149 | 1347 | 0.56 |
| 40 | 25626 | 40.7 | 0 | 9 | 7.1 | 736 | 1774 | 11.4 | 199 | 1348 | 0.58 |
| 41 | 23225 | 40.6 | 0 | 10 | 8.3 | 691 | 1772 | 8.8 | 229 | 1350 | 0.4 |
| 42 | 21410 | 40.4 | 0 | 10 | 9.4 | 660 | 1770 | 8.6 | 256 | 1350 | 0.38 |
| 43 | 19521 | 40.7 | 0 | 9 | 7.1 | 735 | 1774 | 16.5 | 344 | 1350 | 0.28 |
| 44 | 18233 | 41 | 0 | 9 | 7.8 | 709 | 1778 | 16.6 | 378 | 1350 | 0.28 |
| 45 | 19710 | 40.1 | 0 | 9 | 6.3 | 766 | 1766 | 17.7 | 353 | 1350 | 0.23 |
| 46 | 18510 | 40.7 | 0 | 10 | 7.6 | 716 | 1774 | 13.9 | 374 | 1350 | 0.21 |
| 47 | 15207 | 40.1 | 0 | 10 | 10.3 | 636 | 1766 | 12.7 | 489 | 1350 | 0.18 |
| 48 | 17374 | 40.6 | 0 | 10 | 7.9 | 705 | 1773 | 13.1 | 419 | 1350 | 0.17 |
| 49 | 20022 | 40.8 | 0 | 9 | 7.6 | 715 | 1776 | 16.8 | 313 | 1450 | 0.23 |
| 50 | 19304 | 40.8 | 0 | 9 | 6.9 | 742 | 1776 | 18.2 | 351 | 1450 | 0.17 |
| 51 | 17220 | 40.9 | 0 | 9 | 8.4 | 689 | 1777 | 16.7 | 408 | 1450 | 0.15 |
| 52 | 18140 | 40.8 | 0 | 9 | 7.2 | 730 | 1775 | 17.1 | 392 | 1450 | 0.14 |
| 53 | 16123 | 40.8 | 0 | 9 | 8.8 | 678 | 1775 | 15.8 | 459 | 1450 | 0.13 |
| 54 | 18670 | 40.7 | 0 | 10 | 8.4 | 690 | 1774 | 14 | 350 | 1450 | 0.16 |
| 55 | 15873 | 39.9 | 0 | 10 | 10.7 | 627 | 1764 | 13.3 | 439 | 1450 | 0.13 |
| 56 | 27161 | 40.8 | 0 | 9 | 8.5 | 687 | 1776 | 5.7 | 156 | 1523 | 0.26 |
| 57 | 22208 | 39.4 | 0 | 10 | 12.5 | 591 | 1757 | 4.7 | 214 | 1557 | 0.14 |
| 58 | 24006 | 40.9 | 0 | 9 | 7.6 | 717 | 1776 | 11.8 | 217 | 1550 | 0.19 |
| 59 | 20495 | 41 | 0 | 9 | 8.4 | 691 | 1778 | 12.1 | 287 | 1550 | 0.13 |
| 60 | 17397 | 40.2 | 0 | 9 | 10.8 | 627 | 1767 | 11.4 | 361 | 1550 | 0.1 |
| 61 | 24405 | 40.1 | 0 | 9 | 5.6 | 803 | 1766 | 14.4 | 236 | 1550 | 0.14 |
| 62 | 18478 | 39.8 | 0 | 10 | 11 | 620 | 1762 | 9.5 | 319 | 1550 | 0.1 |
| 63 | 19700 | 40.9 | 0 | 9 | 7.6 | 717 | 1778 | 17.9 | 322 | 1550 | 0.13 |
| 64 | 20730 | 46.7 | 0 | 10 | 12.4 | 599 | 1774 | 5.6 | 248 | 1523 | 0.15 |
| 65 | 26513 | 48.5 | 0 | 8 | 7.3 | 739 | 1809 | 13 | 195 | 1523 | 0.34 |
| 66 | 20516 | 39.3 | 0 | 10 | 9.3 | 656 | 1756 | 6.7 | 259 | 1399 | 0.25 |
| 67 | 27440 | 40.3 | −25 | 9 | 7.6 | 714 | 1769 | 7.4 | 177 | 1484 | 0.32 |
| 68 | 22948 | 40.2 | −25 | 9 | 7.1 | 733 | 1768 | 11.1 | 262 | 1401 | 0.27 |
| 69 | 23902 | 42.3 | 0 | 8 | 8.5 | 693 | 1795 | 9.4 | 230 | 1538 | 0.24 |
| 70 | 23444 | 39.3 | 0 | 8 | 6.1 | 771 | 1755 | 17.7 | 237 | 1432 | 0.31 |
| 71 | 22409 | 44.2 | 0 | 9 | 8.7 | 670 | 1753 | 6.8 | 228 | 1550 | 0.15 |
| 72 | 26430 | 40.1 | 0 | 8 | 7.1 | 730 | 1766 | 9.5 | 194 | 1527 | 0.26 |
| 73 | 24926 | 45.2 | 0 | 10 | 8.4 | 685 | 1767 | 6.1 | 202 | 1369 | 0.38 |
| 74 | 24030 | 46.7 | −25 | 9 | 10.6 | 634 | 1779 | 5.1 | 203 | 1482 | 0.27 |
| 75 | 24497 | 47.3 | 0 | 10 | 10.9 | 630 | 1786 | 4 | 180 | 1448 | 0.33 |
| 76 | 25286 | 38.4 | −25 | 8 | 7.4 | 711 | 1743 | 10.3 | 203 | 1461 | 0.34 |
| 77 | 27176 | 39.2 | −25 | 8 | 5.6 | 801 | 1754 | 16.8 | 181 | 1501 | 0.3 |
| 78 | 24306 | 42.3 | −25 | 10 | 9.8 | 633 | 1726 | 4.2 | 197 | 1388 | 0.31 |
| 79 | 21613 | 38.2 | 0 | 9 | 8.4 | 676 | 1740 | 7.5 | 245 | 1534 | 0.14 |
| 80 | 27294 | 43.6 | 0 | 10 | 9.5 | 647 | 1744 | 4.1 | 162 | 1385 | 0.43 |
| 81 | 26052 | 43.3 | −25 | 10 | 9.5 | 646 | 1740 | 5.4 | 175 | 1355 | 0.49 |
| 82 | 26029 | 48.9 | 0 | 10 | 9.4 | 674 | 1808 | 4.8 | 187 | 1360 | 0.52 |
| 83 | 21762 | 48.9 | −25 | 10 | 10.9 | 637 | 1804 | 4.9 | 252 | 1452 | 0.22 |
| 84 | 24839 | 44.3 | −25 | 10 | 8 | 720 | 1820 | 7.9 | 197 | 1376 | 0.45 |
| 85 | 25546 | 43.2 | −25 | 9 | 6.2 | 763 | 1749 | 13.4 | 210 | 1403 | 0.35 |
| 86 | 23396 | 45.3 | −25 | 10 | 12.4 | 593 | 1758 | 3.8 | 190 | 1468 | 0.28 |
| 87 | 21419 | 47.9 | 0 | 10 | 12.4 | 605 | 1789 | 4.3 | 253 | 1463 | 0.21 |
| 88 | 26095 | 44.8 | −25 | 10 | 9.6 | 651 | 1759 | 4.1 | 167 | 1443 | 0.32 |
| 89 | 23364 | 48.5 | −25 | 10 | 10.9 | 635 | 1799 | 4.9 | 223 | 1481 | 0.24 |
| 90 | 24653 | 40 | −25 | 10 | 11.1 | 620 | 1766 | 4.5 | 195 | 1396 | 0.4 |
| 91 | 23589 | 41.3 | −25 | 9 | 7.3 | 731 | 1782 | 12.5 | 247 | 1356 | 0.43 |
| 92 | 20805 | 47.8 | −25 | 10 | 13.9 | 579 | 1784 | 4.3 | 251 | 1497 | 0.19 |
| 93 | 23344 | 41.4 | 0 | 9 | 7.6 | 721 | 1783 | 12.1 | 244 | 1386 | 0.39 |
| 94 | 26303 | 47.6 | 0 | 10 | 10.7 | 637 | 1790 | 3.8 | 172 | 1407 | 0.44 |
| 95 | 23050 | 41.7 | 0 | 10 | 10.2 | 646 | 1787 | 4.7 | 230 | 1456 | 0.22 |
| 96 | 23094 | 42.4 | 0 | 10 | 8.9 | 683 | 1796 | 7.2 | 239 | 1367 | 0.39 |
| 97 | 24334 | 45.9 | −25 | 10 | 10.3 | 637 | 1770 | 5.2 | 206 | 1380 | 0.41 |
| 98 | 24109 | 46 | 0 | 10 | 10.8 | 627 | 1770 | 4.4 | 207 | 1477 | 0.23 |
| 99 | 27525 | 48.7 | 0 | 10 | 9 | 683 | 1806 | 4.3 | 151 | 1505 | 0.31 |
| 100 | 26067 | 48.4 | −25 | 8 | 6 | 801 | 1813 | 17.6 | 197 | 1541 | 0.28 |
| 101 | 24924 | 41.3 | −25 | 9 | 6.3 | 776 | 1782 | 13.1 | 230 | 1354 | 0.4 |
| 102 | 25797 | 39.3 | −25 | 10 | 9.6 | 648 | 1756 | 4.7 | 182 | 1355 | 0.49 |
| 103 | 24704 | 43.8 | −25 | 9 | 8.1 | 688 | 1751 | 9.7 | 214 | 1374 | 0.46 |
| 104 | 26645 | 43.6 | 0 | 10 | 7.4 | 713 | 1750 | 6.3 | 181 | 1355 | 0.43 |
| 105 | 23578 | 48.7 | 0 | 10 | 10.6 | 643 | 1803 | 4.6 | 221 | 1367 | 0.43 |
| 106 | 27652 | 45.3 | −25 | 10 | 8.6 | 680 | 1768 | 4.9 | 168 | 1406 | 0.41 |
| 107 | 21015 | 42.1 | 0 | 10 | 8.9 | 682 | 1793 | 8.5 | 271 | 1354 | 0.35 |
| 108 | 24454 | 47.1 | −25 | 9 | 8.9 | 679 | 1788 | 6.1 | 213 | 1523 | 0.22 |
| 109 | 25294 | 45 | −25 | 9 | 9.1 | 665 | 1763 | 5.8 | 177 | 1517 | 0.25 |
| 110 | 24002 | 43.8 | 0 | 10 | 9.7 | 667 | 1814 | 6.2 | 219 | 1384 | 0.42 |
| 111 | 25956 | 44.8 | −25 | 10 | 7.6 | 710 | 1764 | 6.1 | 191 | 1392 | 0.36 |
| 112 | 23911 | 46.1 | −25 | 10 | 9.6 | 654 | 1774 | 4.2 | 193 | 1368 | 0.4 |

TABLE 5-continued

| Emb. | N2$_{R/L}$ (RPM) | OPR$_{T/O}$ | T$_{IC}$ (°R) | N$_{Stg}$ | AR | T25$_{T/O}$ (°R) | T3$_{T/O}$ (°R) | HSP$_X$ (in$^2$) | A$_{F,IN}$ (in$^2$) | U$_{RIM,R/L}$ (ft/s) | HSP_U$_{RIM,R/L}$ (in$^{-2/3}$(ft/s/°R)$^{-3}$) |
|---|---|---|---|---|---|---|---|---|---|---|---|
| 113 | 24993 | 44.5 | 0 | 9 | 6.5 | 758 | 1764 | 13.1 | 228 | 1379 | 0.36 |
| 114 | 24106 | 46.7 | −25 | 8 | 8.4 | 694 | 1784 | 11 | 228 | 1537 | 0.24 |
| 115 | 26699 | 40.3 | −25 | 9 | 7.2 | 728 | 1769 | 8.6 | 182 | 1463 | 0.34 |
| 116 | 24229 | 44.4 | −25 | 8 | 8.3 | 685 | 1757 | 10.8 | 220 | 1510 | 0.28 |
| 117 | 21483 | 46.8 | −25 | 9 | 9.5 | 662 | 1783 | 9.1 | 252 | 1524 | 0.19 |
| 118 | 23965 | 43.5 | 0 | 10 | 8.7 | 695 | 1810 | 6.5 | 221 | 1423 | 0.32 |
| 119 | 26550 | 40.8 | −25 | 8 | 6.3 | 770 | 1776 | 13 | 179 | 1542 | 0.28 |
| 120 | 24214 | 42.7 | −25 | 10 | 7.9 | 715 | 1799 | 7.7 | 221 | 1404 | 0.32 |
| 121 | 32209 | 40.9 | −100 | 9 | 7.2 | 630 | 1533 | 5.7 | 95 | 1280 | 0.59 |
| 122 | 30420 | 41.6 | −100 | 9 | 7.2 | 634 | 1542 | 8.2 | 105 | 1280 | 0.56 |
| 123 | 32209 | 40.9 | −100 | 9 | 7.2 | 630 | 1533 | 5.7 | 95 | 1280 | 0.58 |
| 124 | 29302 | 40.3 | −100 | 9 | 6.2 | 673 | 1540 | 5.1 | 113 | 1280 | 0.46 |
| 125 | 29982 | 40.8 | −100 | 9 | 7.1 | 634 | 1534 | 4.6 | 107 | 1280 | 0.52 |
| 126 | 28112 | 41.0 | −100 | 9 | 7.9 | 606 | 1527 | 4.4 | 120 | 1280 | 0.53 |
| 127 | 28852 | 40.6 | −100 | 10 | 8.4 | 588 | 1515 | 4.4 | 108 | 1280 | 0.53 |
| 128 | 27120 | 52.7 | −100 | 10 | 9.4 | 614 | 1648 | 5.7 | 121 | 1280 | 0.64 |
| 129 | 28059 | 40.6 | −100 | 10 | 7.9 | 605 | 1522 | 4.4 | 101 | 1280 | 0.46 |
| 130 | 30335 | 41.1 | 100 | 9 | 7.6 | 618 | 1531 | 4.7 | 105 | 1280 | 0.52 |
| 131 | 28034 | 36.9 | −100 | 9 | 8.8 | 559 | 1462 | 4.1 | 121 | 1280 | 0.49 |
| 132 | 19914 | 53.5 | −80 | 10 | 10.9 | 600 | 1698 | 10.1 | 231 | 1443 | 0.34 |
| 133 | 24039 | 51.2 | −98 | 9 | 8.0 | 654 | 1652 | 12.5 | 182 | 1474 | 0.33 |
| 134 | 20133 | 43.0 | −58 | 9 | 7.8 | 661 | 1657 | 13.7 | 261 | 1434 | 0.31 |
| 135 | 23255 | 53.5 | −98 | 9 | 7.7 | 673 | 1680 | 16.2 | 220 | 1408 | 0.30 |
| 136 | 23344 | 36.1 | −50 | 8 | 7.5 | 645 | 1588 | 14.8 | 237 | 1426 | 0.30 |
| 137 | 20183 | 62.9 | −70 | 9 | 9.6 | 678 | 1832 | 9.4 | 197 | 1203 | 0.96 |
| 138 | 28788 | 42.1 | −100 | 8 | 7.7 | 618 | 1543 | 9.8 | 101 | 1084 | 1.17 |
| 139 | 23444 | 39.3 | −80 | 8 | 6.1 | 691 | 1573 | 17.7 | 237 | 1432 | 0.27 |
| 140 | 23344 | 48.7 | −100 | 9 | 7.6 | 657 | 1625 | 14.2 | 244 | 1386 | 0.34 |
| 141 | 25626 | 31.8 | −100 | 9 | 7.1 | 584 | 1407 | 10.7 | 199 | 1348 | 0.31 |
| 142 | 23344 | 36.1 | −100 | 9 | 7.5 | 595 | 1465 | 11.9 | 237 | 1426 | 0.26 |
| 143 | 23344 | 36.1 | −100 | 8 | 7.5 | 595 | 1465 | 16.2 | 237 | 1426 | 0.24 |
| 144 | 23344 | 40.7 | −100 | 9 | 7.5 | 621 | 1528 | 13.5 | 237 | 1426 | 0.28 |
| 145 | 28788 | 44.1 | −100 | 9 | 7.7 | 628 | 1568 | 9.2 | 101 | 1084 | 1.18 |

The embodiments 1 to 145 of TABLE 5 are the same as the embodiments 1 to 145 of TABLES 1 to 4, but TABLE 5 includes parameters in the HSP_U$_{RIM,R/L}$ relationship (14) above. The ranges of N2$_{R/L}$, OPR$_{T/O}$, T$_{IC}$, N$_{STG}$, A$_{IN}$, A$_{EX}$, AR, T25$_{T/O}$, T3$_{T/O}$, L$_{CORE}$/D$_{CORE}$, A$_{F,IN}$, and U$_{RIM,R/L}$ are detailed above. In general, lower FN$_{T/O}$, higher EGT, and/or higher OPR$_{T/O}$ results in lower core size (e.g., lower L$_{CORE}$ and lower D$_{CORE}$), but higher L$_{CORE}$/D$_{CORE}$, higher N2$_{R/L}$, and higher HSR, and, thus, making it more challenging to meet dynamics margins (e.g., Alford stability and/or third mode margin). A$_{IN}$ and A$_{EX}$ is proportional to the engine core size. A$_{IN}$ is indicative of the HP compressor inlet corrected flow and the HP compressor pressure ratio, and, thus, indicative of T25. AR is indictive of the HP compressor pressure ratio (e.g., indicative of T25). U$_{RIM,R/L}$ is indicative of the HP compressor exit hub radius and N2$_{R/L}$. A$_{F,IN}$ and T3$_{T/O}$ are indicative of the HP compressor inlet temperature and the corrected flow. Accordingly, embodiments 1 to 145 provide for lowering the core size, while accounting for the dynamics margins and overall engine performance.

Figure 19:
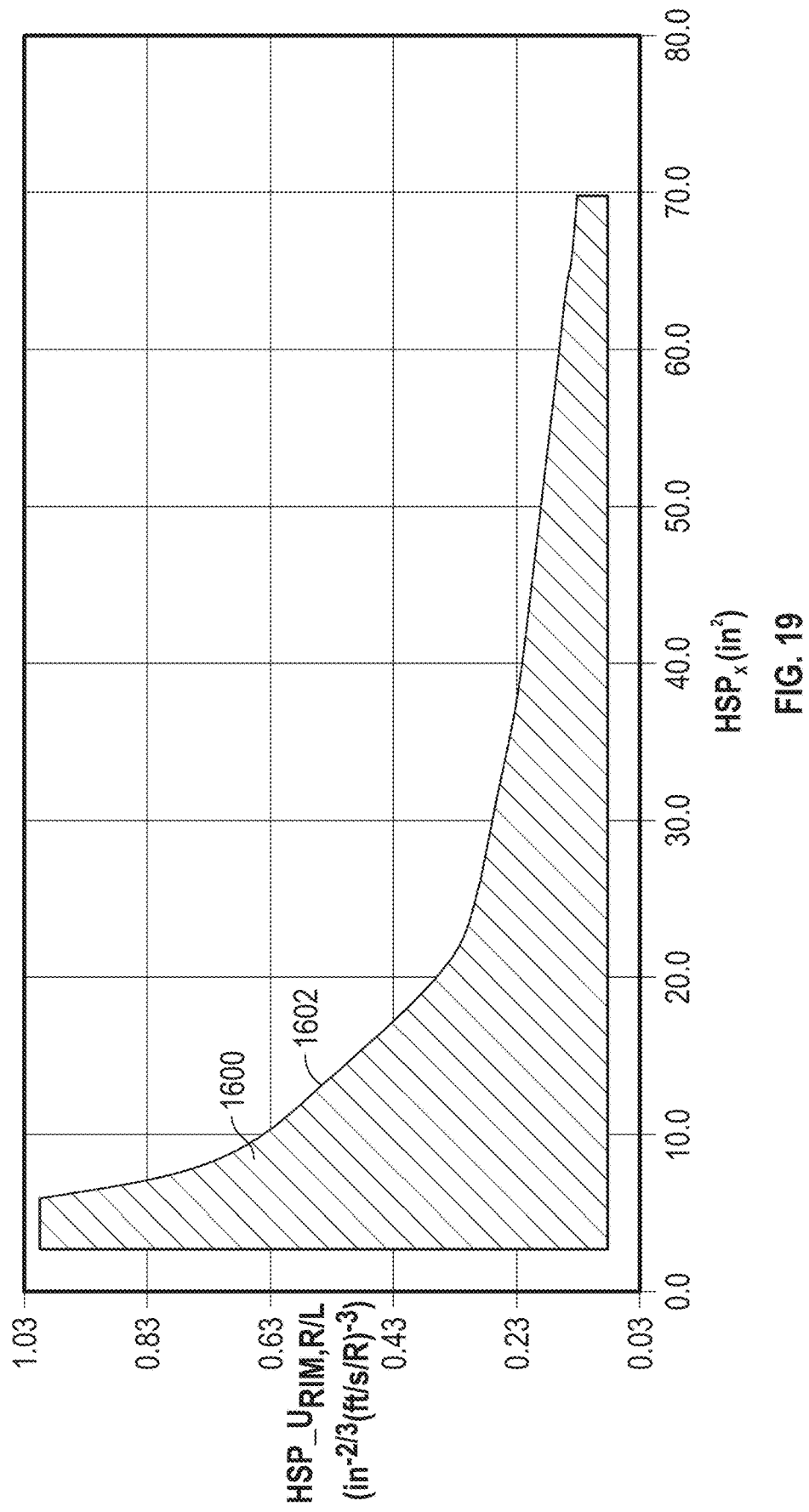
FIG. 19 represents, in graph form, an exit rim speed (at redline speeds) high-speed shaft rating ($HSP\_U_{RIM,R/L}$) as a function of the $HSP_X$.

FIG. 19 represents, in graph form, the HSP_U$_{RIM,R/L}$ as a function of the HSP$_X$. HSP$_X$ is given by relationship (8) detailed above. HSP_U$_{RIM,R/L}$ is in a range from 0.09 in$^{-2/3}$(ft/s/° R)$^{-3}$ to 1.00 in$^{-2/3}$(ft/s/° R)$^{-3}$, and HSP$_X$ is in a range from 3.8 in$^2$ to 69.1 in$^2$. An area 1600 represents the boundaries of HSP_U$_{RIM,R/L}$ and HSP$_X$. HSP_U$_{RIM,R/L}$ and HSP$_X$ are bounded by an upper bound 1302. The upper bound 1602 is given by (27):

$$HSP\_U_{RIM,\frac{R}{L}} < \frac{6.6}{(HSP_X)} \quad (27)$$

With reference to TABLE 5 and FIG. 19, in general, HSP_U$_{RIM,R/L}$ increases as HSP$_X$ increases, and HSP_U$_{RIM,R/L}$ decreases as HSP$_X$ increases. HSP$_X$ increases with increased A$_{EX}$, increased OPR$_{T/O}$, and decreases with increased FN$_{T/O}$. In general, better engine performance, higher BPR, smaller engine core size, higher L$_{CORE}$/D$_{CORE}$, and higher T25 result in reduced dynamics margins. Higher A$_{F,IN}$, greater amount of HP compressor stages, higher HP compressor pressure ratio, lower T25, and higher inlet corrected flow result in lower N2$_{R/L}$. Higher U$_{RIM,R/L}$ and reduced blade height, or increased HP compressor speeds, and lower HP compressor pressure ratios result in improved dynamics margin with marginal performance penalties. Accordingly, embodiments 1 to 145 provide for balancing higher N$_{STG}$ and A$_{F,IN}$ with increased radius ratios to meet dynamics margins with improved performance of the engine core (and of the overall engine).

The lower the HSP_U$_{RIM,R/L}$, the greater the third mode margin and the higher T3 (OPR capability) for performance. Thus, the HSP_U$_{RIM,R/L}$ is selected for providing a balance among improving the third mode margin of the HP shaft, without overly reducing performance of the HP compressor and/or the HP turbine.

Accordingly, the area 1600 having the upper bound 1602 provides for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine, as detailed above with respect to FIGS. 9 to 11.

Figure 20:
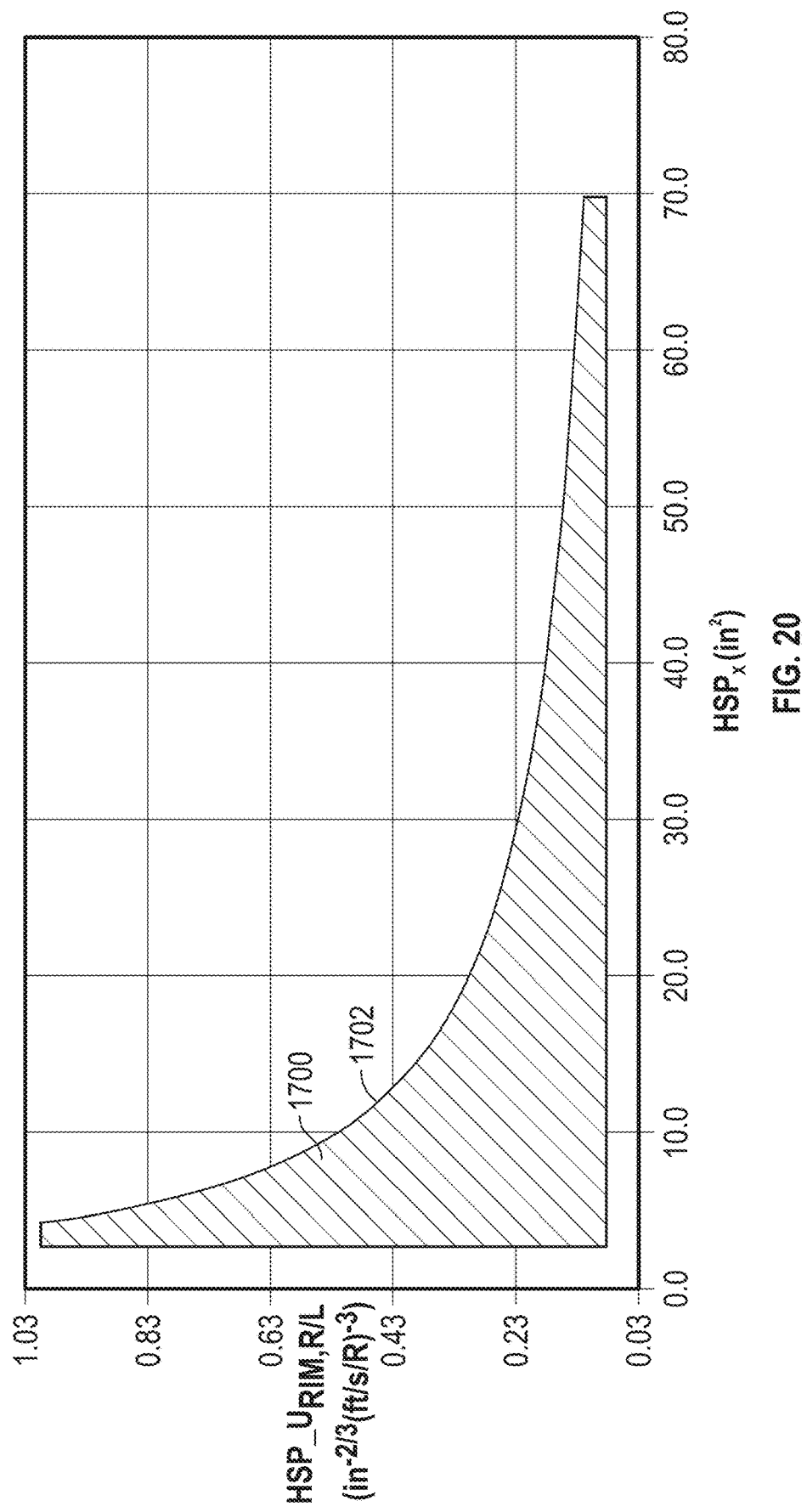
FIG. 20 represents, in graph form, an exit rim speed (at redline speeds) high-speed shaft rating ($HSP\_U_{RIM,R/L}$) as a function of the $HSP_X$, according to another embodiment.

FIG. 20 represents, in graph form, the HSP_$U_{RIM,R/L}$ as a function of the HSP$_X$, according to another embodiment. HSP$_X$ is given by relationship (5) detailed above. HSP_$U_{RIM,R/L}$ is in a range from 0.09 in$^{-2/3}$(ft/s/° R)$^{-3}$ to 1.00 in$^{-2/3}$(ft/s/° R)$^{-3}$, and HSP$_X$ is in a range from 3.8 in$^2$ to 69.1 in$^2$. An area 1700 represents the boundaries of HSP_$U_{RIM,R/L}$ and HSP$_X$. HSP_$U_{RIM,R/L}$ and HSP$_X$ are bounded by an upper bound 1702. The upper bound 1702 is given by (28):

$$HSP_{U_{RIM,\frac{R}{L}}} < \frac{2.9}{HSP_X^{0.75}} \tag{28}$$

With reference to TABLE 5 and FIG. 20, in general, HSP_$U_{RIM,R/L}$ increases as HSP$_X$ increases, and HSP_$U_{RIM,R/L}$ decreases as HSP$_X$ increases, as detailed above. HSP$_X$ increases with increased $A_{EX}$, increased OPR$_{T/O}$, and decreases with increased FN$_{T/O}$, as detailed above.

In general, the area 1700 having the upper bound 1702 provides for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine, as detailed above with respect to FIGS. 9 to 11.

TABLE 6 lists embodiments of the HP compressor and the HP shaft along with the associated HSP$_{RR}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the HSP$_{RR}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 6

| Emb | OPR$_{T/O}$ | T$_{IC}$ (°R) | N$_{Stg}$ | R$_{HUB,IN}$/R$_{TIP,IN}$ | R$_{TIP,IN}$ (in) | R$_{TIP,EX}$ (in) | AR | T25$_{T/O}$ (°R) | HSP$_X$ (in$^2$) | HSP$_{RR}$ |
|---|---|---|---|---|---|---|---|---|---|---|
| 1 | 49.5 | 0 | 10 | 0.47 | 8.35 | 6.9 | 7.9 | 747 | 9.3 | 37.6 |
| 2 | 44.1 | 0 | 9 | 0.56 | 8.68 | 7.58 | 7.3 | 745 | 10.8 | 24.6 |
| 3 | 41.8 | 0 | 10 | 0.47 | 8.85 | 7.86 | 8.6 | 690 | 8.5 | 23.7 |
| 4 | 40.7 | 0 | 10 | 0.47 | 8.6 | 7.72 | 8.4 | 690 | 7.7 | 25 |
| 5 | 44.1 | 0 | 9 | 0.56 | 8.9 | 7.8 | 7.3 | 745 | 12.2 | 22.4 |
| 6 | 44.1 | 0 | 10 | 0.56 | 10.25 | 8.03 | 7.8 | 725 | 15.1 | 24.4 |
| 7 | 44.1 | 0 | 11 | 0.56 | 11.2 | 8.41 | 8.5 | 702 | 15 | 22.3 |
| 8 | 44.1 | 0 | 9 | 0.56 | 9.4 | 8.38 | 7.2 | 749 | 15.5 | 20.3 |
| 9 | 44.1 | 0 | 9 | 0.56 | 9.1 | 8.01 | 7.2 | 749 | 13.5 | 23.3 |
| 10 | 44.1 | 0 | 9 | 0.56 | 10.35 | 8.43 | 7.2 | 748 | 20.6 | 26.8 |
| 11 | 44.1 | 0 | 8 | 0.57 | 10.25 | 8.76 | 6.5 | 780 | 30.4 | 24 |
| 12 | 37.4 | 0 | 8 | 0.57 | 9.69 | 8.76 | 5.8 | 777 | 36.9 | 19.5 |
| 13 | 31.7 | 0 | 8 | 0.57 | 9.69 | 8.76 | 5.8 | 740 | 44.7 | 14.6 |
| 14 | 40.9 | 0 | 9 | 0.4 | 5.68 | 4.73 | 7.2 | 730 | 5.7 | 62.5 |
| 15 | 34.6 | 0 | 9 | 0.4 | 5.68 | 4.73 | 7.2 | 695 | 6.9 | 50.7 |
| 16 | 47.8 | −100 | 10 | 0.4 | 13.98 | 13.4 | 7.6 | 651 | 43 | 11.2 |
| 17 | 56.4 | −100 | 10 | 0.4 | 16.32 | 15.83 | 7.4 | 696 | 69.1 | 12.9 |
| 18 | 44.9 | −71 | 8 | 0.52 | 8.02 | 7.37 | 6.1 | 735 | 24.2 | 22.4 |
| 19 | 41.7 | −3 | 8 | 0.56 | 8.76 | 7.62 | 6.4 | 770 | 25.4 | 23.6 |
| 20 | 32.5 | −59 | 8 | 0.57 | 10.07 | 9.24 | 7.1 | 629 | 23.4 | 9.9 |
| 21 | 26.3 | −7 | 8 | 0.58 | 9.96 | 9.2 | 6.2 | 673 | 26 | 11.9 |
| 22 | 32.5 | −18 | 8 | 0.54 | 9.2 | 8.17 | 6.7 | 684 | 25.7 | 15.8 |
| 23 | 53.5 | −98 | 9 | 0.47 | 8.37 | 7.43 | 7.7 | 673 | 16.2 | 20.6 |
| 24 | 32.5 | −6 | 9 | 0.54 | 9.09 | 8.23 | 7.1 | 679 | 19.5 | 15.1 |
| 25 | 62.9 | −54 | 9 | 0.56 | 8.23 | 7.35 | 7.6 | 760 | 14.8 | 24.4 |
| 26 | 53.5 | −80 | 10 | 0.5 | 9.06 | 8.64 | 10.9 | 600 | 10.1 | 11.3 |
| 27 | 53.4 | −66 | 10 | 0.55 | 9.55 | 8.49 | 10.4 | 625 | 10.2 | 12.1 |
| 28 | 53.5 | −66 | 10 | 0.46 | 7.39 | 7.03 | 8.8 | 668 | 8.4 | 22.2 |
| 29 | 62.9 | −63 | 10 | 0.53 | 8.45 | 7.52 | 10.1 | 671 | 9.7 | 18.2 |
| 30 | 62.9 | −70 | 10 | 0.54 | 7.91 | 7.16 | 9.6 | 678 | 7.6 | 20.7 |
| 31 | 82 | −93 | 10 | 0.57 | 8.16 | 7.23 | 10.5 | 690 | 8.1 | 19.9 |
| 32 | 62.9 | −60 | 10 | 0.43 | 8.21 | 7.73 | 8.6 | 717 | 11.7 | 21.9 |
| 33 | 34.9 | −98 | 8 | 0.46 | 9.13 | 8.61 | 7.2 | 598 | 22.3 | 12.3 |
| 34 | 40.6 | −93 | 8 | 0.52 | 8.11 | 7.35 | 6.9 | 650 | 17.3 | 17.2 |
| 35 | 51.2 | −98 | 9 | 0.44 | 7.6 | 7.43 | 8 | 654 | 12.5 | 19.3 |
| 36 | 43 | −58 | 9 | 0.47 | 9.12 | 8.65 | 7.8 | 661 | 17.7 | 16 |
| 37 | 58.8 | −14 | 10 | 0.51 | 9.72 | 8.69 | 9.9 | 711 | 13.9 | 20.3 |
| 38 | 64.6 | −6 | 10 | 0.55 | 9.01 | 7.77 | 10 | 737 | 11.6 | 24.9 |
| 39 | 40.6 | 0 | 10 | 0.54 | 6.89 | 5.8 | 9.2 | 665 | 4.3 | 31.8 |
| 40 | 40.7 | 0 | 9 | 0.4 | 7.95 | 6.62 | 7.1 | 736 | 11.4 | 46.3 |
| 41 | 40.6 | 0 | 10 | 0.4 | 8.53 | 7.19 | 8.3 | 691 | 8.8 | 33.1 |
| 42 | 40.4 | 0 | 10 | 0.4 | 9.03 | 7.71 | 9.4 | 660 | 8.6 | 29.4 |
| 43 | 40.7 | 0 | 9 | 0.54 | 10.46 | 8.59 | 7.1 | 735 | 16.5 | 23.7 |
| 44 | 41 | 0 | 9 | 0.54 | 10.97 | 9.1 | 7.8 | 709 | 16.6 | 22 |
| 45 | 40.1 | 0 | 9 | 0.6 | 10.6 | 8.54 | 6.3 | 766 | 17.7 | 20.5 |
| 46 | 40.7 | 0 | 10 | 0.54 | 10.91 | 9 | 7.6 | 716 | 13.9 | 18.7 |
| 47 | 40.1 | 0 | 10 | 0.54 | 12.48 | 10.69 | 10.3 | 636 | 12.7 | 14.2 |
| 48 | 40.6 | 0 | 10 | 0.6 | 11.55 | 9.49 | 7.9 | 705 | 13.1 | 14.9 |
| 49 | 40.8 | 0 | 9 | 0.4 | 9.99 | 8.94 | 7.6 | 715 | 16.8 | 23.9 |

TABLE 6-continued

| Emb | $OPR_{T/O}$ | $T_{IC}$ (°R) | $N_{Stg}$ | $R_{HUB,IN}/R_{TIP,IN}$ | $R_{TIP,IN}$ (in) | $R_{TIP,EX}$ (in) | AR | $T25_{T/O}$ (°R) | $HSP_X$ (in²) | $HSP_{RR}$ |
|---|---|---|---|---|---|---|---|---|---|---|
| 50 | 40.8 | 0 | 9 | 0.54 | 10.57 | 9.25 | 6.9 | 742 | 18.2 | 17 |
| 51 | 40.9 | 0 | 9 | 0.54 | 11.4 | 10.2 | 8.4 | 689 | 16.7 | 14.1 |
| 52 | 40.8 | 0 | 9 | 0.6 | 11.17 | 9.75 | 7.2 | 730 | 17.1 | 13.5 |
| 53 | 40.8 | 0 | 9 | 0.6 | 12.09 | 10.81 | 8.8 | 678 | 15.8 | 11.1 |
| 54 | 40.7 | 0 | 10 | 0.4 | 10.55 | 9.51 | 8.4 | 690 | 14 | 17.8 |
| 55 | 39.9 | 0 | 10 | 0.4 | 11.82 | 10.98 | 10.7 | 627 | 13.3 | 13.2 |
| 56 | 40.8 | 0 | 9 | 0.6 | 7.06 | 6.71 | 8.5 | 687 | 5.7 | 18.2 |
| 57 | 39.4 | 0 | 10 | 0.54 | 8.26 | 8.27 | 12.5 | 59. | 4.7 | 10 |
| 58 | 40.9 | 0 | 9 | 0.4 | 8.32 | 7.9 | 7.6 | 717 | 11.8 | 21.5 |
| 59 | 41 | 0 | 9 | 0.54 | 9.56 | 9.1 | 8.4 | 691 | 12.1 | 12.7 |
| 60 | 40.2 | 0 | 9 | 0.54 | 10.72 | 10.57 | 10.8 | 627 | 11.4 | 9.1 |
| 61 | 40.1 | 0 | 9 | 0.6 | 8.66 | 7.84 | 5.6 | 803 | 14.4 | 17.5 |
| 62 | 39.8 | 0 | 10 | 0.4 | 10.08 | 10.01 | 11 | 620 | 9.5 | 10.8 |
| 63 | 40.9 | 0 | 9 | 0.4 | 10.12 | 9.62 | 7.6 | 717 | 17.9 | 16.7 |
| 64 | 46.7 | 0 | 10 | 0.46 | 8.88 | 8.71 | 12.4 | 599 | 5.6 | 12 |
| 65 | 48.5 | 0 | 8 | 0.45 | 7.87 | 7.08 | 7.3 | 739 | 13 | 29.7 |
| 66 | 39.3 | 0 | 10 | 0.45 | 9.07 | 8.25 | 9.3 | 656 | 6.7 | 20.1 |
| 67 | 40.3 | −25 | 9 | 0.45 | 7.51 | 6.66 | 7.6 | 714 | 7.4 | 28.3 |
| 68 | 40.2 | −25 | 9 | 0.54 | 9.14 | 7.57 | 7.1 | 733 | 11.1 | 23.5 |
| 69 | 42.3 | 0 | 8 | 0.53 | 8.55 | 7.78 | 8.5 | 693 | 9.4 | 19.2 |
| 70 | 39.3 | 0 | 8 | 0.51 | 8.69 | 7.62 | 6.1 | 771 | 17.7 | 27.1 |
| 71 | 44.2 | 0 | 9 | 0.54 | 8.53 | 8.29 | 8.7 | 670 | 6.8 | 13.3 |
| 72 | 40.1 | 0 | 8 | 0.55 | 7.86 | 7.06 | 7.1 | 730 | 9.5 | 21.5 |
| 73 | 45.2 | 0 | 10 | 0.48 | 8.02 | 6.74 | 8.4 | 685 | 6.1 | 28.5 |
| 74 | 46.7 | −25 | 9 | 0.56 | 8.03 | 7.36 | 10.6 | 634 | 5.1 | 17.5 |
| 75 | 47.3 | 0 | 10 | 0.45 | 7.56 | 7.08 | 10.9 | 630 | 4 | 22.3 |
| 76 | 38.4 | −25 | 8 | 0.51 | 8.03 | 7.1 | 7.4 | 711 | 10.3 | 26.1 |
| 77 | 39.2 | −25 | 8 | 0.45 | 7.58 | 6.94 | 5.6 | 801 | 16.8 | 31.2 |
| 78 | 42.3 | −25 | 10 | 0.55 | 7.91 | 6.88 | 9.8 | 633 | 4.2 | 20.4 |
| 79 | 38.2 | 0 | 9 | 0.55 | 8.83 | 8.52 | 8.4 | 676 | 7.5 | 13 |
| 80 | 43.6 | 0 | 10 | 0.47 | 7.19 | 6.17 | 9.5 | 647 | 4.1 | 28.8 |
| 81 | 43.3 | −25 | 10 | 0.42 | 7.46 | 6.35 | 9.5 | 646 | 5.4 | 33.3 |
| 82 | 48.9 | 0 | 10 | 0.49 | 7.71 | 6.38 | 9.4 | 674 | 4.8 | 33.3 |
| 83 | 48.9 | −25 | 10 | 0.53 | 8.96 | 7.99 | 10.9 | 637 | 4.9 | 16.2 |
| 84 | 44.3 | −25 | 10 | 0.43 | 7.91 | 6.83 | 8 | 720 | 7.9 | 35.8 |
| 85 | 43.2 | −25 | 9 | 0.43 | 8.17 | 6.96 | 6.2 | 763 | 13.4 | 34.6 |
| 86 | 45.3 | −25 | 10 | 0.41 | 7.78 | 7.46 | 12.4 | 593 | 3.8 | 19.2 |
| 87 | 47.9 | 0 | 10 | 0.53 | 8.98 | 8.12 | 12.4 | 605 | 4.3 | 14 |
| 88 | 44.8 | −25 | 10 | 0.49 | 7.3 | 6.66 | 9.6 | 651 | 4.1 | 22.7 |
| 89 | 48.5 | −25 | 10 | 0.41 | 8.43 | 7.63 | 10.9 | 635 | 4.9 | 20.4 |
| 90 | 40 | −25 | 10 | 0.4 | 7.88 | 6.84 | 11.1 | 620 | 4.5 | 27.8 |
| 91 | 41.3 | −25 | 9 | 0.45 | 8.86 | 7.21 | 7.3 | 731 | 12.5 | 35.3 |
| 92 | 47.8 | −25 | 10 | 0.45 | 8.93 | 8.52 | 13.9 | 579 | 4.3 | 13.4 |
| 93 | 41.4 | 0 | 9 | 0.44 | 8.82 | 7.39 | 7.6 | 721 | 12.1 | 33 |
| 94 | 47.6 | 0 | 10 | 0.46 | 7.4 | 6.45 | 10.7 | 637 | 3.8 | 28.1 |
| 95 | 41.7 | −25 | 10 | 0.56 | 8.55 | 7.57 | 10.2 | 646 | 4.7 | 15.9 |
| 96 | 42.4 | 0 | 10 | 0.4 | 8.73 | 7.29 | 8.9 | 683 | 7.2 | 31.8 |
| 97 | 45.9 | −25 | 10 | 0.41 | 8.11 | 6.89 | 10.3 | 637 | 5.2 | 29.2 |
| 98 | 46 | 0 | 10 | 0.48 | 8.11 | 7.35 | 10.8 | 627 | 4.4 | 17.7 |
| 99 | 48.7 | 0 | 10 | 0.41 | 6.94 | 6.61 | 9 | 683 | 4.3 | 26.5 |
| 100 | 48.4 | −25 | 8 | 0.44 | 7.93 | 7.37 | 6 | 801 | 17.6 | 30.1 |
| 101 | 41.3 | −25 | 9 | 0.51 | 8.56 | 6.89 | 6.3 | 776 | 13.1 | 34.2 |
| 102 | 39.3 | −25 | 10 | 0.41 | 7.61 | 6.42 | 9.6 | 648 | 4.7 | 34.2 |
| 103 | 43.8 | −25 | 9 | 0.41 | 8.26 | 6.9 | 8.1 | 688 | 9.7 | 35.7 |
| 104 | 43.6 | 0 | 10 | 0.45 | 7.59 | 6.33 | 7.4 | 713 | 6.3 | 35 |
| 105 | 48.7 | 0 | 10 | 0.49 | 8.39 | 7.01 | 10.6 | 643 | 4.6 | 26.9 |
| 106 | 45.3 | −25 | 10 | 0.44 | 7.32 | 6.24 | 8.6 | 680 | 4.9 | 31.7 |
| 107 | 42.1 | −25 | 10 | 0.44 | 9.29 | 7.9 | 8.9 | 682 | 8.5 | 28 |
| 108 | 47.1 | −25 | 9 | 0.55 | 8.24 | 7.5 | 8.9 | 679 | 6.1 | 17.5 |
| 109 | 45 | −25 | 9 | 0.53 | 7.5 | 7.19 | 9.1 | 665 | 5.8 | 18.4 |
| 110 | 43.8 | 0 | 10 | 0.41 | 8.35 | 7.04 | 9.7 | 667 | 6.2 | 31.3 |
| 111 | 44.8 | −25 | 10 | 0.43 | 7.81 | 6.65 | 7.6 | 710 | 6.1 | 31.9 |
| 112 | 46.1 | −25 | 10 | 0.55 | 7.83 | 6.89 | 9.6 | 654 | 4.2 | 24.3 |
| 113 | 44.5 | 0 | 9 | 0.49 | 8.52 | 6.97 | 6.5 | 758 | 13.1 | 31.7 |
| 114 | 46.7 | −25 | 8 | 0.5 | 8.51 | 7.74 | 8.4 | 694 | 11 | 20.2 |
| 115 | 40.3 | −25 | 9 | 0.4 | 7.62 | 6.8 | 7.2 | 728 | 8.6 | 32.2 |
| 116 | 44.4 | −25 | 8 | 0.44 | 8.37 | 7.6 | 8.3 | 685 | 10.8 | 23.9 |
| 117 | 46.8 | −25 | 9 | 0.48 | 8.96 | 8.52 | 9.5 | 662 | 9.1 | 15.9 |
| 118 | 43.5 | 0 | 10 | 0.43 | 8.39 | 7.28 | 8.7 | 695 | 6.5 | 27.4 |
| 119 | 40.8 | −25 | 8 | 0.45 | 7.54 | 7.18 | 6.3 | 770 | 13 | 27.6 |
| 120 | 42.7 | −25 | 10 | 0.42 | 8.39 | 7.18 | 7.9 | 715 | 7.7 | 29.5 |
| 121 | 40.9 | −100 | 9 | 0.32 | 5.50 | 4.95 | 7.2 | 630 | 5.7 | 38.5 |
| 122 | 41.6 | −100 | 9 | 0.43 | 5.77 | 5.20 | 7.2 | 634 | 8.2 | 32.3 |
| 123 | 40.9 | −100 | 9 | 0.32 | 5.50 | 4.95 | 7.2 | 630 | 5.7 | 37.9 |
| 124 | 40.3 | −100 | 9 | 0.56 | 5.99 | 5.39 | 6.2 | 673 | 5.1 | 32.36 |
| 125 | 40.8 | −100 | 9 | 0.47 | 5.84 | 5.26 | 7.1 | 634 | 4.6 | 34.86 |
| 126 | 41.0 | −100 | 9 | 0.49 | 6.17 | 5.56 | 7.9 | 606 | 4.4 | 33.36 |

TABLE 6-continued

| Emb | OPR$_{T/O}$ | T$_{IC}$ (°R) | N$_{Stg}$ | R$_{HUB,IN}$/R$_{TIP,IN}$ | R$_{TIP,IN}$ (in) | R$_{TIP,EX}$ (in) | AR | T25$_{T/O}$ (°R) | HSP$_X$ (in$^2$) | HSP$_{RR}$ |
|---|---|---|---|---|---|---|---|---|---|---|
| 127 | 40.6 | −100 | 10 | 0.32 | 5.87 | 5.43 | 8.4 | 588 | 4.4 | 35.9 |
| 128 | 52.7 | −100 | 10 | 0.32 | 6.20 | 5.74 | 9.4 | 614 | 5.7 | 38.4 |
| 129 | 40.6 | −100 | 10 | 0.32 | 5.68 | 5.57 | 7.9 | 605 | 4.4 | 36.46 |
| 130 | 41.1 | −100 | 9 | 0.38 | 5.79 | 5.21 | 7.6 | 618 | 4.7 | 36.61 |
| 131 | 36.9 | −100 | 9 | 0.39 | 6.19 | 5.58 | 8.8 | 559 | 4.1 | 33.85 |
| 132 | 53.5 | −80 | 10 | 0.40 | 8.57 | 8.64 | 10.9 | 600 | 10.1 | 27.3 |
| 133 | 51.2 | −98 | 9 | 0.44 | 7.60 | 7.43 | 8.0 | 654 | 12.5 | 28.6 |
| 134 | 43.0 | −58 | 9 | 0.47 | 9.12 | 8.65 | 7.8 | 661 | 13.7 | 28.1 |
| 135 | 53.5 | −98 | 9 | 0.47 | 8.37 | 7.43 | 7.7 | 673 | 16.2 | 25.1 |
| 136 | 36.1 | −50 | 8 | 0.32 | 8.69 | 7.62 | 7.5 | 645 | 14.8 | 31.4 |
| 137 | 62.9 | −70 | 9 | 0.54 | 7.91 | 7.16 | 9.6 | 678 | 9.4 | 34.7 |
| 138 | 42.1 | −100 | 8 | 0.32 | 5.68 | 4.73 | 7.7 | 618 | 9.8 | 41.7 |
| 139 | 39.3 | −80 | 8 | 0.51 | 8.69 | 7.62 | 6.1 | 691 | 17.7 | 26.3 |
| 140 | 48.7 | −100 | 9 | 0.44 | 8.82 | 7.39 | 7.6 | 657 | 14.2 | 31.5 |
| 141 | 31.8 | −100 | 9 | 0.40 | 7.95 | 6.62 | 7.1 | 584 | 10.7 | 31.7 |
| 142 | 36.1 | −100 | 9 | 0.32 | 8.69 | 7.62 | 7.5 | 595 | 11.9 | 33.5 |
| 143 | 36.1 | −100 | 8 | 0.32 | 8.69 | 7.62 | 7.5 | 595 | 16.2 | 26.7 |
| 144 | 40.7 | −100 | 9 | 0.32 | 8.69 | 7.62 | 7.5 | 621 | 13.5 | 33.9 |
| 145 | 44.1 | −100 | 9 | 0.32 | 5.68 | 4.73 | 7.7 | 628 | 9.2 | 46.4 |

The embodiments 1 to 145 of TABLE 6 are the same as the embodiments 1 to 145 of TABLES 1 to 5, but TABLE 6 includes parameters in the HSP$_{RR}$ relationship (19) above. The ranges of OPR$_{T/O}$, T$_{IC}$, R$_{HUB,IN}$/R$_{TIP,IN}$, R$_{TIP,IN}$, R$_{HUB,EX}$, A$_{IN}$, A$_{EX}$, AR, T25$_{T/O}$, and L$_{CORE}$/D$_{CORE}$ are detailed above. In general, lower FN$_{T/O}$, higher EGT, and/or higher OPR$_{T/O}$ results in lower core size (e.g., lower L$_{CORE}$ and lower D$_{CORE}$), but higher L$_{CORE}$/D$_{CORE}$, higher N2$_{R/L}$ and higher HSR, and, thus, making it more challenging to meet dynamics margins (e.g., A lford stability and/or third mode margin). A$_{IN}$ and A$_{EX}$ are proportional to the engine core size. A$_{IN}$ is larger for higher HP compressor pressure ratios. The inlet radius ratio is indicative of the HP shaft speed. The exit radius ratio is indicative of the HP compressor pressure ratio and T25. Accordingly, embodiments 1 to 145 provide for lowering the core size, while accounting for the dynamics margins and overall engine performance.

Figure 21:
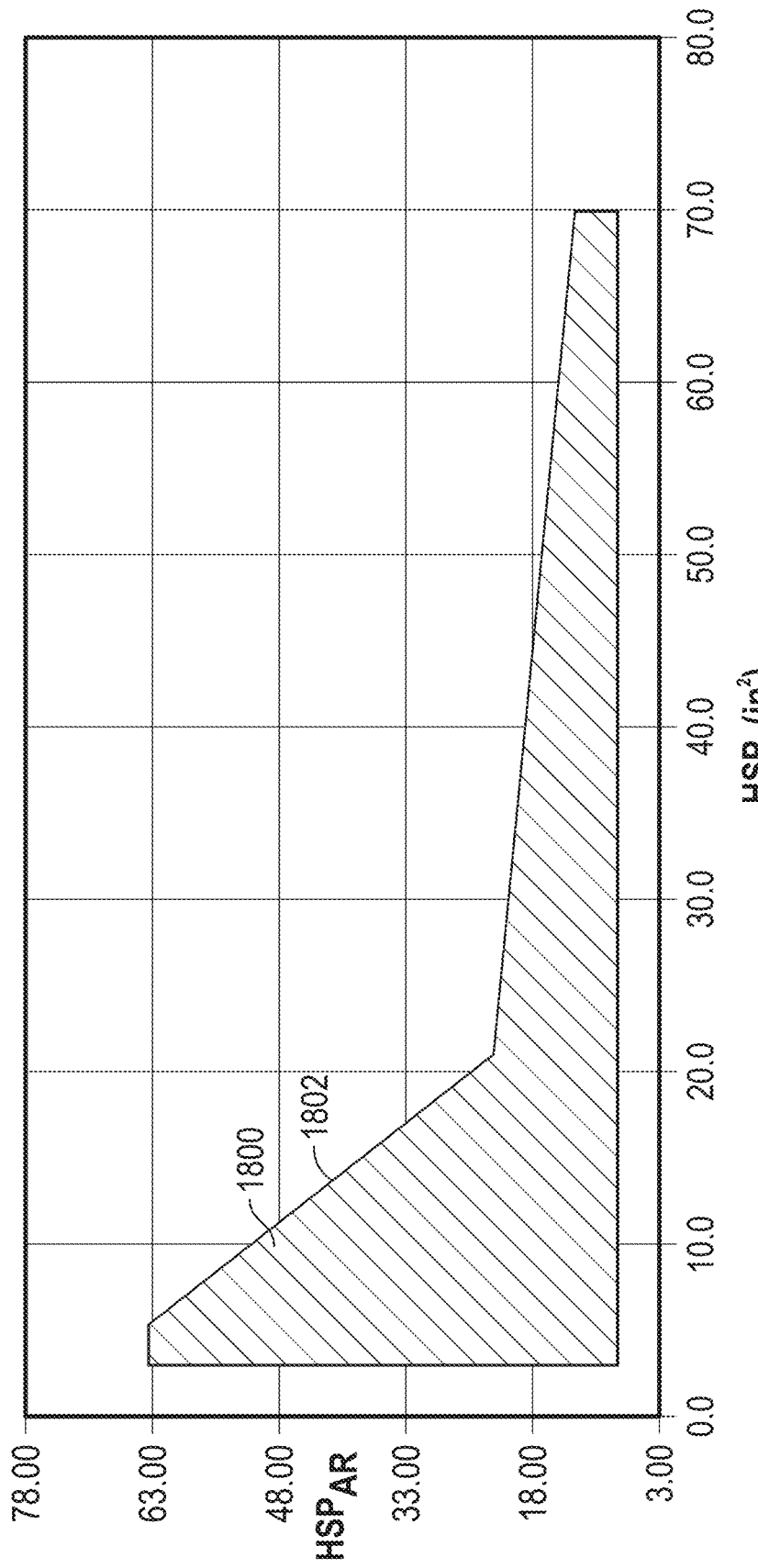
FIG. 21 represents, in graph form, a HP compressor tip radius ratio high-speed shaft rating ($HSP_{RR}$) as a function of the $HSP_X$.

FIG. 21 represents, in graph form, the HSP$_{RR}$ as a function of the HSP$_X$. HSP$_X$ is given by relationship (8) detailed above. HSP$_{RR}$ is in a range from 9.1 to 62.5, and HSP$_X$ is in a range from 3.8 in$^2$ to 69.1 in$^2$. An area 1800 represents the boundaries of HSP$_{RR}$ and HSP$_X$. HSP$_{RR}$ and HSP$_X$ are bounded by an upper bound 1802. The upper bound 1802 is given by (29):

$$HSP_{RR} < MAX(77-2.6*(HSP_X), 27-0.2*(HSP_X)) \quad (29)$$

With reference to TABLE 6 and FIG. 21, in general, HSP$_{RR}$ increases as HSP$_X$ increases, and HSP$_{RR}$ decreases as HSP$_X$ increases. The upper bound 1802 is given by 77−2.6*(HSP$_X$) for values of HSP$_X$ from 3.8 in$^2$ to 21 in$^2$, and is given by 27−0.2*(HSP$_X$) for values of HSP$_X$ from 21 in$^2$ to 69.1 in$^2$. HSP$_X$ increases with increased A$_{EX}$, increased OPR$_{T/O}$, and decreases with increased FN$_{T/O}$. In general, better engine performance, higher BPR, smaller engine core size, higher L$_{CORE}$/D$_{CORE}$, and higher T25 result in reduced dynamics margins. Lower T25 and lower N2$_{R/L}$ result in higher HP compressor pressure ratio with similar work input. Increased radius ratio, reduced blade height, or reduced HP compressor speeds, and lower HP compressor pressure ratios result in diminishing returns on dynamics margin with poorer performance. Accordingly, embodiments 1 to 145 provide for balancing lower T25 with increased radius ratios to meet dynamics margins with improved performance of the engine core (and of the overall engine).

The lower the HSP$_{RR}$, the greater the third mode margin and the lower the HP compressor tip radius ratio for improved performance of the HP compressor and the HP turbine. Thus, the HSP$_{RR}$ is selected for providing a balance among improving the third mode margin of the HP shaft, without overly sacrificing performance of the HP compressor and/or the HP turbine.

Accordingly, the area 1800 having the upper bound 1802 provides for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine.

Figure 22:
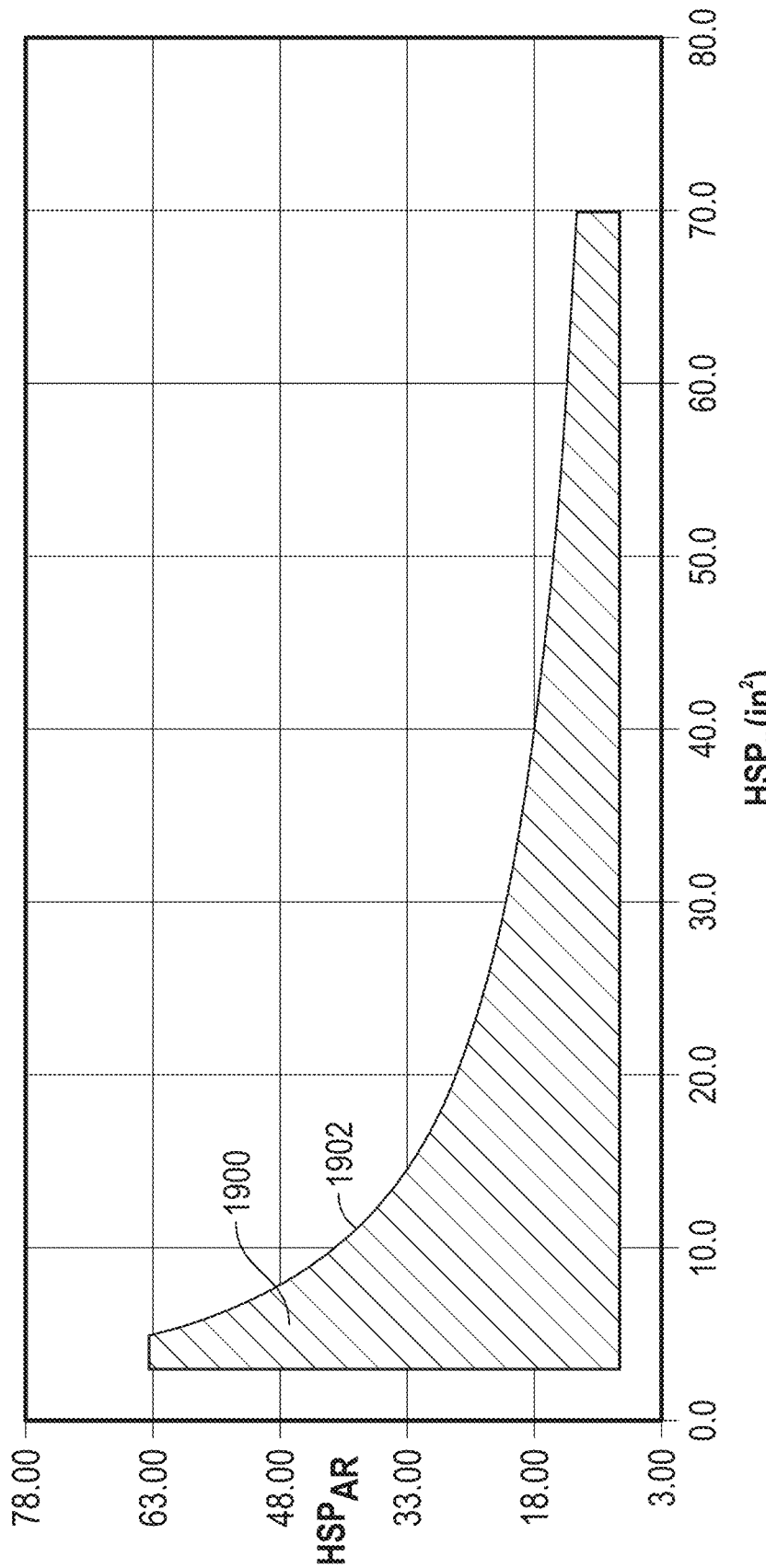
FIG. 22 represents, in graph form, a HP compressor tip radius ratio high-speed shaft rating ($HSP_{RR}$) as a function of the $HSP_X$, according to another embodiment.

FIG. 22 represents, in graph form, the HSP$_{RR}$ as a function of the HSP$_X$, according to another embodiment. HSP$_X$ is given by relationship (8) detailed above. HSP$_{RR}$ is in a range from 9.1 to 62.5, and HSP$_X$ is in a range from 3.8 in$^2$ to 69.1 in$^2$. An area 1900 represents the boundaries of HSP$_{RR}$ and HSP$_X$. HSP$_{RR}$ and HSP$_X$ are bounded by an upper bound 1902. The upper bound 1902 is given by (30):

$$HSP_{RR} < \frac{165}{HSP_X^{0.6}} \quad (30)$$

With reference to TABLE 6 and FIG. 22, in general, HSP$_{RR}$ increases as HSP$_X$ increases, and HSP$_{RR}$ decreases as HSP$_X$ increases, as detailed above. HSP$_X$ increases with increased A$_{EX}$, increased OPR$_{T/O}$, and decreases with increased FN$_{T/O}$, as detailed above.

In general, the area 1900 having the upper bound 1902 provides for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine as described above.

As discussed herein, the inventors have unexpectedly discovered that the relationships of the high-speed shaft ratings (HSR) and $L_{CORE}/D_{CORE}$, the HP compressor inlet radius ratio, the HP compressor exit radius, and corrected flows can be leveraged to improve engine performance while reducing acoustic noise. These discoveries provide a novel framework for designing high-efficiency, low-noise gas turbine engines with higher bypass ratios, improved stability margins, and enhanced aerodynamic performance. By integrating these relationships with the acoustic spacing features (e.g., ASR and BEAL), the inventors have achieved a breakthrough in gas turbine engine design that balances noise reduction, efficiency, and stability in a way that was previously unattainable.

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

A turbomachine engine comprising: a core turbine engine comprising a low pressure turbine; a gearbox assembly coupled to the low pressure turbine; a fan coupled to the gearbox assembly and having a fan diameter and a plurality of fan blades with a blade solidity that is greater than or equal to 0.8 and less than or equal to 2.0; a blade effective acoustic length (BEAL) defined as:

$$BEAL = \frac{2c^2}{S(1-rr)N_b} \cos(\gamma)$$

wherein c is the chord length of a fan blade of the plurality of fan blades, S is a span of the fan blade, rr is a radius ratio of the fan, $\gamma$ is the stagger angle of the fan blade, and $N_b$ is the number of the plurality of fan blades; a nacelle that includes a fan case that surrounds the fan, the fan case comprising an inlet disposed forward of the fan and an inlet length, wherein the inlet length is an axial distance between the leading edge of one of the plurality of fan blades and the inlet to the fan, as measured at a 75% span position of the fan blade; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes, and an inlet-to-nacelle (ITN) ratio is defined as a ratio of the inlet length to a maximum diameter of the nacelle, wherein the ASR of the gas turbine engine is 1.5 to 16.0 and the ITN ratio is 0.23 to 0.35.

A turbomachine engine of the previous clause, including a high-pressure compressor, a high-pressure turbine, and a combustion chamber in flow communication with the high-pressure compressor and the high-pressure turbine, the engine core having a length ($L_{CORE}$), and the high-pressure compressor having an exit stage diameter ($D_{CORE}$), and a high-pressure shaft coupled to the high-pressure compressor and the high-pressure turbine, the high-pressure shaft characterized by a high-speed shaft rating (HSR) from 1.5 to 6.2, and a ratio of $L_{CORE}/D_{CORE}$ is from 2.1 to 4.3.

The turbomachine engine of any preceding clause, an exhaust gas temperature of the turbomachine engine at redline speeds of the high-pressure shaft being from 1,063° C. to 1,282° C.

The turbomachine engine of any preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, HSR being given by:

$$HSR = \frac{1}{k} * N2_{\frac{R}{L}} * D_{CORE} * \left(\frac{L_{CORE}}{D_{CORE}}\right)^2,$$

where $N2_{R/L}$ is a redline speed of the high-pressure shaft, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $L_{CORE}/D_{CORE}$ being a function of a high-speed shaft operating parameter $HSP_X$ is given by:

$$HSP_X = \frac{(A_{ex})^2 * P_{STD} * OPR_{\frac{T}{O}}}{FN_{\frac{T}{O}} * \left(\frac{N_{Stg}}{10}\right)^2},$$

where $N_{Stg}$ is the number of stages in the high-pressure compressor, $A_{EX}$ is an area of the exit stage of the high-pressure compressor, $P_{AMB}$ is ambient pressure, $OPR_{T/O}$ is an overall pressure ratio of the turbomachine engine at takeoff flight conditions corresponding to a maximum thrust rating for an engine core configuration, and $FN_{T/O}$ is a sea-level static thrust of the turbomachine engine at takeoff flight conditions corresponding to the maximum thrust rating for the engine core configuration.

The turbomachine engine of any preceding clause, $L_{CORE}/D_{CORE}$ being less than MAX (4.8−0.088*($HSP_X$),3.18−0.015*($HSP_X$)).

The turbomachine engine of any preceding clause, $L_{CORE}/D_{CORE}$ being less than $$\frac{4.08}{(HSP_X - 8)^{0.14}}.$$

The turbomachine engine of any preceding clause, $HSP_X$ being from 3.8 in² to 69.1 in².

The turbomachine engine of any preceding clause, $A_{EX}$ being from 11 in² to 95 in².

The turbomachine engine of any preceding clause, $P_{STD}$ being approximately 14.7 psi.

The turbomachine engine of any preceding clause, $OPR_{T/O}$ being from 26.3 to 82.

The turbomachine engine of any preceding clause, $FN_{T/O}$ being from 12,000 lbf to 107,480 lbf.

The turbomachine engine of any preceding clause, $A_{EX}$ being given by $A_{EX}=\pi*(R_{TIP,EX}^2-R_{HUB,EX}^2)$, where $R_{TIP,EX}$ is a radius of a tip of a high-pressure compressor blade of the exit stage of the high-pressure compressor, and $R_{HUB,EX}$ is a radius of a hub of the high-pressure compressor at the exit stage.

The turbomachine engine of any preceding clause, $R_{TIP,EX}$ being from 4.73 in. to 15.83 in.

The turbomachine engine of any preceding clause, $R_{HUB,EX}$ being from 4.31 in. to 14.85 in.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating ($HSR_{LP}$) given by:

$$HSR_{LP} = \frac{1}{k}*N1_{\frac{r}{l}}*D_{CORE}*\left(\frac{L_{CORE}}{D_{CORE}}\right)^2,$$

where $N1_{r/l}$ is a redline speed of the low-pressure shaft, and k is a constant with a value of $10^6$ inch-RPM.

The turbomachine engine of any preceding clause, $HSR_{LP}$ being in a range from 0.8 to 2.1.

A turbomachine engine comprises an engine core including a high-pressure compressor, a high-pressure turbine, and a combustion chamber in flow communication with the high-pressure compressor and the high-pressure turbine, and a high-pressure shaft coupled to the high-pressure compressor and the high-pressure turbine, the high-pressure shaft characterized by a high-speed shaft rating (HSR) from 1.5 to 6.2, and the high-pressure shaft is further characterized by an area ratio high-speed shaft rating ($HSP_{AR}$) from 41 to 258; a gearbox assembly coupled to the low pressure turbine; a fan coupled to the gearbox assembly and having a fan diameter and a plurality of fan blades with a blade solidity that is greater than or equal to 0.8 and less than or equal to 2.0; a blade effective acoustic length (BEAL) defined as:

$$BEAL = \frac{2c^2}{S(1-rr)N_b}\cos(\gamma)$$

wherein c is a chord length of a fan blade of the plurality of fan blades, S is a span of the fan blade, rr is a radius ratio of the fan, $\gamma$ is a stagger angle of the fan blade, and $N_b$ is the number of the plurality of fan blades; a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at a 75% span position of the fan blade; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

The turbomachine engine of the preceding clause, a bypass ratio of the turbomachine engine being greater than 8.0. greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, $HSP_{AR}$ being a function of a high-speed shaft operating parameter $HSP_X$, and $HSP_X$ is given by:

$$HSP_X = \frac{(A_{ex})^2 * P_{STD} * OPR_{\frac{T}{O}}}{FN_{\frac{T}{O}} * \left(\frac{N_{Stg}}{10}\right)^2},$$

where $N_{Stg}$ is the number of stages in the high-pressure compressor, $A_{EX}$ is an area of the exit stage of the high-pressure compressor, $P_{STD}$ is ambient pressure, $OPT_{T/O}$ is an overall pressure ratio of the turbomachine engine at takeoff flight conditions corresponding to the maximum thrust rating for an engine core configuration, and $FN_{T/O}$ is a sea-level static thrust of the turbomachine engine at takeoff flight conditions corresponding to the maximum thrust rating for an engine core configuration.

The turbomachine engine of any preceding clause, $HSP_{AR}$ being less than MAX $(280-9*(HSP_X), 82-0.4*(HSP_X))$.

$$\frac{350}{(HSp_x - 4)^{0.5}}.$$

The turbomachine engine of any preceding clause, $HSP_{AR}$ being less than

The turbomachine engine of any preceding clause, $HSP_X$ being from 3.8 in² to 69.1 in².

The turbomachine engine of any preceding clause, $HSP_{AR}$ being less than MAX $(258, 120*(HSP_X-16)^{-0.2})$.

The turbomachine engine of any preceding clause, $HSP_{AR}$ being less than or equal to 258 for $HSP_X$ from 3.8 to 16, and less than $120*(HSP_X-16)^{-0.2}$ for $HSP_X$ from 16 in² to 22 in².

The turbomachine engine of any preceding clause, $A_{EX}$ being from 11 in² to 95 in², $P_{STD}$ is approximately 14.7 psi, $OPR_{T/O}$ is from 26.3 to 82, and $FN_{T/O}$ is from 12,000 lbf to 107,480 lbf.

The turbomachine engine of any preceding clause, HSR being given by:

$$HSR = \frac{1}{k}*N2_{\frac{R}{L}}*D_{CORE}*\left(\frac{L_{CORE}}{D_{CORE}}\right)^2,$$

where $N2_{R/L}$ is a redline speed of the high-pressure shaft, $L_{CORE}$ is a length of the engine core, $D_{CORE}$ is a diameter of the engine core, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $HSP_{AR}$ being given by:

$$HSP_{AR} = \frac{\left(\frac{L_{core}}{D_{core}}\right)^2 * AR}{\sqrt{\frac{R_{HUB,IN}}{R_{TIP,IN}}} * \sqrt{\frac{R_{TIP,EX}}{R_{TIP,IN}}}},$$

where AR is an area ratio of the high-pressure compressor and is the ratio of the area at an inlet of the high-pressure compressor to the area at an exit of the high-pressure compressor ($A_{IN}/A_{EX}$), $R_{HUB,IN}$ is a radius of a hub at the inlet of the high-pressure compressor, $R_{TIP,IN}$ is a radius of a tip of a high-pressure compressor blade at the inlet of the high-pressure compressor, and $R_{TIP,EX}$ is a radius of a tip of a high-pressure compressor blade at an exit stage of the high-pressure compressor.

The turbomachine engine of any preceding clause, a ratio of the of the engine core to the diameter of the engine core ($L_{CORE}/D_{CORE}$) being from 2.1 to 4.3.

The turbomachine engine of any preceding clause, $R_{HUB,IN}/R_{TIP,IN}$ being a high-pressure compressor inlet radius ratio, and the high-pressure compressor inlet radius ratio is from 0.32 to 0.6.

The turbomachine engine of any preceding clause, $R_{TIP,EX}/R_{TIP,IN}$ being a high-pressure compressor tip radius ratio, and the high-pressure compressor tip radius ratio is from 0.75 to 1.01.

The turbomachine engine of any preceding clause, AR being from 5.6 to 13.9.

The turbomachine engine of any preceding clause, $A_{IN}$ being from 77 in$^2$ to 703 in$^2$.

The turbomachine engine of any preceding clause, $A_{EX}$ being from 11 in$^2$ to 95 in$^2$.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating ($HSR_{LP}$) given by:

$$HSR_{LP} = \frac{1}{k} * N1_{\frac{r}{l}} * D_{CORE} * \left(\frac{L_{core}}{D_{core}}\right)^2,$$

where $N1_{rl}$ is a redline speed of the low-pressure shaft, and k is a constant with a value of 10$^6$ inch-RPM.

The turbomachine engine of any preceding clause, $HSR_{LP}$ being in a range from 0.8 to 2.1.

A turbomachine engine comprises an engine core including a high-pressure compressor, a high-pressure turbine, and a combustion chamber in flow communication with the high-pressure compressor and the high-pressure turbine, and a high-pressure shaft coupled to the high-pressure compressor and the high-pressure turbine, the high-pressure shaft characterized by a high-speed shaft rating (HSR) from 1.5 to 6.2, and the high-pressure shaft being further characterized by an inlet area high-speed shaft rating parameter ($HSP\_A_{IN}$) from 1,038 in$^2$ to 5,423 in$^2$.

The turbomachine engine of the preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, $HSP\_A_{IN}$ being a function of a high-speed shaft operating parameter ($HSP_{X1}$), and $HSP_{X1}$ is given by:

$$HSP_{X1} = \frac{A_{ex} * 1000}{FN_{\frac{T}{O}} * \left(\frac{N_{Stg}}{10}\right)^2},$$

where $N_{Stg}$ is the number of stages in the high-pressure compressor, $A_{EX}$ is an area of the exit stage of the high-pressure compressor, and $FN_{T/O}$ is a sea-level static thrust of the turbomachine engine at takeoff flight conditions corresponding to the maximum thrust rating for an engine core configuration.

The turbomachine engine of any preceding clause, $HSP\_A_{IN}$ being less than $$\text{MAX}\left(\frac{4200}{(HSP_{X1})^{1.5}}, 2850 - 500 * (HSP_{X1})\right).$$

The turbomachine engine of any preceding clause, $HSP_{X1}$ being from 0.4 to 2.79.

The turbomachine engine of any preceding clause, $A_{EX}$ being from 11 in$^2$ to 95 in$^2$.

The turbomachine engine of any preceding clause, $FN_{T/O}$ being from 12,000 lbf to 107,480 lbf.

$$HSR = \frac{1}{k} * N2_{\frac{R}{L}} * D_{CORE} * \left(\frac{L_{CORE}}{D_{CORE}}\right)^2,$$

The turbomachine engine of any preceding clause, HSR being given by:
where $N2_{R/L}$ is a redline speed of the high-pressure shaft, $L_{CORE}$ is a length of the engine core, $D_{CORE}$ is a diameter of the engine core, and k is a constant with a value of 10$^6$ inch-RPM.

The turbomachine engine of any preceding clause, $N2_{R/L}$ being from 10,580 RPM to 35,788 RPM.

The turbomachine engine of any preceding clause, $HSP\_A_{IN}$ being given by:

$$HSP_{A_{IN}} = \frac{\left(\frac{L_{core}}{D_{core}}\right)^2 * A_{IN}}{\sqrt{\frac{R_{HUB,IN}}{R_{TIP,IN}}} * \sqrt{\frac{R_{TIP,EX}}{R_{TIP,IN}}}},$$

where $A_{IN}$ is the area at an inlet of the high-pressure compressor, $R_{HUB,IN}$ is a radius of a hub at the inlet of the high-pressure compressor, $R_{TIP,IN}$ is a radius of a tip of a high-pressure compressor blade at the inlet of the high-pressure compressor, and $R_{TIP,EX}$ is a radius of a tip of a high-pressure compressor blade at an exit stage of the high-pressure compressor.

The turbomachine engine of any preceding clause, a ratio of the of the engine core to the diameter of the engine core ($L_{CORE}/D_{CORE}$) being from 2.1 to 4.3.

The turbomachine engine of any preceding clause, $A_{IN}$ being from 77 in$^2$ to 703 in$^2$.

The turbomachine engine of any preceding clause, $R_{HUB,IN}/R_{TIP,IN}$ being a high-pressure compressor inlet radius ratio, and the high-pressure compressor inlet radius ratio is from 0.32 to 0.6.

The turbomachine engine of any preceding clause, $R_{TIP,EX}$ being from 4.73 in. to 15.83 in.

The turbomachine engine of any preceding clause, $R_{TIP,IN}$ being from 5.5 in. to 16.32 in.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating ($HSR_{LP}$) given by:

$$HSR_{LP} = \frac{1}{k} * N1_{\frac{r}{l}} * D_{CORE} * \left(\frac{L_{CORE}}{D_{CORE}}\right)^2,$$

where $N1_{r/l}$ is a redline speed of the low-pressure shaft, and k is a constant with a value of $10^6$ inch-RPM.

The turbomachine engine of any preceding clause, $HSR_{LP}$ being in a range from 0.8 to 2.1.

The turbomachine engine of any preceding clause, the redline speed of the low-pressure shaft being from 6,345 RPM to 13,225 RPM.

A turbomachine engine comprises an engine core including a high-pressure compressor, a high-pressure turbine, and a combustion chamber in flow communication with the high-pressure compressor and the high-pressure turbine, and a high-pressure shaft coupled to the high-pressure compressor and the high-pressure turbine, the high-pressure shaft characterized by a high-speed shaft rating (HSR) from 1.5 to 6.2, and the high-pressure shaft being further characterized by an exit rim speed high-speed shaft rating ($HSP\_U_{RIM,R/L}$) from 0.09 to 1.00 in$^{-2/3}$ (ft/s/° R)$^{-3}$; a gearbox assembly coupled to the low pressure turbine; a fan coupled to the gearbox assembly and having a fan diameter and a plurality of fan blades with a blade solidity that is greater than or equal to 0.8 and less than or equal to 2.0; a blade effective acoustic length (BEAL) defined as:

$$BEAL = \frac{2c^2}{S(1 - rr)N_b}\cos(\gamma)$$

wherein c is a chord length of a fan blade of the plurality of fan blades, S is a span of the fan blade, rr is a radius ratio of the fan, $\gamma$ is a stagger angle of the fan blade, and $N_b$ is the number of the plurality of fan blades; a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at a 75% span position of the fan blade; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

The turbomachine engine of the preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, $HSP\_U_{RIM,R/L}$ being a function of a high-speed shaft operating parameter ($HSP_X$), and $HSP_X$ is given by:

$$HSP_X = \frac{(A_{ex})^2 * P_{STD} * OPR_{\frac{T}{O}}}{FN_{\frac{T}{O}} * \left(\frac{N_{Stg}}{10}\right)^2},$$

where $N_{Stg}$ is the number of stages in the high-pressure compressor, $A_{EX}$ is an area of the exit stage of the high-pressure compressor, $P_{STD}$ is standard pressure, $OPR_{T/O}$ is an overall pressure ratio of the turbomachine engine at takeoff flight conditions corresponding to the maximum thrust rating for a engine core configuration, and $FN_{T/O}$ is a sea-level static thrust of the turbomachine engine at takeoff flight conditions corresponding to the maximum thrust rating for an engine core configuration.

The turbomachine engine of any preceding clause, $HSP\_U_{RIM,R/L}$ being less than $$\frac{6.6}{(HSP_X)}.$$

The turbomachine engine of any preceding clause, $HSP\_U_{RIM,R/L}$ being less than $$\frac{2.9}{HSP_X^{0.75}}.$$

The turbomachine engine of any preceding clause, $HSP_X$ being from 3.8 in$^2$ to 69.1 in$^2$.

The turbomachine engine of any preceding clause, $A_{EX}$ being from 11 in$^2$ to 95 in$^2$, $P_{AMB}$ is approximately 14.7 psi, $OPR_{T/O}$ is from 26.3 to 82, and $FN_{T/O}$ is from 12,000 lbf to 107,480 lbf.

The turbomachine engine of any preceding clause, HSR being given by:

$$HSR = \frac{1}{k} * N2_{\frac{R}{L}} * D_{CORE} * \left(\frac{L_{CORE}}{D_{CORE}}\right)^2,$$

where $N2_{R/L}$ is a redline speed of the high-pressure shaft, $L_{CORE}$ is a length of the engine core, $D_{CORE}$ is a diameter of the engine core, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $HSP\_U_{RIM,R/L}$ being given by:

$$HSP_{U_{RIM,\frac{R}{L}}} = \frac{\left(\frac{L_{CORE}}{D_{CORE}}\right)^2}{N_{stg} * A_{F,IN}^{\frac{1}{3}}} * \left(\frac{T3_{\frac{T}{O}}}{U_{RIM,\frac{R}{L}}}\right)^3,$$

where $N_{stg}$ is a number of stages of the high-pressure compressor, $T3_{T/O}$ is a temperature at the exit of the high-pressure compressor at takeoff flight conditions, $A_{F,IN}$ is a frontal area of the high-pressure compressor, and $U_{RIM,R/L}$ is an exit rim speed of the high-pressure compressor at redline speeds of the high-pressure shaft.

The turbomachine engine of any preceding clause, a ratio of the length of the engine core to the diameter of the engine core ($L_{CORE}/D_{CORE}$) being from 2.1 to 4.3.

The turbomachine engine of any preceding clause, $N_{stg}$ being eight stages, nine stage, ten stage, or eleven stages.

The turbomachine engine of any preceding clause, $A_{F,IN}$ being from 95 to 837.

The turbomachine engine of any preceding clause, $U_{RIM,R/L}$ being given by:

$$U_{RIM,\frac{R}{L}} = \frac{\pi * N2_{\frac{R}{L}}}{30} * \frac{R_{HUB,EX}}{12},$$

where $R_{HUB,EX}$ is a radius of a hub at an exit stage of the high-pressure compressor.

The turbomachine engine of any preceding clause, $T3_{T/O}$ being given $$T3_{\frac{T}{O}} = T25_{\frac{T}{O}} * (3.465 * AR - 5.7)^{\frac{\gamma-1}{\gamma * \eta_{Poly}}},$$

where $T25_{T/O}$ is a temperature at an inlet of the high-pressure compressor, AR is an area ratio of the high-pressure compressor and is the ratio of the area at the inlet of the high-pressure compressor to the area at an exit of the high-pressure compressor ($A_{IN}/A\ EX$), $\gamma$ is a gas constant of air and is equal to 1.37, and $\eta_{Poly}$ is a compressor efficiency of the high-pressure compressor and is approximately equal to 0.9.

The turbomachine engine of any preceding clause, AR being from 5.6 to 13.9.

The turbomachine engine of any preceding clause, $T25_{T/O}$ being from 579° R to 803° R. The turbomachine engine of any preceding clause, $T25_{T/O}$ being given by:

$$T25_{\frac{T}{O}} = T_{ISA} * \left(\frac{1.25 * OPR_{\frac{T}{O}}}{3.465 * AR - 5.7}\right)^{\frac{\gamma-1}{\gamma * \eta_{Poly}}} + T_{IC},$$

where $T_{ISA}$ is ambient temperature and is approximately equal to 545.67° R, $OPR_{T/O}$ is an overall pressure ratio of the turbomachine engine at takeoff flight conditions corresponding to the maximum thrust rating for a engine core configuration, $\gamma$ is a gas constant of air and is equal to 1.37, $\eta_{Poly}$ is an overall compression efficiency of the turbomachine engine and is approximately equal to 0.9, and $T_{IC}$ is an intercooler temperature upstream of the high-pressure compressor.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating ($HSR_{LP}$) given by:

$$HSR_{LP} = \frac{1}{k} * N1_{rl} * D_{CORE} * \left(\frac{L_{CORE}}{D_{CORE}}\right)^2,$$

where $N1_{rl}$ is a redline speed of the low-pressure shaft, k is a constant with a value of $10^6$ inch-RPM, and $HSR_{LP}$ is in a range from 0.8 to 2.1.

A turbomachine engine comprises an engine core including a high-pressure compressor, a high-pressure turbine, and a combustion chamber in flow communication with the high-pressure compressor and the high-pressure turbine, and a high-pressure shaft coupled to the high-pressure compressor and the high-pressure turbine, the high-pressure shaft characterized by a high-speed shaft rating (HSR) from 1.5 to 6.2, and the high-pressure shaft being further characterized by a radius ratio high-speed shaft rating ($HSP_{RR}$) from 9.1 to 62.5.

The turbomachine engine of the preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, $HSP_{RR}$ being a function of a high-speed shaft operating parameter ($HSP_X$), and $HSP_X$ is given by:

$$HSP_X = \frac{(A_{ex})^2 * P_{STD} * OPR_{\frac{T}{O}}}{FN_{\frac{T}{O}} * \left(\frac{N_{Stg}}{10}\right)^2},$$

where $N_{Stg}$ is the number of stages in HP compressor, $A_{EX}$ is an area of the exit stage of the high-pressure compressor, $P_{STD}$ is standard pressure, $OPR_{T/O}$ is an overall pressure ratio of the turbomachine engine at takeoff flight conditions corresponding to the maximum thrust rating for an engine core configuration, and $FN_{T/O}$ is a sea-level static thrust of the turbomachine engine at takeoff flight conditions corresponding to the maximum thrust rating for an engine core configuration.

The turbomachine engine of any preceding clause, $HSP_{RR}$ being less than MAX $(77-2.6*(HSP_X), 27-0.2*(HSP_X))$.

The turbomachine engine of any preceding clause, $HSP_{RR}$ being less than $$\frac{165}{HSP_X^{0.6}}.$$

The turbomachine engine of any preceding clause, $HSP_X$ being from 3.8 in² to 69.1 in².

The turbomachine engine of any preceding clause, $A_{EX}$ being from 11 in² to 95 in², $P_{AMB}$ is approximately 14.7 psi, $OPR_{T/O}$ is from 26.3 to 82, and $FN_{T/O}$ is from 12,000 lbf to 107,480 lbf.

The turbomachine engine of any preceding clause, HSR being given by:

$$HSR = \frac{1}{k} * N2_{\frac{R}{L}} * D_{CORE} * \left(\frac{L_{CORE}}{D_{CORE}}\right)^2,$$

where $N2_{R/L}$ is a redline speed of the high-pressure shaft, $L_{CORE}$ is a length of the engine core, $D_{CORE}$ is a diameter of the engine core, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $HSP_{RR}$ being given by:

$$HSP_{RR} = \frac{\left(\frac{L_{core}}{D_{core}} * \frac{T25_{T/O}}{T_{STD}}\right)^2}{\sqrt{\frac{R_{HUB,IN}}{R_{TIP,IN}}} * \sqrt{\frac{R_{TIP,EX}}{R_{TIP}}}},$$

where $T25_{T/O}$ is a temperature at an inlet of the high-pressure compressor, $T_{STD}$ is standard day temperature and is equal to 518.67° R, $R_{HUB,IN}$ is a radius of a hub at the inlet of the high-pressure compressor, $R_{TIP,IN}$ is a radius of a tip of a high-pressure compressor blade at the inlet of the high-pressure compressor, and $R_{TIP,EX}$ is a radius of a tip of a high-pressure compressor blade at an exit stage of the high-pressure compressor.

The turbomachine engine of any preceding clause, a ratio of the of the engine core to the diameter of the engine core ($L_{CORE}/D_{CORE}$) being from 2.1 to 4.3.

The turbomachine engine of any preceding clause, $R_{HUB,IN}/R_{TIP,IN}$ being a high-pressure compressor inlet radius ratio, and the high-pressure compressor inlet radius ratio is from 0.32 to 0.6.

The turbomachine engine of any preceding clause, $R_{TIP,EX}/R_{TIP,IN}$ being a high-pressure compressor tip radius ratio, and the high-pressure compressor tip radius ratio is from 0.75 to 1.01.

The turbomachine engine of any preceding clause, $T25_{T/O}$ being from 579° R to 803° R. The turbomachine engine of any preceding clause, $T25_{T/O}$ being given by:

$$T25_{\frac{T}{O}} = T_{ISA} * \left(\frac{1.25 * OPR_{\frac{T}{O}}}{3.465 * AR - 5.7}\right)^{\frac{\gamma-1}{\gamma*\eta_{Poly}}} * + T_{IC},$$

where $T_{ISA}$ is ambient temperature and is approximately equal to 545.67° R, $OPR_{T/O}$ is an overall pressure ratio of the turbomachine engine at takeoff flight conditions corresponding to a maximum thrust rating for an engine core configuration, $\gamma$ is a gas constant of air and is equal to 1.37, $\eta_{Poly}$ is an overall compression efficiency of the turbomachine engine and is approximately equal to 0.9, and $T_{IC}$ is an intercooler temperature upstream of the HP compressor.

The turbomachine engine of any preceding clause, $OPR_{T/O}$ being from 26.3 to 82.

The turbomachine engine of any preceding clause, $T_{IC}$ being from −100° R to 0° R.

The turbomachine engine of any preceding clause, AR being from 5.6 to 13.9.

The turbomachine engine of any preceding clause, wherein the high-pressure shaft first mode margin with respect to the low-pressure shaft redline speed is given by:

$$-0.1 > \left(\frac{0.55}{(HSR_{LP})^2} + LST\right) > 0,$$

wherein LST accounts for the effects that the HPC pressure ratio and the HPC exit temperature can have on the first mode.

The turbomachine engine of any preceding clause, wherein the high-pressure shaft first mode margin with respect to the low-pressure shaft redline speed is given by:

$$-0.2 > \left(\frac{0.55}{(HSR_{LP})^2} + LST\right) > 0,$$

wherein LST accounts for the effects that the HPC pressure ratio and the HPC exit temperature can have on the first mode.

The turbomachine engine of any preceding clause, wherein the high-pressure shaft first mode margin with respect to the low-pressure shaft redline speed is given by:

$$-0.3 > \left(\frac{0.55}{(HSR_{LP})^2} + LST\right) > 0,$$

wherein LST accounts for the effects that the HPC pressure ratio and the HPC exit temperature can have on the first mode.

The turbomachine engine of any preceding clause, wherein the high-pressure shaft first mode margin with respect to the low-pressure shaft redline speed is given by:

$$\left(\frac{0.55}{(HSR_{LP})^2} + LST\right) > -0.1,$$

wherein LST accounts for the effects that the HPC pressure ratio and the HPC exit temperature can have on the first mode.

The turbomachine engine of any preceding clause, wherein LST is from −0.67 to −0.15.

The turbomachine engine of any preceding clause, wherein the high-pressure shaft second mode margin with respect to the high-pressure shaft redline speed is given by:

$$\left(-0.1215 * HSR + \left(\frac{2*HST-1}{3}\right)\right) < -0.1,$$

wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by:
−0.1>(−0.1822*HSR+HST)>0, wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by:
−0.2>(−0.1822*HSR+HST)>0, wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by:
−0.3>(−0.1822*HSR+HST)>0, wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by: (−0.1822*HSR+HST)>−0.1, wherein HST accounts for the effects that the HPC pressure ratio and the HPC exit temperature have on the third mode.

The turbomachine engine of any preceding clause, wherein HST is from 0.46 to 0.78.

The turbomachine engine of any preceding clause, wherein HST is given by:

$$HST = -0.726 * \frac{T25}{T_{STD}} + 1.61,$$

wherein T25 is from 615° R to 855° R and $T_{STD}$ is the standard temperature defined by a constant value of 518.67° R.

The turbomachine engine of any preceding clause, further comprising a power turbine and a low-pressure shaft coupled to the power turbine, the high-pressure shaft being characterized by a second high-pressure shaft rating ($HSR_{LP}$) given by:

$$HSR_{LP} = \frac{1}{k} * N1_{\frac{r}{l}} * D_{CORE} * \left(\frac{L_{CORE}}{D_{CORE}}\right)^2,$$

where $N1_{rl}$ is a redline speed of the low-pressure shaft, k is a constant with a value of $10^6$ inch-RPM, and $HSR_{LP}$ is in a range from 0.8 to 2.1.

The turbomachine engine of any preceding clause, further comprising an intermediate-pressure turbine, an intermediate-pressure compressor, and an intermediate-pressure shaft coupled to the intermediate-pressure turbine and the intermediate-pressure compressor.

The turbomachine engine of any preceding clause, further comprising an intercooler between the high-pressure compressor and the low-pressure compressor.

The turbomachine engine of any preceding clause, further comprising a fan, the fan being directly coupled to the low-pressure shaft.

The turbomachine engine of any preceding clause, further comprising a fan and a gearbox assembly, the fan coupled to the low-pressure shaft through the gearbox assembly.

The turbomachine engine of any preceding clause, the turbomachine engine being a ducted turbine engine.

The turbomachine engine of any preceding clause, the turbomachine engine being a three-stream turbine engine.

The turbomachine engine of any preceding clause, the fan including a plurality of fan blades, the plurality of fan blades being configured to pitch about a pitch axis.

The turbomachine engine of any preceding clause, the turbomachine engine including a counter rotating low-pressure architecture in which two shafts of the turbomachine engine rotate in opposite directions and pass through the engine core.

The turbomachine engine of any preceding clause, the turbomachine engine including a vaneless counter rotating turbine.

The turbomachine engine of any preceding clause, $L_{CORE}$ being from 36 in. to 67 in.

The turbomachine engine of any preceding clause, at least one of the high-pressure compressor, the high-pressure turbine, or the power turbine including a ceramic matrix composite (CM C) material.

The turbomachine engine of the preceding clause, the power turbine including the CM C material.

The turbomachine engine of the preceding clause, the CM C material being a first CM C material, and the high-pressure turbine including the first CM C material or a second CM C material.

The turbomachine engine of the preceding clause, the high-pressure compressor including the first CM C material or the second CM C material or a third CM C material.

The turbomachine engine of any preceding clause, the high-pressure turbine including the CM C material.

The turbomachine engine of the preceding clause, the high-pressure turbine including at least one nozzle and at least one airfoil, the at least one nozzle, the at least one airfoil, or both the at least one nozzle and the at least one airfoil including the CM C material.

The turbomachine engine of any preceding clause, the high-pressure turbine having one stage or two stages, and at least one stage including the CM C material.

The turbomachine engine of any preceding clause, the CM C material being a first CM C material, and the power turbine including the first CM C material or a second CM C material.

The turbomachine engine of any preceding clause, the high-pressure compressor including the first CM C material or the second CM C material or a third CM C material.

The turbomachine engine of any preceding clause, the high-pressure compressor including the CM C material.

The turbomachine engine of any preceding clause, the high-pressure compressor having eight stages, nine stages, ten stages, or eleven stages, and at least one stage including the CM C material.

The turbomachine engine of any preceding clause, the high-pressure compressor having nine stages and at least one stage of the nine stages includes the CM C material.

The turbomachine engine of any preceding clause, the CM C material being a first CM C material, and the high-pressure turbine including the first CM C material or a second CM C material.

The turbomachine engine of any preceding clause, the power turbine including the first CM C material, the second CM C material, or a third CM C material.

The turbomachine engine of any preceding clause, the first CM C material and the second CM C material being the same materials.

The turbomachine engine of any preceding clause, the first CM C material and the second CM C material being different materials.

The turbomachine engine of any preceding clause, the third CM C material being the same material as the first CM C material, the second CM C material, or both the first CM C material and the second CM C material.

The turbomachine engine of any preceding clause, the third CM C material being a different material than the first CM C material, the second CM C material, or both the first CM C material and the second CM C material.

A method of operating the turbomachine engine of any preceding clause, the method comprising operating the turbomachine engine to generate an engine thrust, a redline speed of the high-pressure shaft being from 10,580 RPM to 35,788 RPM.

The turbomachine engine of the preceding clause, also including a disk-to-blade diametric (DBD) ratio defined as a ratio of a disk spacing length to the fan diameter, the disk spacing length being a distance between a forwardmost end of a fan disk and an intersection with the inlet taken along an engine centerline, wherein the DBD ratio of the gas turbine engine is 0.09 to 0.59, 0.15 to 0.35, or 0.19 to 0.27.

The turbomachine engine of any preceding clause, also including a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47, 0.15 to 0.35, or 0.15 to 0.25.

The turbomachine engine of any preceding clause, also including a disk-to-inlet length (DIL) ratio defined as a ratio of a disk spacing length to the fan diameter, the disk spacing length being a distance between a forwardmost end of a fan disk and an intersection with the inlet taken along an engine centerline, wherein the DIL ratio of the gas turbine engine is 0.30 to 0.80, 0.3 to 0.70, or 0.49 to 0.65.

The turbomachine engine of any preceding clause, further comprising a fan pressure ratio from 1.25 to 1.45.

The turbomachine engine of any preceding clause, further comprising an inlet length ratio that is a ratio of an inlet length to a diameter of the fan blade, wherein the inlet length defines an average distance from a leading edge of the fan blade to an inlet of the fan, and wherein the inlet length ratio is 0.15 to 0.4, or 0.15 to 0.3.

The turbomachine engine of any preceding clause, wherein the fan case further comprises an acoustic treatment disposed on an interior surface of the fan case, and, optionally, the acoustic treatment length is 50% to 90% of an inlet length.

The turbomachine engine of any preceding clause, wherein the number of the plurality of outlet guide vanes is at least twice the number of the plurality of fan blades.

The turbomachine engine of any preceding clause, wherein the low pressure turbine comprises at least three low pressure turbine stages or at least four low pressure turbine stages.

The turbomachine engine of any preceding clause, wherein plurality of outlet guide vanes further comprise serrated leading edges.

The turbomachine engine of any preceding clause, wherein the plurality of fan blades comprise composite materials that include a matrix and a plurality of fiber plies.

The turbomachine engine of any preceding clause, wherein the plurality of fiber plies are interwoven in in-plane and out-of-plane orientations, and/or the plurality of fiber plies are interwoven in three or more different orientation angles.

The turbomachine engine of any preceding clause, wherein a fan blade diameter of the fan blade is 65-80 inches, 80-95 inches, or 95-115 inches.

The turbomachine engine of any preceding clause, wherein the number of the plurality of fan blades is 14-26, 20-24, or 20-22.

The turbomachine engine of any preceding clause, wherein the blade solidity is 0.8 to 1.5, 1.0 to 2.0, or 1.25 to 1.75.

The turbomachine engine of any preceding clause, wherein the gas turbine engine has a bypass ratio of 10:1 to 17:1 or 12:1 to 15:1.

In view of the many possible examples to which the principles of the disclosure may be applied, it should be recognized that the illustrated examples are only preferred examples and should not be taken as limiting the scope. Rather, the scope is defined by the following claims. We therefore claim all that comes within the scope and spirit of these claims.

We claim:

1. A turbomachine engine comprising:
an engine core including a high-pressure compressor, a high-pressure turbine, and a combustion chamber in flow communication with the high-pressure compressor and the high-pressure turbine, the engine core including a core forward bearing and a core aft bearing, at least one stage of the high-pressure compressor being positioned axially between the core forward bearing and the core aft bearing, the engine core further comprising a low pressure turbine;
a low pressure shaft of the low pressure turbine coupled to a gearbox assembly;
a fan coupled to the gearbox assembly and having a fan diameter and a plurality of fan blades with a blade solidity that is greater than or equal to 0.8 and less than or equal to 2.0;
a high-pressure shaft coupled to the high-pressure compressor and the high-pressure turbine,
a blade effective acoustic length (BEAL) defined as:

$$BEAL = \frac{2c^2}{S(1-rr)N_b}\cos(\gamma)$$

wherein c is a chord length of a fan blade of the plurality of fan blades, S is a span of the fan blade, rr is a radius ratio of the fan, $\gamma$ is a stagger angle of the fan blade, and $N_b$ is the number of the plurality of fan blades;
a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at a 75% span position of the fan blade;
a plurality of outlet guide vanes disposed aft of the fan and extending radially between the engine core and the fan case;
an acoustic spacing from the fan blade trailing edge to an outlet guide vane leading edge;
an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes, and the ASR of the turbomachine engine is 1.5 to 16.0;
an inlet-to-nacelle (ITN) ratio defined as a ratio of the inlet length to a maximum diameter of the nacelle, and the ITN ratio is 0.23 to 0.35;
wherein the engine core has a length ($L_{CORE}$) defined from the core forward bearing to the core aft bearing, and the high-pressure compressor has an exit stage diameter ($D_{CORE}$), wherein a ratio of $L_{CORE}/D_{CORE}$ is greater than or equal to 2.1 and less than MAX (9.55*$(HSP_X)^{-0.38}$, 6.95*$(HSP_X)^{-0.28}$), wherein $HSP_X$ is given by:

$$HSP_X = \frac{(A_{ex})^2 * P_{STD} * OPR_{\frac{T}{O}}}{FN_{\frac{T}{O}} * \left(\frac{Nstg}{10}\right)^2},$$

where $N_{Stg}$ is a number of stages in the high-pressure compressor, $A_{EX}$ is an area of an exit stage of the high-pressure compressor, $P_{STD}$ is standard pressure, $OPR_{T/O}$ is an overall pressure ratio of the turbomachine engine at takeoff flight conditions corresponding to a maximum thrust rating for an engine core configuration, and $FN_{T/O}$ is a sea-level static thrust of the turbomachine engine at takeoff flight conditions corresponding to the maximum thrust rating for the engine core configuration.

2. The turbomachine engine of claim 1, wherein the high-pressure shaft is characterized by a high-speed shaft rating (HSR) from 1.5 to 6.2,
   wherein HSR is given by:

$$HSR = \frac{1}{k} * N2_{\frac{R}{L}} * D_{CORE} * \left(\frac{L_{CORE}}{D_{CORE}}\right)^2,$$

where $N2_{R/L}$ is a redline speed of the high-pressure shaft, and k is a constant with a value of $10^6$ inch-RPM.

3. The turbomachine engine of claim 1, wherein is $L_{CORE}/D_{CORE}$ is less than $9.55*(HSP_X)^{-0.38}$ for $HSP_X$ from 3.8 in² to 25 in², and is less than $6.95*(HSP_X)^{-0.28}$ for $HSP_X$ from 25 in² to 69.1 in².

4. The turbomachine engine of claim 1, wherein the high-pressure compressor includes eight stages, nine stages, ten stages, or eleven stages.

5. The turbomachine engine of claim 1, wherein the high-pressure turbine includes one stage or two stages.

6. The turbomachine engine of claim 1, wherein an exhaust gas temperature of the turbomachine engine at redline speeds of the high-pressure shaft is from 1,063° C. to 1,282° C.

7. The turbomachine engine of claim 1, wherein $HSP_X$ is from 3.8 in² to 69.1 in².

8. The turbomachine engine of claim 1, wherein $A_{EX}$ is from 11 in² to 95 in².

9. The turbomachine engine of claim 1, wherein $OPR_{T/O}$ is from 26.3 to 82.

10. The turbomachine engine of claim 1, wherein $FN_{T/O}$ is from 12,000 lbf to 107,480 lbf.

11. The turbomachine engine of claim 1, further comprising a disk-to-blade diametric (DBD) ratio defined as a ratio of a disk spacing length to the fan diameter, the disk spacing length being a distance between a forwardmost end of a fan disk and an intersection with the inlet taken along an engine centerline,
   wherein the DB D ratio of the turbomachine engine is 0.09 to 0.59.

12. The turbomachine engine of claim 11, wherein the DBD ratio of the turbomachine engine is 0.15 to 0.35.

13. The turbomachine engine of claim 11, wherein the DBD ratio of the turbomachine engine is 0.19 to 0.27.

14. The turbomachine engine of claim 1, further comprising a disk-to-nacelle diametric (DND) ratio defined as a ratio of a disk spacing length to the fan diameter, the disk spacing length being a distance between a forwardmost end of a fan disk and an intersection with the inlet taken along an engine centerline,
   wherein the DND ratio of the turbomachine engine is 0.07 to 0.47.

15. The turbomachine engine of claim 14, wherein the DND ratio of the turbomachine engine is 0.15 to 0.35.

16. The turbomachine engine of claim 1, further comprising a fan pressure ratio from 1.25 to 1.45.

17. The turbomachine engine of claim 1, wherein $A_{EX}$ is given by
   $A_{EX}=\pi*(R_{TIP,EX}^2-R_{HUB,EX}^2)$, where $R_{TIP,EX}$ is a radius of a tip of a high-pressure compressor blade of the exit stage of the high-pressure compressor, and $R_{HUB,EX}$ is a radius of a hub of the high-pressure compressor at the exit stage.

18. The turbomachine engine of claim 1, wherein the ASR is 4.0 to 14.0.

19. The turbomachine engine of claim 1, wherein the ASR is 6.6 to 13.5.

20. The turbomachine engine of claim 1, wherein the number of the plurality of outlet guide vanes is at least twice the number of the plurality of fan blades.

* * * * *